United States Patent
Titus et al.

(10) Patent No.: US 9,191,520 B2
(45) Date of Patent: Nov. 17, 2015

(54) LOCATION SERVICES GATEWAY SERVER

(75) Inventors: Mark Titus, Arnold, MD (US); Gordon John Hines, Kirkland, WA (US); Paul Thompson, Bothell, WA (US); Joseph P. Hannan, Snoqualmie, WA (US)

(73) Assignee: TeleCommunication Systems, Inc., Annapolis, MD (US)

( * ) Notice: Subject to any disclaimer, the term of this patent is extended or adjusted under 35 U.S.C. 154(b) by 627 days.

(21) Appl. No.: 13/374,104

(22) Filed: Dec. 12, 2011

(65) Prior Publication Data

US 2012/0149325 A1 Jun. 14, 2012

Related U.S. Application Data

(60) Provisional application No. 61/457,029, filed on Dec. 13, 2010, provisional application No. 61/457,138, filed on Jan. 12, 2011.

(51) Int. Cl.
*H04M 11/04* (2006.01)
*H04W 4/02* (2009.01)
*H04W 4/22* (2009.01)
*H04M 3/51* (2006.01)
*H04L 29/08* (2006.01)
(Continued)

(52) U.S. Cl.
CPC .............. *H04M 11/04* (2013.01); *H04L 67/303* (2013.01); *H04L 67/327* (2013.01); *H04L 69/40* (2013.01); *H04M 3/5116* (2013.01); *H04W 4/02* (2013.01); *H04W 4/22* (2013.01); *H04M 2207/206* (2013.01); *H04M 2242/04* (2013.01); *H04M 2242/30* (2013.01); *H04W 64/00* (2013.01)

(58) Field of Classification Search
CPC ... H04M 11/04; H04L 67/327; H04L 67/303; H04W 4/02; H04W 64/00; H04W 88/16; H04W 8/12; H04W 4/021; G01S 19/48
USPC .............. 455/404.1, 404.2, 445, 456.1–456.6; 370/352
See application file for complete search history.

(56) References Cited

U.S. PATENT DOCUMENTS 1,103,073 A  1/1914  O'Connel
3,400,222 A  9/1968  Nightingale
(Continued)

FOREIGN PATENT DOCUMENTS

GB        2308528       12/1995
WO  PCT/NO99/00/00178   6/1997
(Continued)

OTHER PUBLICATIONS

International Preliminary Report on Patentability received in PCT/US2012/00024 dated Dec. 11, 2012.
(Continued)

*Primary Examiner* — Olumide T Ajibade Akonai
(74) *Attorney, Agent, or Firm* — William H. Bollman

(57) ABSTRACT

A method and apparatus for steering location requests to a serving one of a plurality of possible location positioning devices. A location request may be steered base on an emergency status of the location request, whether or not the subscriber device has a valid data plan established, based on the device type of the wireless device, or based on the type of application running on the wireless device. A location request may also be steered to a fallback location device if a steering to a primary selected location device fails and sufficient time remains to locate via the fallback location device.

5 Claims, 12 Drawing Sheets

(51) Int. Cl.
*H04L 29/14* (2006.01)
*H04W 64/00* (2009.01)

(56) References Cited

U.S. PATENT DOCUMENTS

| | | |
|---|---|---|
| 3,920,908 A | 11/1975 | Kraus |
| 4,310,726 A | 1/1982 | Asmuth |
| 4,399,330 A | 8/1983 | Kuenzel |
| 4,494,119 A | 1/1985 | Wimbush |
| 4,651,156 A | 3/1987 | Martinez |
| 4,680,785 A | 7/1987 | Akiyana et al. |
| 4,706,275 A | 11/1987 | Kamil |
| 4,725,719 A | 2/1988 | Oncken et al. |
| 4,756,020 A | 7/1988 | Fodale |
| 4,776,000 A | 10/1988 | Parienti |
| 4,776,003 A | 10/1988 | Harris |
| 4,776,033 A | 10/1988 | Scheinert |
| 4,831,647 A | 5/1989 | D'Avello et al. |
| 4,845,740 A | 7/1989 | Tokuyama et al. |
| 4,852,149 A | 7/1989 | Zwick |
| 4,852,155 A | 7/1989 | Barraud |
| 4,860,341 A | 8/1989 | D'Avello et al. |
| 4,891,638 A | 1/1990 | Davis |
| 4,891,650 A | 1/1990 | Sheffer |
| 4,901,340 A | 2/1990 | Parker et al. |
| 4,935,956 A | 6/1990 | Hellwarth et al. |
| 4,951,308 A | 8/1990 | Bishop et al. |
| 4,952,928 A | 8/1990 | Carroll |
| 5,003,585 A | 3/1991 | Richer |
| 5,014,206 A | 5/1991 | Scribner |
| 5,043,736 A | 8/1991 | Darnell et al. |
| 5,046,088 A | 9/1991 | Margulies |
| 5,055,851 A | 10/1991 | Scheffer et al. |
| 5,063,588 A | 11/1991 | Patsiokas et al. |
| 5,068,656 A | 11/1991 | Sutherland |
| 5,068,891 A | 11/1991 | Marshall |
| 5,070,329 A | 12/1991 | Jasinaki |
| 5,081,667 A | 1/1992 | Drori |
| 5,103,449 A | 4/1992 | Jolissant |
| 5,119,104 A | 6/1992 | Heller |
| 5,127,040 A | 6/1992 | D'Avello et al. |
| 5,128,938 A | 7/1992 | Borras |
| 5,138,648 A | 8/1992 | Palomeque et al. |
| 5,138,650 A | 8/1992 | Stahl et al. |
| 5,144,283 A | 9/1992 | Arens et al. |
| 5,144,649 A | 9/1992 | Zicker et al. |
| 5,159,625 A | 10/1992 | Zicker |
| 5,161,180 A | 11/1992 | Chavous |
| 5,177,478 A | 1/1993 | Wagai et al. |
| 5,187,710 A | 2/1993 | Chou et al. |
| 5,193,215 A | 3/1993 | Olmer |
| 5,208,756 A | 5/1993 | Song |
| 5,214,789 A | 5/1993 | George |
| 5,216,703 A | 6/1993 | Roy |
| 5,218,367 A | 6/1993 | Scheffer et al. |
| 5,220,593 A | 6/1993 | Zicker |
| 5,223,844 A | 6/1993 | Mansell |
| 5,233,642 A | 8/1993 | Renton |
| 5,235,630 A | 8/1993 | Moodey |
| 5,239,570 A | 8/1993 | Koster |
| 5,265,155 A | 11/1993 | Castro |
| 5,266,944 A | 11/1993 | Carroll et al. |
| 5,274,802 A | 12/1993 | Altine |
| 5,276,444 A | 1/1994 | McNair |
| 5,289,527 A | 2/1994 | Tiedemann |
| 5,291,543 A | 3/1994 | Freese et al. |
| 5,293,642 A | 3/1994 | Lo |
| 5,297,189 A | 3/1994 | Chabernaud |
| 5,299,132 A | 3/1994 | Wortham |
| 5,301,223 A | 4/1994 | Amadon et al. |
| 5,301,234 A | 4/1994 | Mazziotto et al. |
| 5,309,501 A | 5/1994 | Kozik et al. |
| 5,311,572 A | 5/1994 | Frieder et al. |
| 5,321,735 A | 6/1994 | Breeden |
| 5,325,302 A | 6/1994 | Izidon |
| 5,325,418 A | 6/1994 | McGregor et al. |
| 5,327,144 A | 7/1994 | Stilp et al. |
| 5,329,578 A | 7/1994 | Brennan et al. |
| 5,334,974 A | 8/1994 | Simms |
| 5,339,352 A | 8/1994 | Armstrong et al. |
| 5,341,414 A | 8/1994 | Popke |
| 5,343,493 A | 8/1994 | Kaimullah |
| 5,347,568 A | 9/1994 | Moody |
| 5,351,235 A | 9/1994 | Lahtinen |
| 5,353,335 A | 10/1994 | D'Urso |
| 5,359,182 A | 10/1994 | Schilling |
| 5,359,642 A | 10/1994 | Castro |
| 5,359,643 A | 10/1994 | Gammino |
| 5,361,212 A | 11/1994 | Class |
| 5,363,425 A | 11/1994 | Mufti |
| 5,369,699 A | 11/1994 | Page et al. |
| 5,374,936 A | 12/1994 | Feng |
| 5,379,451 A | 1/1995 | Nakagoshi |
| 5,381,338 A | 1/1995 | Wysocki |
| 5,384,825 A | 1/1995 | Dillard et al. |
| 5,387,993 A | 2/1995 | Heller |
| 5,388,147 A | 2/1995 | Grimes |
| 5,390,339 A | 2/1995 | Bruckert |
| 5,394,158 A | 2/1995 | Chia |
| 5,396,227 A | 3/1995 | Carroll |
| 5,396,545 A | 3/1995 | Nair et al. |
| 5,396,558 A | 3/1995 | Ishiquoro et al. |
| 5,398,190 A | 3/1995 | Wortham |
| 5,404,580 A | 4/1995 | Simpson et al. |
| 5,406,614 A | 4/1995 | Hara |
| 5,408,513 A | 4/1995 | Busch et al. |
| 5,408,519 A | 4/1995 | Pierce et al. |
| 5,408,682 A | 4/1995 | Ranner et al. |
| 5,412,726 A | 5/1995 | Nevoux et al. |
| 5,418,537 A | 5/1995 | Bird |
| 5,423,076 A | 6/1995 | Westergreen |
| 5,430,759 A | 7/1995 | Yokev et al. |
| 5,432,841 A | 7/1995 | Rimer |
| 5,434,789 A | 7/1995 | Fraker |
| 5,438,615 A | 8/1995 | Moen |
| 5,440,621 A | 8/1995 | Castro |
| 5,454,024 A | 9/1995 | Lebowitz |
| 5,457,737 A | 10/1995 | Wen |
| 5,461,390 A | 10/1995 | Hoshen |
| 5,465,289 A | 11/1995 | Kennedy |
| 5,469,497 A | 11/1995 | Pierce et al. |
| 5,470,233 A | 11/1995 | Fuchterman |
| 5,479,408 A | 12/1995 | Will |
| 5,479,482 A | 12/1995 | Grimes |
| 5,485,161 A | 1/1996 | Vaughn |
| 5,485,163 A | 1/1996 | Singer |
| 5,485,505 A | 1/1996 | Norman et al. |
| 5,488,563 A | 1/1996 | Chazelle |
| 5,497,149 A | 3/1996 | Fast |
| 5,502,761 A | 3/1996 | Duncan et al. |
| 5,506,893 A | 4/1996 | Buscher et al. |
| 5,508,931 A | 4/1996 | Snider |
| 5,509,056 A | 4/1996 | Ericsson et al. |
| 5,513,243 A | 4/1996 | Kage |
| 5,515,287 A | 5/1996 | Hakoyama |
| 5,517,555 A | 5/1996 | Amadon et al. |
| 5,517,559 A | 5/1996 | Hayashi et al. |
| 5,519,403 A | 5/1996 | Bickley |
| 5,532,690 A | 7/1996 | Hertel |
| 5,535,434 A | 7/1996 | Siddoway |
| 5,539,398 A | 7/1996 | Hall |
| 5,543,776 A | 8/1996 | L'Esperance |
| 5,550,897 A | 8/1996 | Seiderman |
| 5,552,772 A | 9/1996 | Janky |
| 5,555,286 A | 9/1996 | Tendler |
| 5,568,119 A | 10/1996 | Schipper |
| 5,570,416 A | 10/1996 | Kroll |
| 5,574,648 A | 11/1996 | Pilley |
| 5,577,100 A | 11/1996 | McGregor et al. |
| 5,579,372 A | 11/1996 | Åstrom |
| 5,579,376 A | 11/1996 | Kennedy, III et al. |
| 5,583,918 A | 12/1996 | Nakagawa |
| 5,586,175 A | 12/1996 | Hogan et al. |
| 5,588,009 A | 12/1996 | Will |

(56) References Cited

U.S. PATENT DOCUMENTS

| | | |
|---|---|---|
| 5,592,535 A | 1/1997 | Klotz |
| 5,604,486 A | 2/1997 | Lauro |
| 5,606,313 A | 2/1997 | Allen |
| 5,606,850 A | 3/1997 | Nakamura |
| 5,610,815 A | 3/1997 | Gudat |
| 5,610,972 A | 3/1997 | Emery et al. |
| 5,614,890 A | 3/1997 | Fox |
| 5,615,116 A | 3/1997 | Gudat |
| 5,621,793 A | 4/1997 | Bednarek et al. |
| 5,625,669 A | 4/1997 | McGregor et al. |
| 5,628,051 A | 5/1997 | Salin |
| 5,633,912 A | 5/1997 | Tsoi |
| 5,640,447 A | 6/1997 | Fonseca |
| 5,673,306 A | 9/1997 | Amamdon |
| 5,682,600 A | 10/1997 | Salin |
| 5,692,037 A | 11/1997 | Friend |
| 5,717,688 A | 2/1998 | Belanger et al. |
| 5,719,918 A | 2/1998 | Serbetciouglu |
| 5,722,067 A | 2/1998 | Fougnies et al. |
| 5,732,346 A | 3/1998 | Lazarides |
| 5,740,534 A | 4/1998 | Ayerst |
| 5,761,618 A | 6/1998 | Lynch |
| 5,767,795 A | 6/1998 | Schaphorst |
| 5,768,509 A | 6/1998 | Gunluk |
| 5,774,533 A | 6/1998 | Patel |
| 5,778,313 A | 7/1998 | Fougnies |
| 5,787,357 A | 7/1998 | Salin |
| 5,790,636 A | 8/1998 | Marshall |
| 5,793,859 A | 8/1998 | Mathews |
| 5,794,142 A | 8/1998 | Vantilla et al. |
| 5,797,091 A | 8/1998 | Clise |
| 5,797,094 A | 8/1998 | Houde et al. |
| 5,797,096 A | 8/1998 | Lupien |
| 5,802,492 A | 9/1998 | Delorme |
| 5,806,000 A | 9/1998 | Vo |
| 5,815,816 A | 9/1998 | Isumi |
| 5,822,700 A | 10/1998 | Hultt |
| 5,826,185 A | 10/1998 | Wise et al. |
| 5,828,740 A | 10/1998 | Khuc |
| 5,850,599 A | 12/1998 | Seiderman |
| 5,854,975 A | 12/1998 | Fougnies et al. |
| 5,856,974 A | 1/1999 | Gervais |
| 5,889,473 A | 3/1999 | Wicks |
| 5,905,736 A | 5/1999 | Ronen et al. |
| 5,920,821 A | 7/1999 | Seaholtz et al. |
| 5,930,701 A | 7/1999 | Skog |
| 5,940,755 A | 8/1999 | Scott |
| 5,943,399 A | 8/1999 | Bannister |
| 5,946,629 A | 8/1999 | Sawyer |
| 5,946,630 A | 8/1999 | Willars |
| 5,950,130 A | 9/1999 | Coursey |
| 5,953,398 A | 9/1999 | Hill |
| 5,974,054 A | 10/1999 | Couts |
| 5,974,133 A | 10/1999 | Fleischer |
| 5,978,685 A | 11/1999 | Laiho |
| 5,983,091 A | 11/1999 | Rodriguez |
| 5,987,323 A | 11/1999 | Huotari |
| 5,999,811 A | 12/1999 | Molne |
| 6,029,062 A | 2/2000 | Hanson |
| 6,035,025 A | 3/2000 | Hanson |
| 6,038,444 A | 3/2000 | Schipper |
| 6,049,710 A | 4/2000 | Nilsson |
| 6,058,300 A | 5/2000 | Hanson |
| 6,064,875 A | 5/2000 | Morgan |
| 6,070,067 A | 5/2000 | Nguyen |
| 6,073,004 A | 6/2000 | Balachandran |
| 6,073,015 A | 6/2000 | Berggren et al. |
| 6,075,982 A | 6/2000 | Donovan et al. |
| 6,081,508 A | 6/2000 | West |
| 6,101,378 A | 8/2000 | Barabash |
| 6,115,458 A | 9/2000 | Taskett |
| 6,119,014 A | 9/2000 | Alperovich et al. |
| 6,122,503 A | 9/2000 | Daly |
| 6,122,520 A | 9/2000 | Want |
| 6,138,158 A | 10/2000 | Boyle et al. |
| 6,148,197 A | 11/2000 | Bridges |
| 6,148,198 A | 11/2000 | Anderson |
| 6,149,353 A | 11/2000 | Nilsson |
| 6,157,823 A | 12/2000 | Fougnies et al. |
| 6,169,891 B1 | 1/2001 | Gorham et al. |
| 6,173,181 B1 | 1/2001 | Losh |
| 6,181,935 B1 | 1/2001 | Gossman |
| 6,188,752 B1 | 2/2001 | Lesley |
| 6,195,543 B1 | 2/2001 | Grandberg |
| 6,198,431 B1 | 3/2001 | Gibson |
| 6,199,045 B1 | 3/2001 | Giniger |
| 6,205,330 B1 | 3/2001 | Windbladh |
| 6,208,854 B1 | 3/2001 | Roberts |
| 6,208,870 B1 | 3/2001 | Lorello et al. |
| 6,223,046 B1 | 4/2001 | Hamill-Keays et al. |
| 6,226,529 B1 | 5/2001 | Bruno |
| 6,249,680 B1 | 6/2001 | Wax |
| 6,249,744 B1 | 6/2001 | Morita |
| 6,266,614 B1 | 7/2001 | Alumbaugh |
| 6,289,373 B1 | 9/2001 | Dezonno |
| 6,304,635 B1 | 10/2001 | Iwami |
| 6,314,108 B1 | 11/2001 | Ramasubramani |
| 6,317,594 B1 | 11/2001 | Gossman |
| 6,321,257 B1 | 11/2001 | Kotola et al. |
| 6,327,479 B1 | 12/2001 | Mikkola |
| 6,335,968 B1 | 1/2002 | Malik |
| 6,356,630 B1 | 3/2002 | Cai et al. |
| 6,360,102 B1 | 3/2002 | Havinis |
| 6,370,373 B1 | 4/2002 | Gerth |
| 6,373,930 B1 | 4/2002 | McConnel et al. |
| 6,381,316 B2 | 4/2002 | Joyce et al. |
| 6,381,535 B1 | 4/2002 | Durocher |
| 6,393,014 B1 | 5/2002 | Daly et al. |
| 6,393,269 B1 | 5/2002 | Hartmaier et al. |
| 6,396,913 B1 | 5/2002 | Perkins, III |
| 6,397,054 B1 | 5/2002 | Hoirup et al. |
| 6,397,055 B1 | 5/2002 | McHenry et al. |
| 6,421,707 B1 | 7/2002 | Miller |
| 6,442,257 B1 | 8/2002 | Gundlach |
| 6,456,852 B2 | 9/2002 | Bar et al. |
| 6,473,622 B1 | 10/2002 | Meuronen |
| 6,483,907 B1 | 11/2002 | Wong et al. |
| 6,487,180 B1 | 11/2002 | Borgstahl |
| 6,487,602 B1 | 11/2002 | Thakker |
| 6,490,450 B1 | 12/2002 | Batni et al. |
| 6,496,690 B1 | 12/2002 | Cobo |
| 6,505,046 B1 | 1/2003 | Baker |
| 6,507,589 B1 | 1/2003 | Ramasubramani |
| 6,512,930 B2 | 1/2003 | Sandegren |
| 6,526,335 B1 | 2/2003 | Treyz et al. |
| 6,526,351 B2 | 2/2003 | Whitham |
| 6,529,593 B2 | 3/2003 | Nelson |
| 6,529,732 B1 | 3/2003 | Vainiomaki et al. |
| 6,539,232 B2 | 3/2003 | Hendrey |
| 6,587,688 B1 | 7/2003 | Chambers et al. |
| 6,609,004 B1 | 8/2003 | Morse |
| 6,621,810 B1 | 9/2003 | Leung |
| 6,654,786 B1 | 11/2003 | Fox et al. |
| 6,667,688 B1 | 12/2003 | Menard et al. |
| 6,677,894 B2 | 1/2004 | Sheynblat et al. |
| 6,694,351 B1 | 2/2004 | Shaffer |
| 6,728,353 B1 | 4/2004 | Espejo |
| 6,728,635 B2 | 4/2004 | Hamada |
| 6,731,943 B1 | 5/2004 | McCormick |
| 6,782,258 B2 | 8/2004 | Ung |
| 6,868,074 B1 | 3/2005 | Hanson |
| 6,879,835 B2 | 4/2005 | Greene |
| 6,882,850 B2 | 4/2005 | McConnell |
| 6,898,633 B1 | 5/2005 | Lyndersay |
| 6,915,138 B2 | 7/2005 | Kraft |
| 6,952,575 B1 | 10/2005 | Countryman |
| 6,970,869 B1 | 11/2005 | Slaughter et al. |
| 6,985,742 B1 | 1/2006 | Giniger |
| 6,993,325 B1 | 1/2006 | Waesterlid |
| 7,020,480 B2 | 3/2006 | Coskun |
| 7,072,665 B1 | 7/2006 | Blumberg |
| 7,106,717 B2 * | 9/2006 | Rousseau et al. ............ 370/338 |
| 7,110,773 B1 | 9/2006 | Wallace |
| 7,120,418 B2 | 10/2006 | Herajarvi |

(56) References Cited

U.S. PATENT DOCUMENTS

| | | | |
|---|---|---|---|
| 7,127,264 B2 | 10/2006 | Hronek | |
| 7,130,383 B2 | 10/2006 | Naidoo et al. | |
| 7,145,462 B2 | 12/2006 | Dewing | |
| 7,180,415 B2 | 2/2007 | Bankert | |
| 7,224,696 B2 | 5/2007 | Bouleros | |
| 7,240,108 B2 | 7/2007 | Smith | |
| 7,245,216 B2 | 7/2007 | Burkley | |
| 7,269,428 B1 | 9/2007 | Wallenius | |
| 7,317,705 B2 | 1/2008 | Hanson | |
| 7,328,031 B2 | 2/2008 | Kraft | |
| 7,356,328 B1 | 4/2008 | Espejo | |
| 7,386,588 B2 | 6/2008 | Mousseau | |
| 7,392,038 B1 | 6/2008 | Ratschunas | |
| 7,409,428 B1 | 8/2008 | Brabec | |
| 7,453,990 B2 | 11/2008 | Welenson | |
| 7,480,915 B2 | 1/2009 | Costa Requena | |
| 7,486,641 B2 | 2/2009 | Reddy | |
| 7,522,182 B2 | 4/2009 | Bang | |
| 7,626,951 B2 | 12/2009 | Croy | |
| 7,792,989 B2 | 9/2010 | Toebes | |
| 7,826,818 B2 | 11/2010 | Gollnick | |
| 7,869,815 B2* | 1/2011 | Ishii | 455/456.2 |
| 7,890,122 B2 | 2/2011 | Walsh | |
| 8,005,683 B2 | 8/2011 | Tessesl | |
| 8,027,658 B2 | 9/2011 | Suryanarayana | |
| 8,060,389 B2 | 11/2011 | Johnson | |
| 8,308,570 B2 | 11/2012 | Fiedler | |
| 2001/0006889 A1 | 7/2001 | Kraft | |
| 2001/0031641 A1 | 10/2001 | Ung et al. | |
| 2001/0034224 A1 | 10/2001 | McDowell et al. | |
| 2001/0040949 A1 | 11/2001 | Blonder | |
| 2002/0068546 A1 | 6/2002 | Plush | |
| 2002/0085538 A1 | 7/2002 | Leung | |
| 2002/0093435 A1 | 7/2002 | Baron | |
| 2002/0098851 A1 | 7/2002 | Walczak | |
| 2002/0102996 A1 | 8/2002 | Jenkins | |
| 2002/0103762 A1 | 8/2002 | Lopez | |
| 2002/0133568 A1 | 9/2002 | Smith et al. | |
| 2002/0168986 A1 | 11/2002 | Lau et al. | |
| 2002/0173317 A1 | 11/2002 | Nykanen | |
| 2002/0183072 A1 | 12/2002 | Steinbach | |
| 2002/0188680 A1 | 12/2002 | McCormick | |
| 2003/0003909 A1 | 1/2003 | Keronen | |
| 2003/0008661 A1 | 1/2003 | Joyce | |
| 2003/0017832 A1 | 1/2003 | Anderson | |
| 2003/0022664 A1 | 1/2003 | Goldstein | |
| 2003/0040300 A1 | 2/2003 | Bodic | |
| 2003/0044654 A1 | 3/2003 | Holt | |
| 2003/0058096 A1 | 3/2003 | Shteyn | |
| 2003/0086422 A1 | 5/2003 | Klinker et al. | |
| 2003/0105864 A1 | 6/2003 | Mulligan | |
| 2003/0118160 A1 | 6/2003 | Holt | |
| 2003/0119525 A1 | 6/2003 | Rajkotia | |
| 2003/0120826 A1 | 6/2003 | Shay | |
| 2003/0155413 A1 | 8/2003 | Kovesdi | |
| 2003/0186709 A1 | 10/2003 | Rhodes | |
| 2003/0193967 A1 | 10/2003 | Fenton | |
| 2004/0032485 A1 | 2/2004 | Stephens | |
| 2004/0076277 A1 | 4/2004 | Kuusinen | |
| 2004/0078694 A1 | 4/2004 | Lester | |
| 2004/0103431 A1 | 5/2004 | Davenport et al. | |
| 2004/0110524 A1 | 6/2004 | Takano | |
| 2004/0143852 A1 | 7/2004 | Meyers | |
| 2004/0176123 A1 | 9/2004 | Chin | |
| 2004/0196858 A1 | 10/2004 | Tsai | |
| 2004/0199614 A1 | 10/2004 | Shenfield et al. | |
| 2005/0004968 A1 | 1/2005 | Mononen | |
| 2005/0020242 A1 | 1/2005 | Holland | |
| 2005/0020287 A1 | 1/2005 | Pohutsky et al. | |
| 2005/0048948 A1 | 3/2005 | Holland et al. | |
| 2005/0064884 A1 | 3/2005 | Dumont | |
| 2005/0074107 A1 | 4/2005 | Renner | |
| 2005/0078612 A1 | 4/2005 | Lang | |
| 2005/0101335 A1 | 5/2005 | Kelly | |
| 2005/0101338 A1 | 5/2005 | Kraft | |
| 2005/0130673 A1* | 6/2005 | Annamalai | 455/456.2 |
| 2005/0132060 A1 | 6/2005 | Mo | |
| 2005/0135569 A1 | 6/2005 | Dickinson | |
| 2005/0141522 A1 | 6/2005 | Kadar | |
| 2005/0164721 A1 | 7/2005 | Yeh | |
| 2005/0186974 A1 | 8/2005 | Cai | |
| 2005/0190789 A1 | 9/2005 | Salkini | |
| 2005/0238156 A1 | 10/2005 | Turner | |
| 2005/0265536 A1 | 12/2005 | Smith | |
| 2005/0282518 A1 | 12/2005 | D'Evelyn | |
| 2006/0010200 A1 | 1/2006 | Mousseau | |
| 2006/0020965 A1 | 1/2006 | Steelberg | |
| 2006/0023747 A1 | 2/2006 | Koren | |
| 2006/0028995 A1 | 2/2006 | Canoy | |
| 2006/0053197 A1 | 3/2006 | Yoshimura | |
| 2006/0072729 A1 | 4/2006 | Lee | |
| 2006/0077911 A1 | 4/2006 | Shaffer | |
| 2006/0079330 A1 | 4/2006 | Dvorak et al. | |
| 2006/0088152 A1 | 4/2006 | Green | |
| 2006/0109960 A1 | 5/2006 | D'Evelyn | |
| 2006/0120320 A1* | 6/2006 | Shim | 370/328 |
| 2006/0148415 A1 | 7/2006 | Hamalainen | |
| 2006/0154710 A1 | 7/2006 | Serafat | |
| 2006/0183460 A1 | 8/2006 | Srinivasan et al. | |
| 2006/0194595 A1 | 8/2006 | Myllynen | |
| 2006/0223549 A1 | 10/2006 | Chang | |
| 2006/0225090 A1 | 10/2006 | Shim et al. | |
| 2006/0250987 A1 | 11/2006 | White | |
| 2006/0258380 A1 | 11/2006 | Liebowitz | |
| 2006/0276168 A1 | 12/2006 | Fuller | |
| 2007/0049288 A1 | 3/2007 | Lamprecht | |
| 2007/0110076 A1 | 5/2007 | Brouwer | |
| 2007/0201623 A1 | 8/2007 | Hines | |
| 2007/0243885 A1 | 10/2007 | Shim | |
| 2007/0287473 A1* | 12/2007 | Dupray | 455/456.1 |
| 2008/0059304 A1 | 3/2008 | Kimsey | |
| 2008/0144779 A1* | 6/2008 | Ray et al. | 379/45 |
| 2008/0146343 A1 | 6/2008 | Sullivan et al. | |
| 2009/0253403 A1* | 10/2009 | Edge et al. | 455/404.2 |
| 2009/0323636 A1 | 12/2009 | Dillon | |
| 2010/0076767 A1 | 3/2010 | Vieri | |
| 2010/0178973 A1 | 7/2010 | Snoddy et al. | |
| 2010/0218664 A1 | 9/2010 | Toledano et al. | |
| 2010/0317317 A1* | 12/2010 | Maier et al. | 455/404.2 |
| 2011/0028165 A1* | 2/2011 | Ni | 455/456.2 |
| 2011/0076982 A1* | 3/2011 | Li et al. | 455/404.1 |
| 2011/0171927 A1* | 7/2011 | Wijayanathan et al. | 455/404.1 |
| 2011/0273568 A1 | 11/2011 | Lagassey | |
| 2012/0001750 A1 | 1/2012 | Monroe | |
| 2012/0189107 A1 | 7/2012 | Dickinson | |
| 2013/0012232 A1 | 1/2013 | Titus et al. | |
| 2013/0072308 A1 | 3/2013 | Peck et al. | |
| 2013/0079152 A1 | 3/2013 | Hall | |

FOREIGN PATENT DOCUMENTS

| | | |
|---|---|---|
| WO | PCT/SE98/00992 | 5/1998 |
| WO | PCT/FI99/00935 | 11/1998 |
| WO | PCT/SE99/00875 | 5/1999 |

OTHER PUBLICATIONS

Bond, "Cellular Carriers Use Prepaid Programs to Reach Untapped Markets," Billing World, Mar. 1997, pp. 14-17.

Robbrock, the Intelligent Network—Changing the Face of Telecommunications, IEEE, Jan. 1991, pp. BCG 21207-BCG 21220.

MultiMedia Publishing Corp., "Prepaid Cellular and Prepaid Wireless Market Report and Forecast 1997-2002," sales literature, undated.

Nextlink, "Introducing a New Prepaid Telephone Service from NEXTLINK," sales literature, undated.

Open Development Corp., "openMedia Cellular Prepaid," sales literature, undated.

Tecore, Inc., "Pre-Paid Cellular," sales literature, Mar. 25, 1997, pp. 1-4.

Open Mobile Alliance, user Plane Location Protocol Candidate Version 1.0, OMA-TS-ULP-V1_0-20060127-C, Jan. 27, 2006, pp. 1-66.

(56) References Cited

OTHER PUBLICATIONS

Open Mobile Alliance, Secure User Plane Location Architecture Candidate Version 1.0, OMA-AD-SUPL-V1_0-20060127-C, Jan. 27, 2006, pp. 1-77.
The Power of Mobile Unified Messaging; Siemans and Comverse to Demonstrate WAP-Based Messaging Applications on Live GBRS System, Comverse, Feb. 2000.
Chin, The Study of the Interconnection of GSM Mobile Communication System Over IP Based Network, IEEE, pp. 2219-2233.
International Search Report received in PCT/US2011/02001 dated Apr. 17, 2012.
International Search Report received in PCT/US2011/001990 dated Apr. 24, 2012.
International Search Report received in PCT/US11/01971 dated Jun. 26, 2013.

\* cited by examiner

XLSG v1.1 ARCHITECTURE

AUTHORIZATION REQUEST MESSAGE FLOW

ASYNCHRONOUS STANDARD LOCATION IMMEDIATE SERVICE

STANDARD IMMEDIATE SERVICE WITH REFUND

EMERGENCY LOCATION IMMEDIATE SERVICE (SYNCHRONOUS)

EMERGENCY LOCATION IMMEDIATE SERVICE (ASYNCHRONOUS)

SUCCESSFUL TRIGGERED LOCATION REPORTING SERVICE

STEERING FUNCTION RELATIONSHIPS

SUCCESSFUL AUTHORIZATION REQUEST

LOCATION SERVICES GATEWAY SERVER

This application claims priority from U.S. Provisional No. 61/457,029, entitled "Location Services Gateway Server" to Titus et al., filed Dec. 13, 2010; and from U.S. Provisional No. 61/457,138 "Location Services Agent" to Titus et al., filed Jan. 12, 2011, the entirety of both of which are expressly incorporated herein by reference.

BACKGROUND OF THE INVENTION

1. Field of the Invention

This invention relates to wireless communications. More specifically it relates to provision of location information for wireless devices.

2. Background of the Related Art

TCS produces wireless data communications technology solutions that require proven high levels of reliability. TCS' wireless data offerings include secure deployable communication systems and engineered satellite-based services; location-based wireless and VoIP Enhanced 9-1-1 services; messaging and location service infrastructure for wireless operators; and commercial location applications, like traffic and navigation, using the precise location of a wireless device.

TCS' location-based products include Xypoint® Location Platform, Xypoint® Reference Network, Xypoint® Assistance Data Server, and Xypoint® SUPL Server. Missing from the portfolio of products is a component that provides managed control over the delivery of mobile device location information to external systems.

SUMMARY OF THE INVENTION

In accordance with the principles of the present invention, a method of directing a location request in a wireless system to a serving location server based on emergency status, comprises steering a given location request to a given location server if the location request is a non-emergency location request. If the location request is related to an emergency, instead steering the location request to a different location server.

In accordance with another embodiment of the invention, a method of directing a location request in a wireless system to a serving location server based on data plan status, comprises steering a location request of a subscriber wireless device that has a valid data plan, to a given location server using a control plane. If the location request is related to a subscriber wireless device that has no valid data plan, instead steering the location request to a different location server.

In accordance with yet another embodiment of the invention, a method of directing a location request in a wireless system to a serving location server based on device type, comprises steering a location request of a subscriber wireless device of a first type, to a first location server. If the location request is related to a subscriber wireless device of a second type, instead steering the location request to a different location server.

In accordance with still another embodiment of the invention, a method of directing a location request in a wireless system to a serving location server based on application type, comprises steering a location request of a subscriber wireless device running an application of a first type, to a first location server. If the location request is related to a subscriber wireless device running an application of a different, second type, instead the location request is steered to a different location server.

In accordance with a further embodiment of the invention, a method of directing a location request in a wireless system to a serving location server with a fallback, comprises steering a location request of a subscriber wireless device, to a first location server. If the steered location request fails, and sufficient time remains, instead the location request is steered to a different location server.

BRIEF DESCRIPTION OF THE DRAWINGS

Features and advantages of the present invention become apparent to those skilled in the art from the following description with reference to the drawings.

DETAILED DESCRIPTION OF ILLUSTRATIVE EMBODIMENTS

The present invention provides a Location Services Gateway server (XLSG) that provides managed control over the delivery of mobile device location information to external systems. As location information becomes more useful to users and applications, there becomes a need for a method of controlling access to that location information. The XLSG is a loosely coupled front-end to Location Servers (LS) to implement access control and privacy checking for the location information available from the LS.

Access services are provided to: (1) LCS Clients (applications) external to the carrier that implement Location Based Services (LBS). These are typically applications accessing the XLSG over the Internet; (2) LCS Clients (applications) executing on mobile devices within carrier networks requesting location information; and (3) Location servers external or internal to a carrier network that utilize the privacy checking capabilities of the XLSG.

In addition the XLSG implements a Location Access Manager (LAMM) which functions as a proxy location server to manage locations with a mobile device implementing a Location Agent (LA). The XLSG has particular application where location information can be provided to $3^{rd}$ parties (external to a wireless carrier) to implement location based services (LBS).

Figure 1:
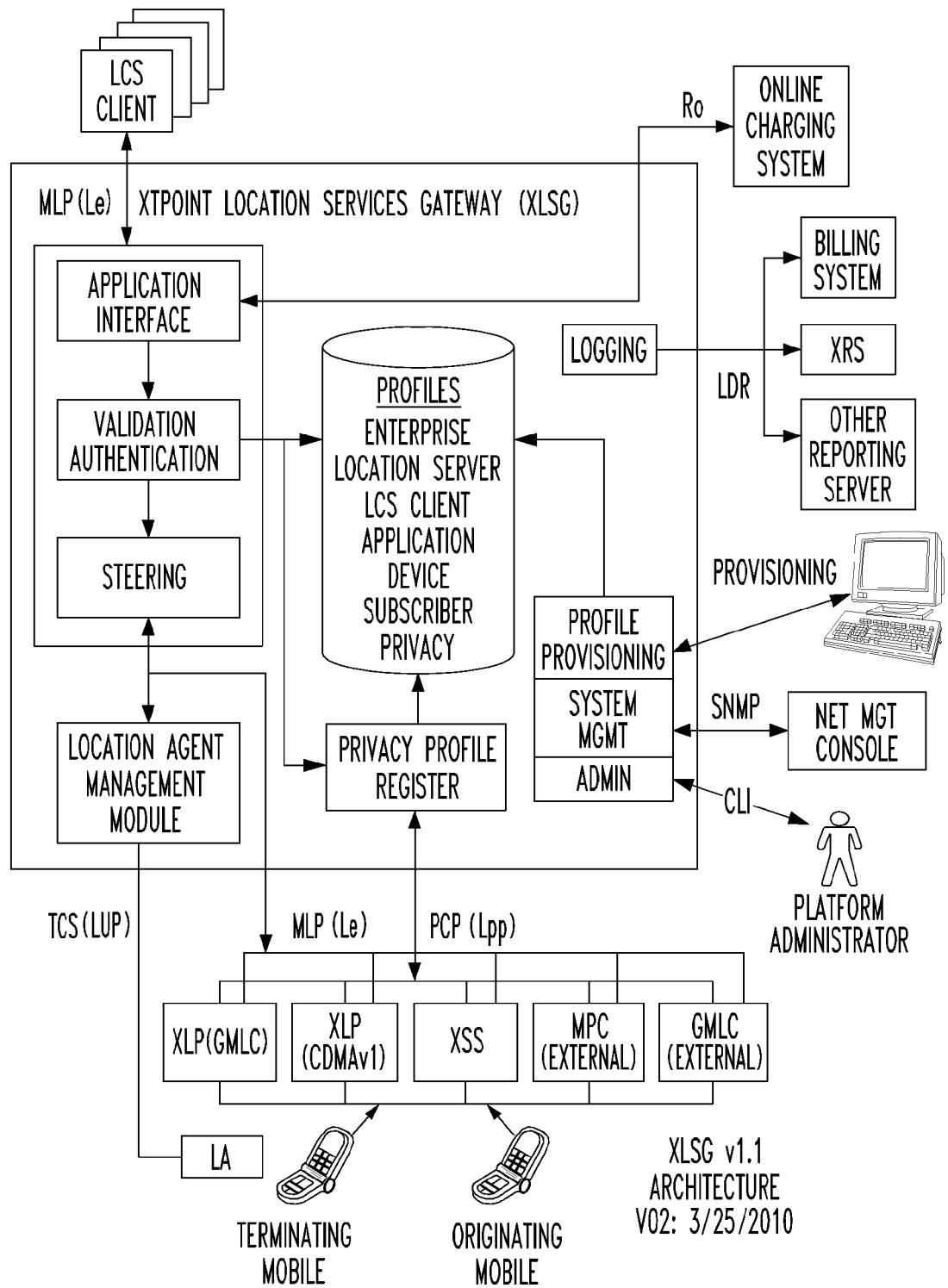
FIG. 1 shows an exemplary XLSG system architecture drawing, including other systems that interface to the XLSG, in accordance with the principles of the present invention.

FIG. 1 shows an exemplary XLSG system architecture drawing, including other systems that interface to the XLSG, in accordance with the principles of the present invention.

In particular, a purpose of the XLSG is to provide access control to location information that is available via the mobile network and to provide that information as needed. For example there may be Location Based Services (LBS) that provide value added functions using locations of mobiles; since location information can be very sensitive the XLSG provides a set of configurable access controls to allow the users and systems to control the distribution of that location information.

As used in this description, the term "location server" (LS) is defined as a software and/or hardware entity offering location capabilities such as the TCS XLP. The term "LCS client" is a software and/or hardware entity that interacts with an XLSG for the purpose of obtaining location information for one or more mobiles by sending an MLP request to the XLSG. LCS Clients may or may not interact with human users. The LCS Client may be external to the carrier network or reside on the mobile. The term "subscriber" is a person who is the user of the mobile or the person who has the mobile account with the carrier.

The term "user" is used generically or preceded with some qualifier such as "LCS Client user" or "XLSG user" as needed.

This XLSG is described with reference to two primary functions (or use cases): 1. LCS Client originated location request; and 2. Privacy evaluation.

Figure 2:
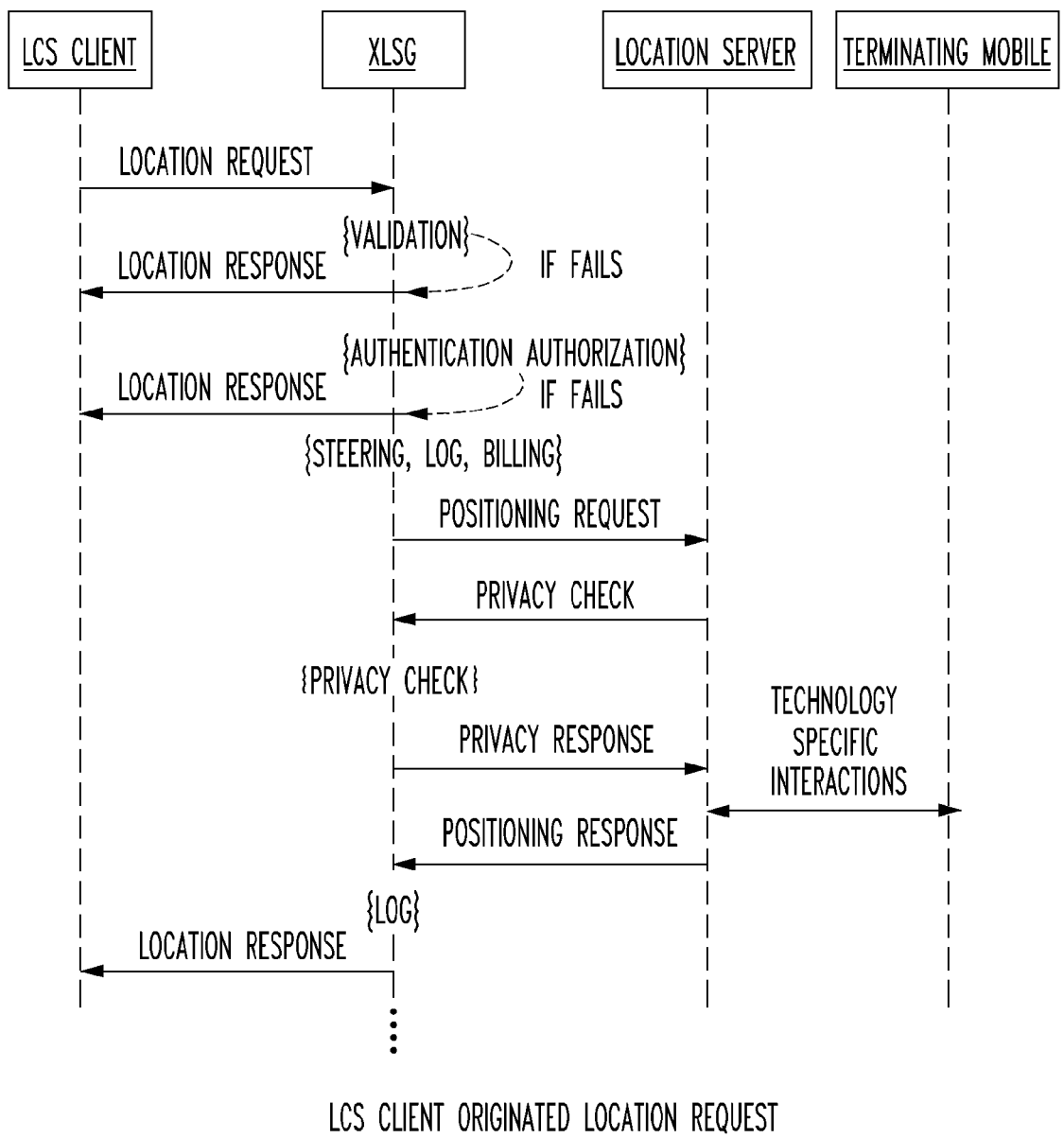
FIG. 2 shows exemplary message flow for an LCS Client originated location request, in accordance with the principles of the present invention.

FIG. 2 shows exemplary message flow for an LCS Client originated location request, in accordance with the principles of the present invention.

In particular, as shown in FIG. 2, an LCS Client initiates a location request to the XLSG for a device location using a technology dependent protocol. In v1.1 of the XLSG, the supported protocol is MLP. In this use case, the XLSG first authenticate the LCS Client, validate the format and content of the request, check LCS Client authorizations, assert charges to the OCS for prepaid subscribers, and then steer the location request to the appropriate Location Server. Privacy evaluation is then accomplished for the system when the LS requests Privacy evaluation from the XLSG via the privacy interface. Selection of an appropriate location server is via the Steering function. There is no location cache in the XLSG. The XLSG expects the LS to reply with either the location of the mobile device or an error indicating the nature of the failure to locate the mobile device.

All message interactions with the LCS Client and interactions with the LS are logged as TDRs and then aggregated into location transactions as LDRs to support billing and reporting functions.

Figure 3:
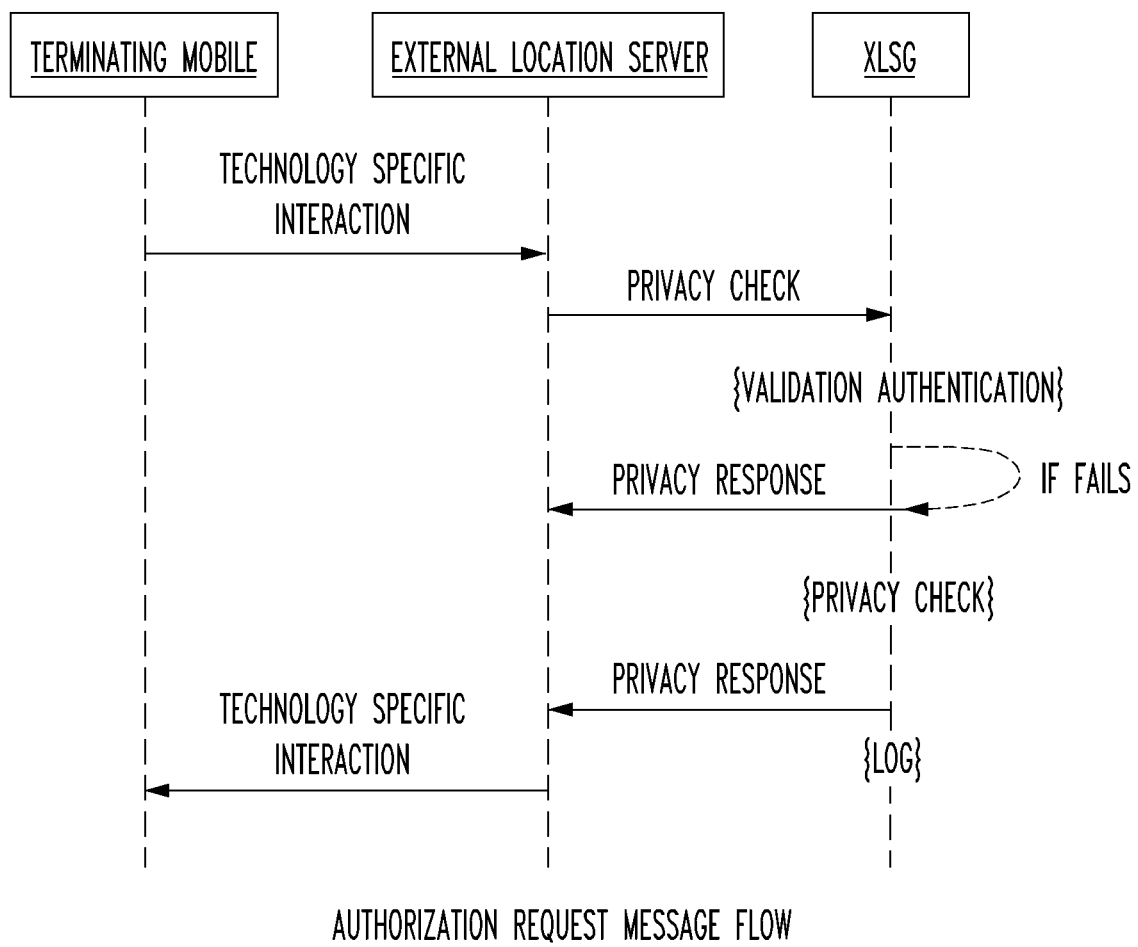
FIG. 3 shows exemplary message flow for privacy evaluation, or authorization request message flow, in accordance with the principles of the present invention.

FIG. 3 shows exemplary message flow for privacy evaluation, or authorization request message flow, in accordance with the principles of the present invention.

In particular, as shown in FIG. 3, an external location server requests a Privacy Check that it can complete a request to provide a target subscriber's location. An external location server does not expect a location to be returned from the XLSG. Responses would be yes, no, or notification & consent required.

All Privacy Check requests are logged to facilitate postpaid billing and for prepaid customers there is a real time exchange with the OCS to assert a charge.

Devices or applications within a carrier network may initiate location requests which result in either of the above use cases. Depending on the originator and the target, the mobile may have an LCS Client and in this scenario the processing for the XLSG is considered a Mobile Terminated location request. A Mobile Originated (MO) location request is a "where am I" request from a mobile device that is used by the device to attain service(s) near the device's location.

Authentication is the process of confirming that the identity of an LCS Client by verifying the ID and password in a location request are identical to the ID and password in the LCS Client Profile. Authorization is the process of allowing access to locations only to those entities permitted to access them within the constraints defined in profiles.

The XLSG implements a set of profiles about system entities that form the basis for the access control rules of the XLSG. These entities include the Enterprise (carrier), Online Charging, System (OCS), Charging, Location Servers, LCS Clients, Applications, Charging Trigger, and Steering Profile. Device, Subscriber, and Privacy. In order to fulfill its access control rules, the XLSG requires data about each of these entities. For example, the Subscriber and Privacy profiles provide a set of options that define the access rules to its own location information, the device used by the subscriber, and network(s) on which the subscriber is provisioned. The device profile contains the characteristics of the device such as the types of networks that the device can utilize and, for multiple network devices, the order of preference for accessing the supported networks. The Enterprise Profile includes information such as the types of Location Servers belonging to the carrier and rules for steering requests to those location servers. The OCS and Charging profiles define the parameters and billing systems needed for real-time processing for prepaid subscribers. Each of the relevant entities are defined in the XLSG as a Profile and managed through the provisioning interface.

The XLSG utilizes information it receives in Location Requests and validates it according to the message specifications in the Mobile Location Protocol (MLP) and authenticates the requesting LCS Client. It then selects a location server and "steers" the request to that location server. LS selection is according to provisioned steering rules such as device type, application type, or request type. If more than one steering rule is provisioned they are evaluated according to a predefined precedence. The LS then requests a privacy authorization from the XLSG which evaluates it against the profile using business rules to determine if the Location Request should be authorized. If the request is authorized, the response to the location server causes the LS to continue the request which may include interactions with other location servers for roaming mobiles.

The XLSG may reside within a carrier with one or more wireless networks or may be in a standalone or hosted environment where it serves multiple carriers.

The exemplary XLSG implements the following external interfaces: LCS Client; Location Server; Privacy Interface; Location Agent Interface; Provisioning Interface; Online Charging System (OCS) Interface; Reporting Service/Logging Interface; system management; and administration.

LCS Client: This is an MLP interface for LBS applications to request the location of one of more mobile devices. The XLSG implements the Standard Location Immediate Service, the Emergency Location Immediate Service, and the Triggered Location Reporting Service from the MLP specification; the Standard and Emergency Reporting services are not supported in v1.1 of the XLSG. The XLSG preferably supports at least MLP versions 3.0 through 3.3.

Location Server: The LS provides location information to the XLSG over MLP for the XLSG to return to LCS Clients. After the XLSG completes the validation and authentication functions it uses MLP to request location information from the LS. The XLSG preferably supports at least MLP versions 3.0 through 3.3.

Privacy Interface: This interface provides a means for an LS or other external application to gain authorization for location requests. Privacy is supported both for Applications and Subscriber-to-Subscriber location requests.

Location Agent Interface: The Location Agent interface is between the Location Agent Manager (LAMM) function in the XLSG and a function executing on a mobile device called the Location Agent (LA). The LAMM forwards immediate and triggered requests to the LA which returns with locations. The LA obtains locations from onboard GPS or through interactions with location services.

Provisioning: The provisioning interface provides the capability to define the Enterprise (carrier), OCS, Charging, Location Server, LCS Client, Application, Device, Subscriber, Privacy profiles, Charging Trigger, and Steering Profile. These profiles are the core data set from which the XLSG makes access control decisions. The XLSG provides a web-based interface for XLSG users to access provisioning functions. Users include Subscribers to manage their privacy settings and carrier personnel such as customer care people. Subscribers can access privacy settings via the browser on their mobile device. A batch provisioning interface allows carriers to accomplish bulk provisioning for large quantities of data available in their other systems. The API also allows a carrier to integrate the management of XLSG Subscriber profiles into their nominal customer web site. Each carrier has a separate logical provisioning interface.

All provisioning access is secure and logged. The provisioning interface implements controls to ensure each request is associated with a role. These roles include: Product Operations, Service Representative Provisioning, and Subscriber Self-Provisioning. Each role is constrained to access specific profiles or portions of profiles.

Online Charging System (OCS) Interface: The OCS interface implements the 3GPP Ro protocol to an Online Changing System (OCS) to check subscriber's status, credit and apply charging. The XLSG sends Credit Control Request messages to the OCS for target subscribers on prepaid billing plans (provisioned) and for the request types provisioned in the Charging Trigger profiles. The response from the OCS indicates the results. Charges are asserted in real time for prepaid subscribers for the SLIS and TLRS MLP services and also for privacy requests.

Xypoint Reporting Service (XRS)/Logging Interface: The XRS is the reporting engine for reports about XLSG functions and operations. The XLSG has an FTP server to make the data available to the XRS which then uses that data to provide static and dynamic reports to users. Data output to the XRS include logs, metrics, and LDRs. This interface also serves the "postpaid" billing system where the system can retrieve LDRs via FTP.

System Management: The XLSG provides a System Management interface which supports integration with the carrier's network management system (NMS), implements traps to alert the NMS of certain error and fault conditions and queries to provide metrics. The traps report conditions not only about the XLSG application, but also the underlying OS and HW.

Admin: The XLSG provides a Command Line Interface (CLI) that is used by a Platform Administrator for system management of the XLSG such as start/stop subsystems, or interrogate detailed status information of interest.

The XLSG maintains transaction status as needed, supports 3 levels of request priority (normal, high and emergency), and implements a set of logs for recording transaction events and report metrics on activities.

The XLSG is configurable at deployment time to enable or disable certain major functions. The functions that can be configured include the Privacy interface, the LAMM, and the Application Interface.

The XLSG acts as a location broker and access gateway by allowing LCS Clients to obtain locations of subscribers across various carriers, networks, and location technologies. It executes on a commercial OS distribution consistent with a common platform definition. The XLSG provides for multi-carrier/multi enterprise definitions and routing on a single platform.

The XLSG supports deployment of a single wireless carrier on a single hardware platform, and also supports deployment of multiple wireless carriers on a single hardware platform. The XLSG supports deployment of multiple wireless carriers on a single hardware platform using virtualization technology if the capacity of each instance of the XLSG program is 20 Transactions Per Second (TPS) or less. The XLSG preferably uses the MySQLStandard edition software for database functions. The XLSG preferably supports the Solaris version 10 or higher operating system, and allows LCS Clients to obtain location of Subscribers utilizing various carriers, networks, and location technologies.

The XLSG preferably provides the capability to localize the Subscriber User Interface to a local language, though only the subscriber graphical user interface (GUI) need have localization capability; all other parts of the XLSG may be in a given language, e.g., English.

There are 2 main location request uses cases that the XLSG supports: 1. LCS Client originated location request; and 2. Privacy request, though additional use cases are documented.

The general concept for real time billing requirements for prepaid subscribers is that the XLSG must communicate with an Online Charging System (OCS) to bill for location services. For subscribers who are not prepaid billing is accomplished offline via LDRs. However for prepaid subscribers the XLSG must ensure that charges are asserted at the time the location service is accomplished.

The XLSG performs the prepaid billing function for the Standard Location Immediate Service, the Triggered service, and for Privacy checks according to the Charging Trigger profile.

The XSLG does not implement specific charge amounts, but uses a set of identifiers from the received location request to determine the charging group. So for example an application sending a SLIR have a specific rating code based on the received client ID, QoS etc.

This section describes general MLP message processing requirements that are general across all 3 types of MLP location services. They are defined here if the requirement is broad across all the service types or are independent of service type. In addition to avoid repetitive requirements for individual MLP service types, some requirements are defined here if they are obviously applicable to each service type and can be worded accordingly.

The system preferably supports accepting MLP Network Initiated message location requests from multiple LCS Clients. The XLSG also provides three levels of priority processing for all messages associated with location requests including NORMAL, HIGH, and EMERGENCY listed from lowest priority to highest priority. The XLSG processes higher priority events before lower priority events according to the priorities defined in the following Table 1.

The XLSG ensures that the processing of location requests and authorization requests are independent for each Enterprise and the processing for one carrier is not delayed by the processing for another carrier. Priority processing is implemented in all XLSG queues and other processing sections where priority preference can be accommodated. The XLSG sends a message with a return of an error code MLP.SERVICE NOT SUPPORTED if the body message type in an MLP request is anything other than SLIR, EME_LIR, TLRR, or TLRSR.

The XLSG validates that an MLP message contains a body element in the message. The XLSG responds with HTTP.METHOD_NOT_ALLOWED error response upon receipt of any message from an LCS Client without a body element. The XLSG transmits a HTTP.BAD_REQUEST error response if the received message is unrecognizable. The XLSG transmits a HTTP.BAD_REQUEST error response if the received message cannot be correctly parsed. Preferably, though not necessarily, the system supports assigning each LCS Client their own URL. The system supports each LCS Client submitting HTTP and HTTPs requests.

The XLSG preferably has a function that verifies and responds to LCS Clients depending on which functions are enabled or disabled via the XLSG configuration capabilities.

If the transactions per second for LCS Client requests exceeds the configured maximum TPS (TPS is equivalent to location request sessions) then the XLSG preferably responds to location requests with the MLP.CONGESTION IN MOBILE NETWORK error code, a transaction being defined as the processing beginning with receipt of the first request message and ending when the service is complete for the SLIS, ELIS, and TLS services. Note: TPS measurements are across all Enterprises and all LCS Clients. There is no concept of allocating TPS requirements to individual Enterprises or LCS Clients.

Application Interface Module (AIM)

FIG. 3 shows exemplary message flow for privacy evaluation, or authorization request message flow, in accordance with the principles of the present invention.

Figure 4:
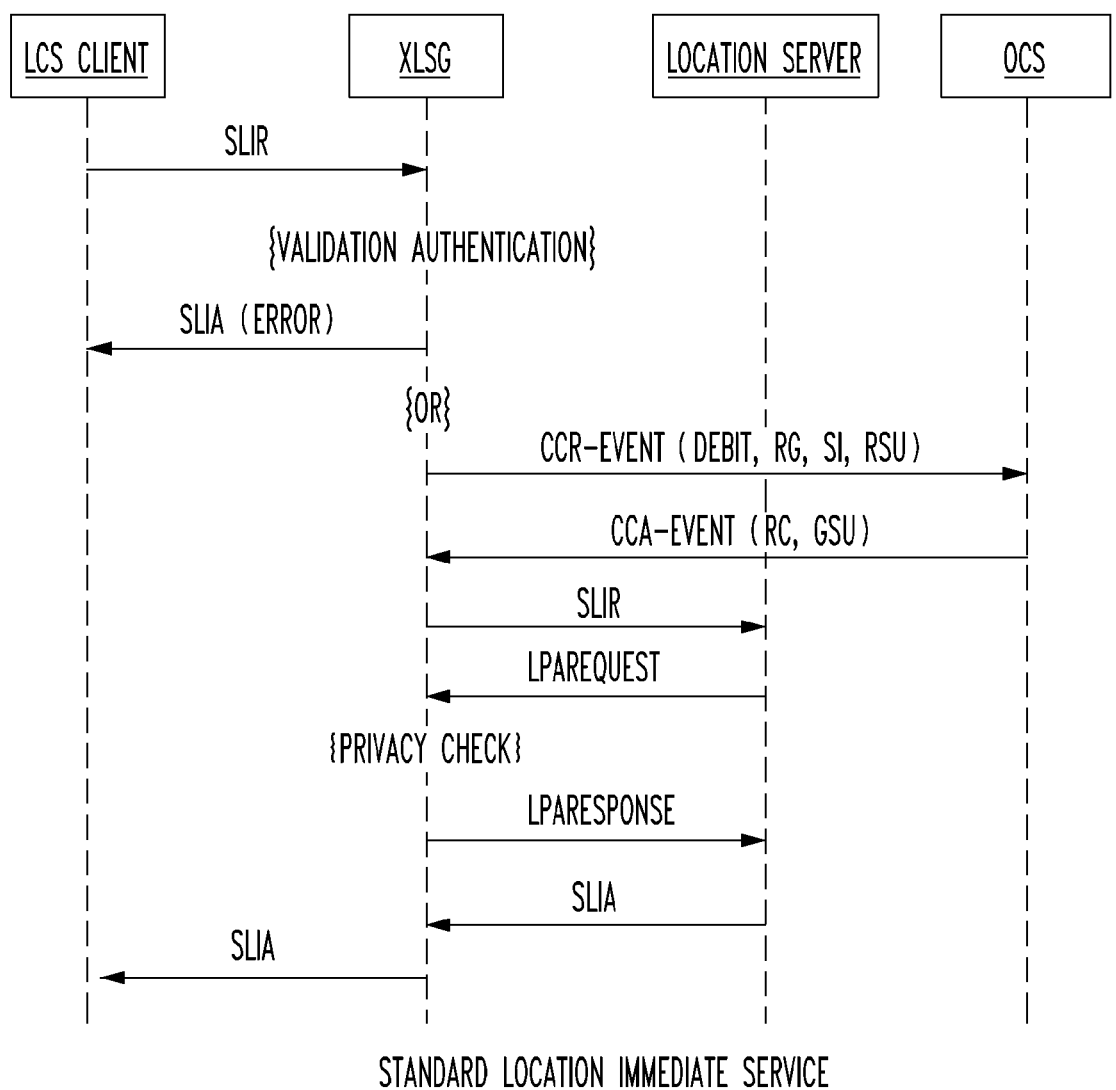

In particular, as shown in FIG. 4, an LCS Client originated request is implemented in the XLSG using either the Standard Location Immediate Service (SLIS), the Emergency Location Immediate Service (ELIS), or Triggered Location Reporting Service (TLRS).

The XLSG supports both the synchronous and asynchronous service types. The sequence begins when the XLSG receives the Standard Location Immediate Request (SLIR) from an LCS Client. The XLSG validates the SLIR and if the charging party is prepaid and SLIR is set in the Charging Trigger profile it outputs the credit control message exchange to the OCS. It then steers the SLIR to the appropriate LS. The LS in turn may send messages to the XLSG privacy interface for authorization. The XLSG waits for the LS to respond with a Standard Location Immediate Answer (SLIA), or identifies the absence of a response (timeout), and then transmits a SLIA back to the LCS Client. If the requested services was ASYNC, then the XLSG forwards each received and validated .SLIREP message to the requesting LCS Client The Application Interface Function supports connectivity from multiple LCS Clients each submitting Location Requests. The function verifies the SLIR is valid, that the LCS Client is authenticated, and prepares the SLIR for steering to the selected location server.

Figure 5:
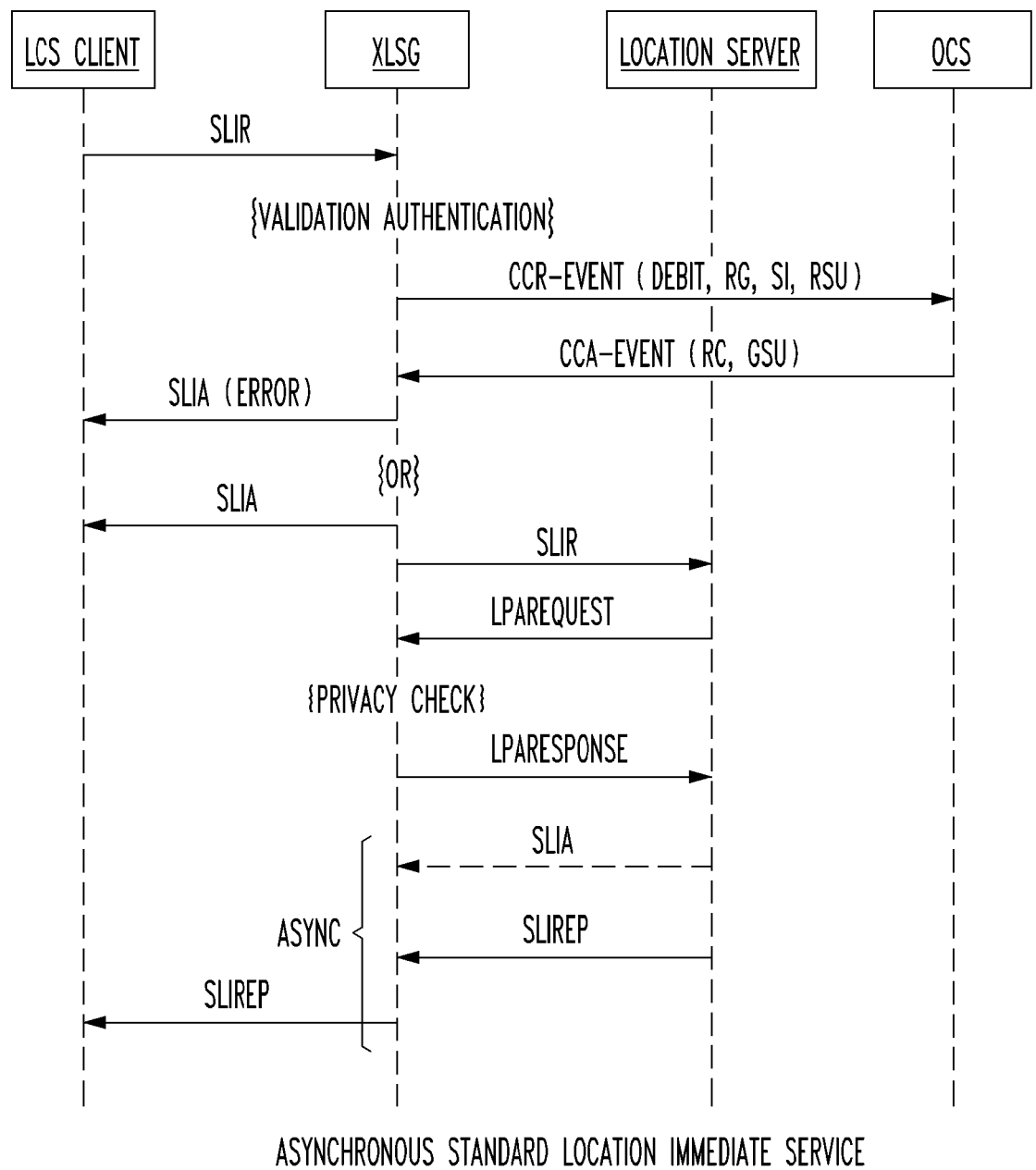
FIG. 5 shows exemplary call flow for the Asynchronous service, in accordance with the principles of the present invention.

FIG. 5 shows exemplary call flow for the Asynchronous service, in accordance with the principles of the present invention.

In particular, as shown in FIG. 5, an Asynchronous SLIR request has the element res_type set to ASYNC. In this scenario the XLSG first receives an SLIA message from the location server followed by one or more SLIREP messages from location servers. The SLIREP messages are forwarded to the requesting LCS Client.

Batch requests are defined as an SLIR that has multiple msid elements or an msid range in the request. The SLIR is validated and then decomposed into individual SLIR requests for each misd which are in turn sent to location servers via the steering function. For synchronous batch requests the XLSG then tracks the SLIA responses from each location server and assembles the position elements from those SLIA responses into a single SLIA which is transmitted back to the LCS Client. The XLSG sets a timeout to await those SLIA responses and if any are missing the XLSG creates a pos element for the missing SLIA with an error code. If any SLIA messages are received from a location server after the assembled SLIA is sent to the LCS Client, they are discarded.

For ASYNC requests the XLSG creates an SLIA and transmits it back to the LCS Client. As in the MLP protocol the XLSG in turn receives SLIA messages from more than one location server. If the received SLIA has no error, then it is discarded. If the SLIA from the location server has an error, then the XLSG creates a SLIREP message and sends it to the corresponding LCS Client with the error code received in the SLIA. All received SLIREP messages are simply forwarded to the LCS Client.

Figure 6:
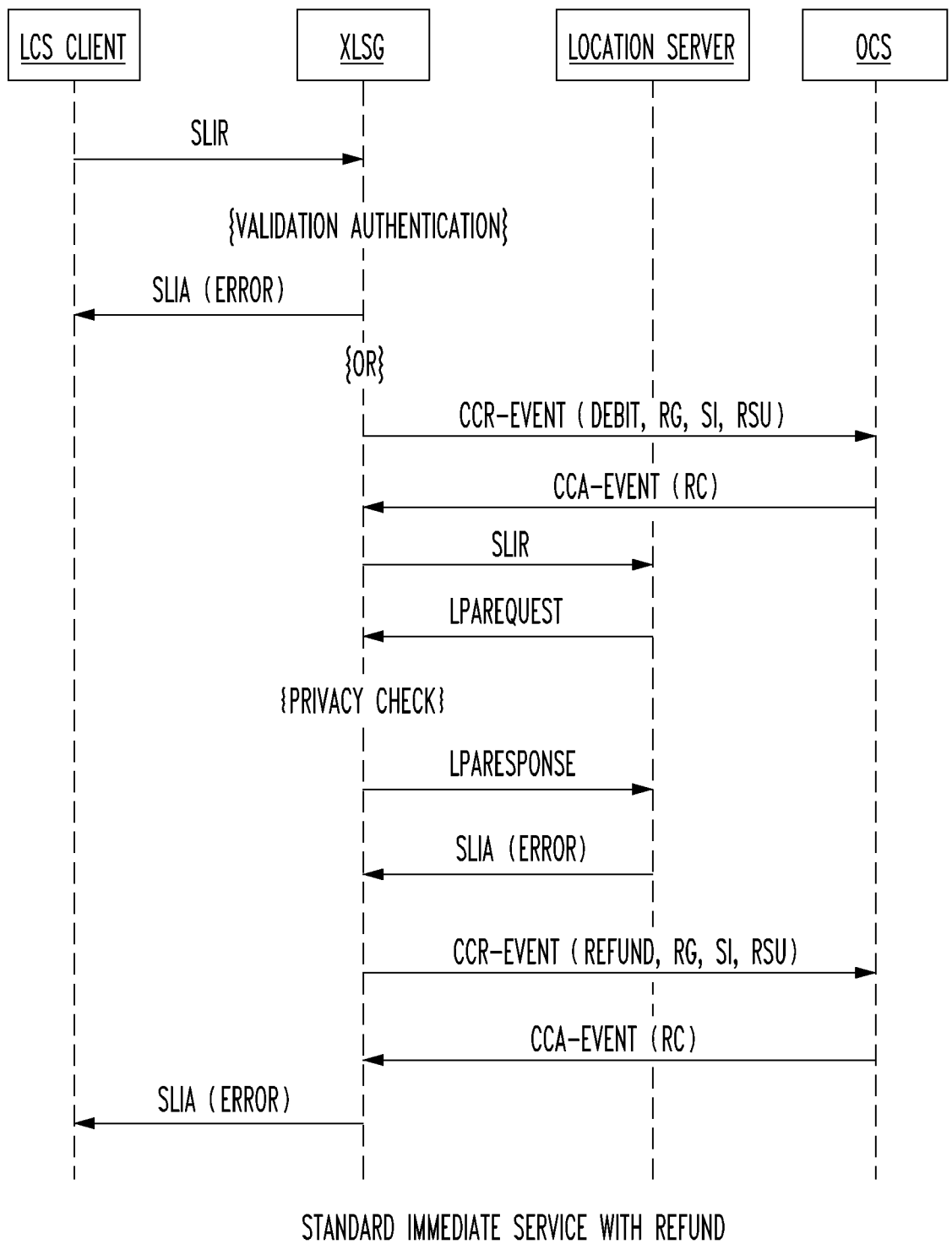
FIG. 6 shows a standard immediate service with refund, in accordance with the principles of the present invention.

FIG. 6 shows a standard immediate service with refund, in accordance with the principles of the present invention.

In particular, as shown in FIG. 6, the charging events for the SLIS service occur during the SLIR processing and SLIA processing. For a non-batch SLIS without error the XLSG asserts a charge to the OCS during the SLIR processing. If subsequent SLIA processing results in an error, then the XLSG sends a CCR message to the OCS for a refund. For asynchronous SLIS service, the XLSG asserts a charge for the SLIR. For batch requests the XSLG checks each "target" msid and Requestor in the SLIR based on the Charging Entity to see if it is prepaid, and then sends CCR messages for each msid that is prepaid with the corresponding msid as changing entity if the Charging Entity was identified as "Target". If the requestor element is present in the SLIR and is prepaid and the Charging Entity is Requestor, then the XSLG sends a CCR message for each msid in the batch request with Requestor ID as changing entity.

The system preferably provides an SLIR validation function. The XLSG validates that the syntax and format of the SLIR is conforming. The XLSG preferably ignores an unsupported parameter and continues processing the received SLIR as if the unsupported parameter was not in the message.

The XLSG preferably validates that the msid.enc parameter is "ASC"; and validates that the msid.type parameter in the SLIR is an msid type supported by the Enterprise. For batch requests the XLSG preferably validates all msid parameters contained within the received SLIR. For batch requests the XLSG verifies that the number of msids does not exceed the maximum batch requests provisioned for the Enterprise. The system preferably provides an LCS Client authentication function to manage the connections to the LCS Clients submitting location requests. The XLSG authenticates the LCS client using the id field of the client portion of the SLIR to ensure it matches the id that is provisioned for the LCS Client.

If the "LCS Client Pwd Required" in the LCS Client profile is set to true, then the XLSG authenticate the LCS client using the pwd field of the client portion of the SLIR to ensure it matches the password that is provisioned for the LCS Client.

If the seviceid element is present in the SLIR the XLSG authenticates the Application using the client.serviceid field of the hdr of the SLIR to ensure it matches the application identifier that was provisioned for an Application associated with the LCS Client. The XLSG rejects the location request with "Unauthorized Application" if the prio parameter is set to HIGH and the maximum priority that is provisioned for the LCS Client is Normal.

The XLSG verifies that the LCS Client and Application are authorized to request the SLIS service as defined in the LCS Client and Application Profiles. For Asynchronous requests the XLSG sends an SLIA to the requesting LCS Client.

The XLSG provides a function to assert charges for subscribers designated as prepaid billing plan for the Standard Location Immediate Service.

If the Application profile indicates that the target Subscriber is the Charging Party, SLIR is set in the Charging Trigger profile, and the target Subscriber is prepaid and, then the CCR message is sent to OCS with the Subscriber-Id AVP in the Credit Control Request (CCR) message populated with target Subscriber (MSISDN or IMSI). If the Application profile indicates that the Requestor is the Charging Party, SLIR is set in the Charging Trigger profile, and the requestor element is present in the SLIR, and the Requestor is prepaid, then the CCR message is sent to OCS with the Subscriber-Id AVP in the CCR message populated with Requestor MSISDN or IMSI.

For SLIR the XSLG sends the CCR with a Rating Group AVP based on the information in the received message and other corresponding AVPs as in the Charging Profile.

Upon receipt of the Credit Control Answer (CCA) message from the OCS the XLSG verifies that the DIAMETER_SUCCESS (2001) Result-Code and Granted Service Unit are in the CCA message.

The XLSG verifies that the CCA messages is received within the time period defined by the configured Tx timer.

The XLSG provides a function to handle each msid in a batch request individually for steering to a selected location server.

The XLSG decomposes a batch SLIR request into individual SLIR requests that are sent to Location Servers. Each individual SLIR for a batch request includes the eqop, geo_info, func, pushaddr, and service_coverage elements from the received SLIR if present in the received SLIR.

If the Application profile indicates the charging entity is "Target", the XLSG checks the subscriber profile of each msid in the batch request if the target Subscriber is prepaid. If SLIR is set in the Charging Trigger profile, then the XLSG sends a CCR message to OCS with the Subscriber-Id AVP in the CCR message populated with target Subscriber MSISDN or IMSI for each of the prepaid msids.

If the Application profile indicates that the Requester is the Charging Party, the requestor element is present in the batch SLIR, the requestor is prepaid, SLIR is set in the Charging Trigger profile then the XLSG outputs as many CCR message as there are msids in the batch request with the Subscriber-Id AVP in the CCR message populated with requestor MSISDN or IMSI.

For synchronous SLIR requests the XLSG processes and assembles SLIA responses from the location servers. The XLSG provides a function for receiving and processing the SLIA from Location Servers.

For a batch, Synchronous requests the XLSG verifies that the SLIA from the LS contains the same number of pos parameters as the number of msids sent to the LS.

The XLSG verifies that the LS responds with a SLIA within the time specified by eqop.resp_timer or the default timer in the Enterprise profile.

For synchronous batch requests the XLSG creates a single SLIA from all the SLIAs received from location servers corresponding to the msids in the original SLIR request.

For synchronous batch requests the XLSG creates a pos element with result code MLP. SYSTEM FAILURE in the created "batch SLIA" for all msids for which a SLIA was not received from the location server for each of those msids.

For Synchronous batch requests if an SLIA is received from a location server after the "batch SLIA" was transmitted to the LCS Client the XLSG discards the SLIA received from the LS.

For ASYNC batch requests if the XLSG receives an SLIA with an error code after the XLSG had previously transmitted a SLIA to the LCS Client the XLSG creates a SLIREP message with the same error code and sends it to the LCS Client.

If the received SLIA indicates an error, and charge was applied to this transaction, then the XLSG sends a CCR message with Refund populated in Requested-Action AVP.

The XLSG transmits an SLIA received from the LS to the LCS Client with all same parameters received in the SLIA. The XLSG provides a function for receiving and processing the SLIREP from Location Servers.

The XLSG verifies that the req_id element in the received SLIPREP message is for an active location service request.

If the CCR/CCA exchange invoked by SLIR indicates it was a charged event, and correlated SLIREP was not successfully received, then XLSG sends a CCR message with Refund populated in Requested-Action AVP."

The XLSG preferably transmits a SLIREP received from the LS to the LCS Client with all same parameters received in the SLIREP.

Unsuccessful Scenarios

For detected errors, the XLSG may include the add_info parameter to SLIA messages containing an error code with descriptive text clarifying the reason for the error code.

The XLSG provides a function to respond to the LCS Client for invalid received messages.

The XLSG transmits a HTTP.BAD_REQUEST error response if the received message is unrecognizable or cannot be correctly parsed.

The XLSG sends an SLIA with an error code MLP.SYNTAX ERROR if the received message has a syntax error as defined by the XML DTD.

The XLSG sends an SLIA with an error code MLP.FORMAT ERROR if the message has an invalid format as defined by the XML DTD.

The XLSG provides a function to respond to the LCS Client for SLIR validation failures.

The XLSG sends an SLIA with an error code MLP.

The XLSG sends an SLIA with an error code MLP.FORMAT ERROR to the LCS Client if the received message does not contain a body.

The XLSG sends an SLIA with an error code MLP. SERVICE NOT SUPPORTED to the LCS Client if the received message does not have the msid.enc parameter as "ASC".

The XLSG sends an SLIA with an error code MLP. PROTOCOL ELEMENT ATTRIBUTE NOT SUPPORTED to the LCS Client if the msid.type parameter of a SLIR is not supported by the Enterprise.

The XLSG sends an SLIA with error code MLP.TOO MANY POSITION ITEMS to the LCS client if the number of msid parameters in the SLIR exceeds the maximum batch requests provisioned for the Enterprise.

The XLSG provides a function to respond to the LCS Client for SLIR authentication failures.

The XLSG sends an SLIA with an error code MLP.UNAUTHORIZED_APPLICATION to the LCS Client if the LCS client is not authenticated.

The XLSG sends an SLIA with an error code MLP.UNAUTHORIZED_APPLICATION to the LCS Client if the Application is not authenticated.

If online charging was invoked for SLIS service and the OCS server responds to a CCA message with a result-code other than Succeeded the XLSG send an SLIA to the LCS Client with the error code MLP.UNSPECIFIED ERROR and add_info field as defined in Table 22.

If online charging was invoked for SLIS service and the XLSG does not receive the CCA message from the OCS server within the time defined by the OCS Response Timer, then the XLSG sends an SLIA to the LCS Client with error code MLP.UNSPECIFIED ERROR with the add_info field as defined in Table 22.

The XLSG provides a function to respond to the LCS Client for Location Server problems.

The XLSG sends an SLIA for Synchronous SLIS or the SLIREP for Asynchronous SLIS with an error code MLP.SYSTEM FAILURE to the LCS Client if an LS is not available.

The XLSG sends an SLIA for Synchronous SLIS or the SLIREP for Asynchronous SLIS to the LCS Client with error code MLP. SYSTEM FAILURE if no response is received from the LS within the time specified by eqop.resp_timer or the "Default response timer" specified in the Enterprise profile.

The XLSG sends either an SLIA for Synchronous SLIS or the SLIREP for Asynchronous SLIS to the LCS Client with error code MLP. SYSTEM FAILURE if no response is received from the LS within the time specified by eqop.resp_timer or the "Default response timer" specified in the Enterprise profile.

The XLSG does not identify the absence (timeout) of SLIREP messages. This function is considered application level error handling for the LCS Client.

Figure 7:
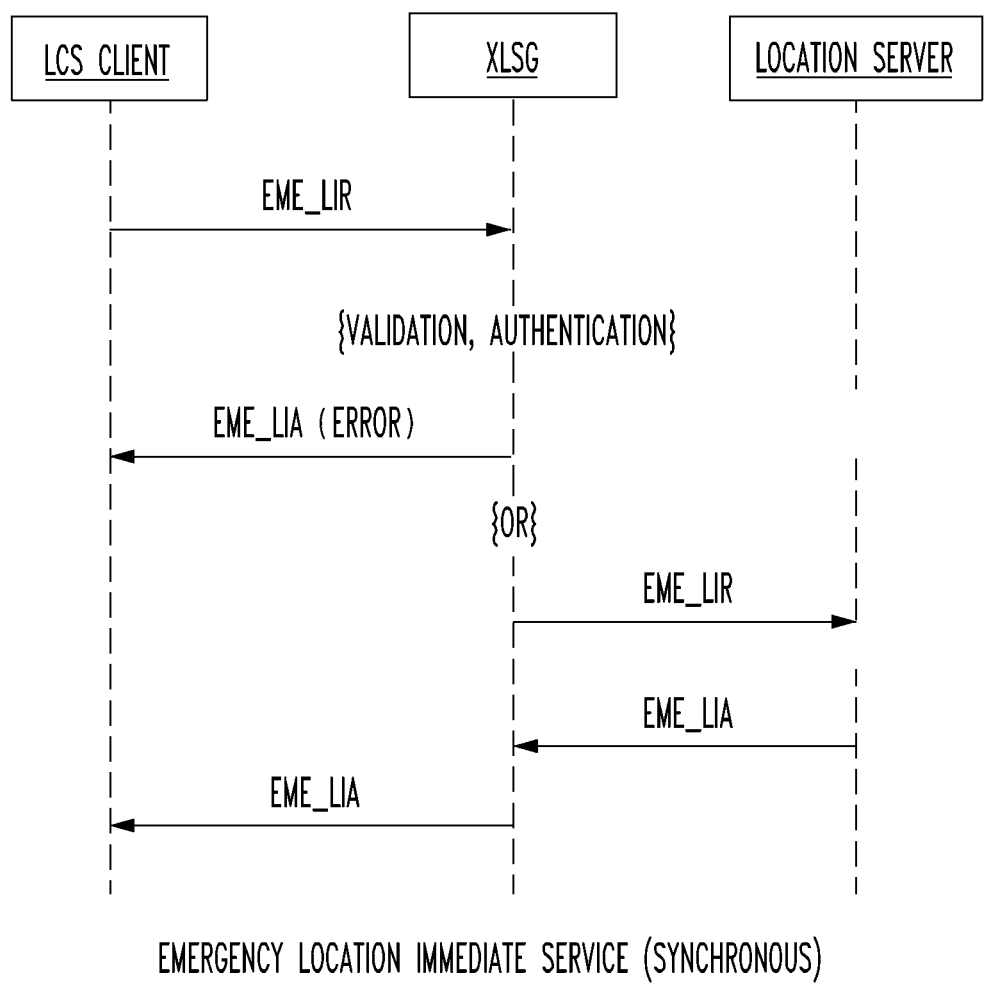
FIG. 7 shows an exemplary message flow for a successful Emergency Location Immediate Service (Synchronous), in accordance with the principles of the present invention.

FIG. 7 shows an exemplary message flow for a successful Emergency Location Immediate Service (Synchronous), in accordance with the principles of the present invention.

In particular, as shown in FIG. 7, the sequence begins when the XLSG receives the Emergency Location Immediate Request (EME_LIR). The XLSG performs a series of validation and authentication checks and then forwards the EME_LIR to the appropriate LS defined by the section on Steering. It waits for the LS to respond with a Emergency Location Immediate Answer (EME_LIA), or identifies the absence of a response, and then transmits a EME_LIA back to the LCS Client.

The processing assumes that an LS process the EME_LIR differently than the LS processes the SLIR. For example it is probable that the LS not perform quality of position checks since this is an emergency service. In any case the processing for the XLSG is almost a complete pass through from LCS Client to the LS other than the validation and authentication requirements listed below.

Emergency services do not include prepaid processing.

The requirements for ELIS include batch requests, Asynchronous request, and Async batch request in the same structure as for the SLIS. There is no prepaid billing processing for ELIS.

Figure 8:
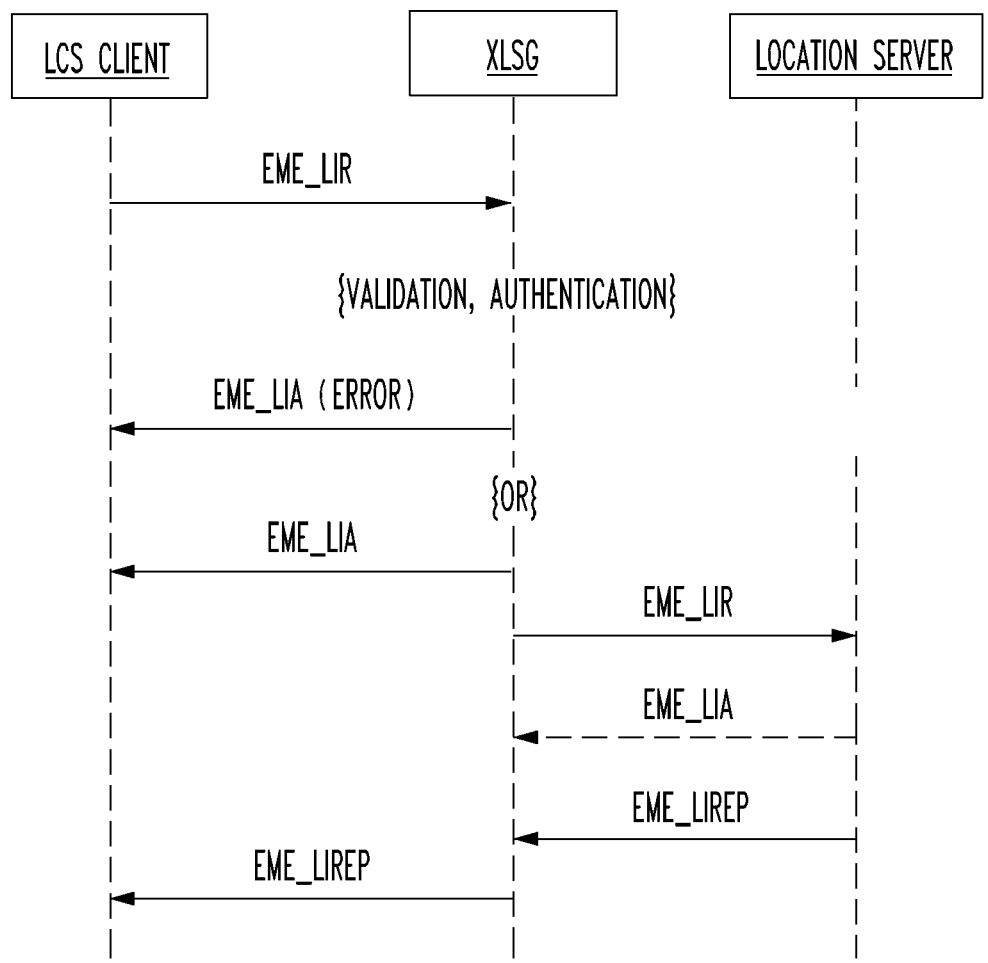
FIG. 8 shows an exemplary message flow for a successful Emergency Location Immediate Service (Asynchronous), in accordance with the principles of the present invention.

FIG. 8 shows an exemplary message flow for a successful Emergency Location Immediate Service (Asynchronous), in accordance with the principles of the present invention.

The system provides an EME_LIR validation function. The XLSG validates that the format of the EME_LIR conforms. The XLSG ignores an unsupported parameter and continue processing the received EME_LIR as if the unsupported parameter was not in the message. The XLSG validates that the msid.enc parameter is "ASC". The XLSG validates that the msid.type parameter in the EME_LIR is an msid type supported by the Enterprise.

For batch requests the XLSG validates all msid parameters contained within the received EME_LIR. For batch requests the XLSG verifies that the number of msids does not exceed the maximum batch requests provisioned for the Enterprise.

The system provides an LCS Client authentication function to manage the connections to the LCS Clients submitting location requests.

The XLSG authenticates the LCS client using the id field of the client portion of the EME_LIR to ensure it matches the id that is provisioned for the LCS Client. If the "LCS Client Pwd Required" in the LCS Client profile is set to true, then the XLSG authenticates the LCS client using the pwd field of the client portion of the EME_LIR to ensure it matches the password that is provisioned for the LCS Client.

The XLSG validates that the LCS client is authorized to request Emergency services, and skip charging process. If the seviceid element is present in the EME_LIR the XLSG authenticates the Application using the client.serviceid field of the hdr of the SLIR to ensure it matches the application identifier that was provisioned for an Application associated with the LCS Client.

The XLSG processes all EME_LIR messages with the EMERGENCY priority for all processing.

The XLSG provides a function to handle each msid in a batch request individually for steering to a selected location server.

The XLSG decomposes a batch EME_LIR request into individual EME_LIR requests that are sent to Location Servers.

Each individual EME_LIR for a batch request includes the eqop, geo_info, loc_type, pushaddr, and MapRequest elements from the received EME_LIR if present in the received EME_LIR.

For ASYNC batch requests, the XLSG creates an EME_LIA message with the same number of eme_pos elements as there were msids in the request and result code MLP.OK for each eme_pos element.

For synchronous EME_LIR requests, the XLSG process and assemble EME_LIA responses from the location servers. The XLSG provides a function for receiving and processing the EME_LIA from Location Servers. The XLSG processes all EME_LIA messages with the EMERGENCY priority for all processing.

For a batch, Synchronous requests the XLSG to verify that the EME_LIA from the LS contains the same number of eme_pos parameters as the number of msids sent to the LS.

The XLSG verifies that the LS has responded with an EME_LIA within the time specified by eqop.resp_timer or the "Default response timer" specified in the Enterprise profile."

For Synchronous batch requests, the XLSG creates a single EME_LIA from all the EME_LIAs received from location servers corresponding to the msids in the original EME_LIR request.

The XLSG creates a pos element with result code MLP.SYSTEM FAILURE in the created "batch EME_LIA" for all msids for which a EME_LIA was not received from the location server.

For Synchronous batch requests, if an EME_LIA is received from a location server after the "batch EME_LIA" was transmitted to the LCS Client, the XLSG discards the EME_LIA received from the LS.

For ASYNC batch requests, if the XLSG receives an EME_LIA with an error code after the XLSG had previously transmitted a EME_LIA to the LCS Client, the XLSG creates an EME_LIREP message with the same error code and sends it to the LCS Client.

The XLSG sends all parameters of the EME_LIA received from the LS to the LCS Client and transmits an EME_LIA to the LCS Client.

The XLSG provides a function for receiving and processing the EME_LIREP from Location Servers. The XLSG verifies that the req_id element in the received EME_LIREP message is for an active location service request. The XLSG transmits an EME_LIREP received from the LS to the LCS Client with all same parameters received in the EME_LIREP.

For unsuccessful scenarios, the following defines exemplary responses and error codes that the XLSG sends in response to the EME_LIR to the LCS Client. The XLSG includes the add_info parameter to all EME_LIA messages containing an error code with descriptive text clarifying the reason for the error code. The XLSG provides a function to respond to the LCS Client for invalid received messages.

The XLSG sends an EME_LIA with an error code MLP.FORMAT ERROR if the message has an invalid format. The XLSG sends an EME_LIA with an error code MLP.SYNTAX ERROR if the received message has a syntax error.

The XLSG provides a function to respond to the LCS Client for EME_LIR validation failures. The XLSG sends an EME_LIA with an error code MLP.SERVICE NOT SUPPORTED to the LCS Client if the received message does not have the msid.enc parameter as "ASC".

The XLSG sends an EME_LIA with an error code MLP.PROTOCOL ELEMENT ATTRIBUTE NOT SUPPORTED to the LCS Client if the msid.type parameter of a EME_LIR is not supported by the Enterprise.

For batch requests, the XLSG sends an EME_LIA with an error code MLP.TOO MANY POSITION ITEMS to the LCS Client if there is more than the number of allowed msids as defined in the Enterprise profile.

The XLSG provides a function to respond to the LCS Client for EME_LIR authentication failures.

The XLSG sends an EME_LIA with an error code MLP.UNAUTHORIZED APPLICATION to the LCS Client if the LCS client is not authenticated.

The XLSG sends an EME_LIA with a return error code MLP.UNAUTHORIZED APPLICATION if the LCS Client is not authorized to request Emergency services.

The XLSG provides a function to respond to the LCS Client for Location Server problems.

The XLSG sends an EME_LIA for Synchronous Emergency Service or the EME_LIREP for Asynchronous Emergency Service with an error code MLP.SYSTEM FAILURE to the LCS Client if an LS is not available.

The XLSG sends an EME_LIA for Synchronous Emergency Service or the EME_LIREP for Asynchronous Emergency Service to the LCS Client with error code MLP. SYSTEM FAILURE if no response is received from the LS within the time specified by eqop.resp_timer or the "Default response timer" specified in the Enterprise profile.

The XLSG does not identify the absence (timeout) of EME_LIREP messages. This function is considered application level error handling for the LCS Client.

Triggered Location Reporting Service

A triggered service is one of 3 types: Periodic; Mobile event; or Change of area.

Periodic: The XLSG sends a location report to the LCS client once for every defined interval time period or in batch mode.

Mobile event: The only defined event is that the mobile becomes available. (ms_action.type=MS_AVAIL)

Change of area: The mobile's location has met certain criteria such as entering or leaving some geographically defined area, for example for a geofencing application.

For the most part the XLSG is the gateway or intermediary for these services. It receives the request from an LCS Client, forwards requests to the location server, and forwards location reports from the LS back to the LCS Client. A triggered request can include all three of these types. The XLSG supports all three in combination in any single triggered request. If any location server doesn't support it, then an error message flow back to the LCS Client.

Figure 9:
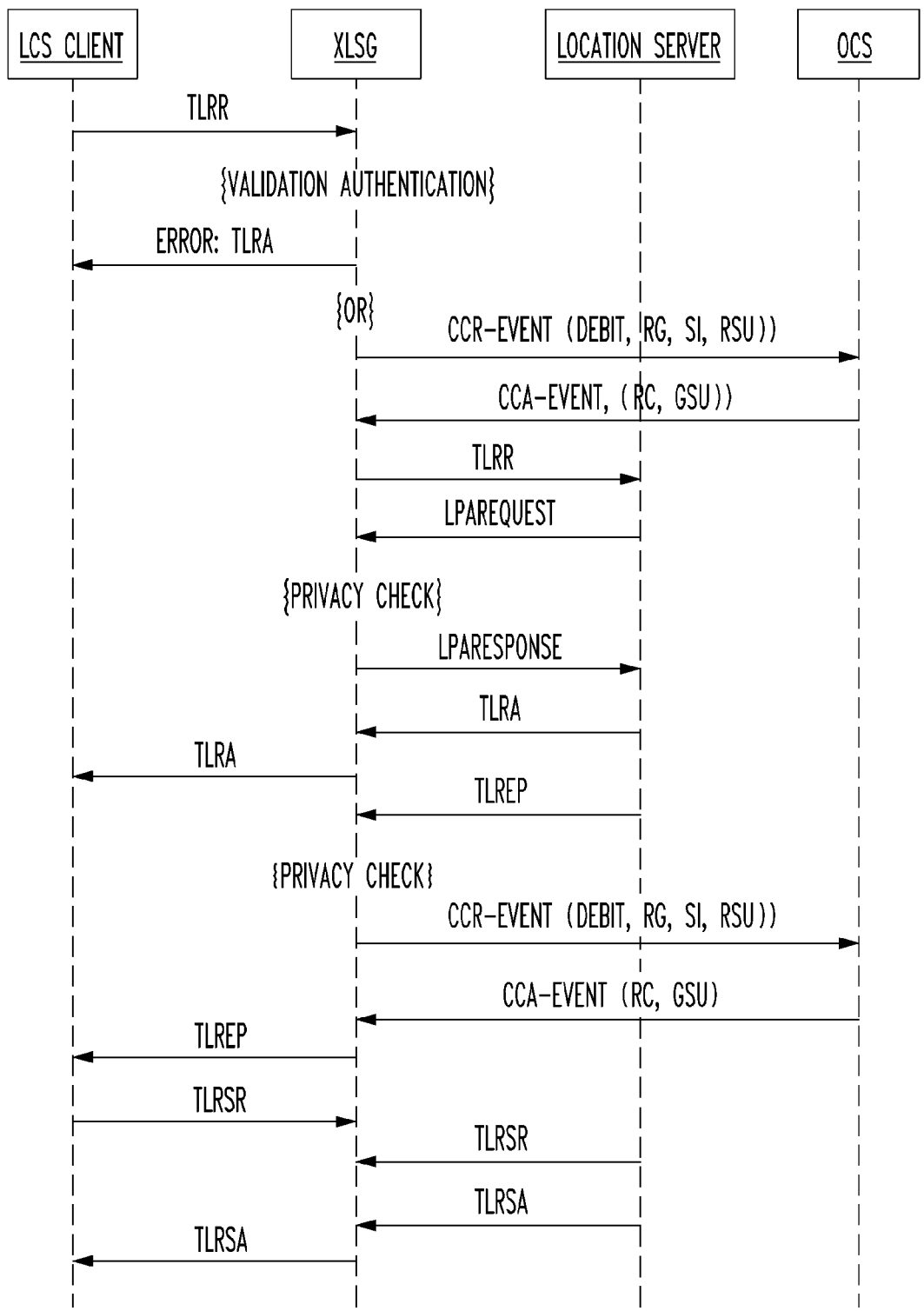
FIG. 9 shows an exemplary message flow for a successful Triggered Location Reporting Service, in accordance with the principles of the present invention.

FIG. 9 shows an exemplary message flow for a successful Triggered Location Reporting Service, in accordance with the principles of the present invention.

In particular, as shown in FIG. 9, the sequence begins when the XLSG receives a Triggered Location Reporting Request (TLRR). The XLSG performs a series of validation and authentication checks, and then forwards the TLRR to the appropriate LS based on steering rules. It waits for the LS to respond with a Triggered Location Reporting Answer (TLRA), or identifies the absence of a response, and then transmits a TLRA back to the LCS Client. This sequence is followed by one or more optional Triggered Location Report (TLREP) and messages to stop the active triggered services. The XLSG supports batch TLRR requests which are split into individual TLRRs for each msid and then sends to location servers based on steering rules. For prepaid subscribers, an exchange with the OCS for billing purposes is performed if the corresponding triggered related message is set in the Charging Trigger profile. For Trigger Location Reporting service, there are two charging models: a Flat Rate model; and a Per Report model.

Flat Rate model: Charging a "flat" rate per TLRR request. This charging model may be appropriate for Mobile Event and Change of Area types. This charging model is active if the corresponding Charging Trigger Profile includes TLRR but not TLREP.

Per Report model: In this model, charging consists of two parts: Trigger Session Initiation (i.e. TLRR) and each of the reports (i.e. TLREP) that were sent back to the requesting client. This charging model is active if the corresponding Charging Trigger Profile includes both TLRR and TLREP.

The XLSG supports a periodic triggered service, an event triggered service, a change of area triggered service, and any combination of these 3 triggered service types in a single TLRR. The XLSG provides a function to validate the Triggered Location Reporting Request.

The XLSG ignores an unsupported parameter and continues processing the received TLRR as if the unsupported parameter was not in the message.

The XLSG verifies that the deployed product is configured to support Triggered services.

The XLSG validates that the msid.enc parameter is "ASC".

The XLSG validates that the msid.type parameter in the TLRR is an msid type supported by the Enterprise.

For batch requests, the XLSG validates all msid parameters contained within the received TLRR.

For batch requests, the XLSG verifies that the number of msids does not exceed the maximum batch requests provisioned for the Enterprise.

The XLSG verifies that either the interval element or the tlrr_event element (or both) are present in the TLRR.

The XLSG verifies that both the stop_time and duration elements are not both present in the TLRR.

The XLSG verifies that both the start_time and stop_time elements are not in the past (older than the current time) and that the start_time is not earlier than the stop_time.

The XLSG validates that the duration parameter does not exceed the "Max trigger periodic duration" provisioned for the Enterprise.

The XLSG provides a function to authenticate the LCS Client requesting the triggered service.

The XLSG authenticates the LCS client using the id field of the client portion of the TLRR to ensure it matches the id that is provisioned for the LCS Client. If the "LCS Client Pwd Required" in the LCS Client profiles is set to true, then the XLSG authenticates the LCS client using the pwd field of the client portion of the TLRR to ensure it matches the password that is provisioned for the LCS Client.

If the seviceid element is present in the TLRR, the XLSG authenticates the Application using the client.serviceid field of the hdr of the TLRR to ensure it matches the application identifier that was provisioned for an Application associated with the LCS Client.

The XLSG verifies that the LCS Client is authorized to request the Triggered Location Service as defined in the LCS Client Profile.

The XLSG rejects the location request with "Unauthorized Application" if the prio parameter is set to HIGH and the maximum priority that is provisioned for the LCS Client is Normal.

The XLSG provides a function to assert charges for subscribers designated as prepaid billing plan for the triggered service.

If the Application profile indicates that the target Subscriber is the Charging Party, the target Subscriber is prepaid and the received message is set in the Charging Trigger profile, then the XLSG performs the charging process defined in Table 2 with the Subscriber-Id AVP in the Credit Control Request (CCR) message populated with target Subscriber MSISDN or IMSI.

If the Application profile indicates that the Requestor is the Charging Party, and the requestor element is present in the TLRR, the Requestor is prepaid, and the received message is set in the Charging Trigger profile, then the XLSG performs the charging process defined in Table 2 with the Subscriber-Id AVP in the CCR message populated with Requestor MSISDN or IMSI.

If the Application profile indicates the charging entity is "Target", the XLSG checks the subscriber profile of each msid in the batch request if the target Subscriber is prepaid. If TLRR is set in the Charging Trigger profile, then the XLSG sends a CCR message to OCS with the Subscriber-Id AVP in the CCR message populated with target Subscriber MSISDN or IMSI for each of the prepaid msids, and follows the charging process specified in Table 2 for each of the msids.

If the Application profile indicates that the Requester is the Charging Party, the requestor element is present in the batch TLRR, the requestor is prepaid, TLRR is set in the Charging Trigger profile then the XLSG sends as many CCR messages as there are msids in the batch request with the Subscriber-Id AVP in the CCR message populated with requestor MSISDN or IMSI, and follows the charging process specified in Table 2 for each of the msids.

The XSLG sends the CCR with a Rating Group AVP based on the information in the received message and other corresponding AVPs as in the Charging Profile.

Charging Trigger Profile includes TLRR but not TLREP; Per Report Charging Model is enabled if the corresponding Charging Trigger Profile includes both TLRR and TLREP.

Upon receipt of the Credit Control Answer (CCA) message from the OCS the XLSG verifies that the DIAMETER SUCCESS (2001) Result-Code and Granted Service Unit are in the CCA message.

The XLSG verifies that the CCA messages is received within the time period defined by the configured Tx timer.

Subsequent processing of the TLRR for non-batch requests is as specified in the Steering function.

The XLSG provides a function to handle each msid in a batch request individually for steering to a selected location server.

The XLSG decomposes a batch TLRR request into individual TLRR requests that are sent to Location Servers.

Each individual TLRR for a batch request includes the interval, start_time, stop_time, duration, tlrr_event, qop, geo_info, pushaddr, loc_type, prio, service_coverage, and MapRequest elements from the received TLRR if present in the received TLRR.

The XLSG creates a TLRA message with a unique req_id and result code MLP.OK and transmits it to the requesting LCS Client. Note: this req_id must be used for all of the TLREP messages for all of the msids in the batch request.

Subsequent processing for each of the TLRRs for batch requests is as specified in the Steering function.

The XLSG provides a function for processing the TLRA received from a location server.

The XLSG verifies that the LS responds with a TLRA within the time specified by the default timer in the Enterprise profile.

For an msid that was not from a batch request, the XLSG transmits a TLRA received from the LS to the LCS Client with all same parameters received in the TLRA. If a received TLRA is for an msid with an active session from a TLRR batch request, and the received TLRA indicated a result code other than MLP.OK, then the XLSG initiates an unsolicited tlrsa message to the corresponding LCS Client. If the received TLRA indicates an error, and the online charging was invoked for the transaction, then the XLSG sends a CCR message with Refund populated in Requested-Action AVP as specified in Table 2.

The XLSG provides a function for processing TLREP messages from Location Servers.

If the TLREP is received from the LS and there is no active triggered session, then the XLSG discards the TLREP.

Upon receipt of the TLREP without error, if the Application profile indicates that the target Subscriber is the Charging Party, the target Subscriber is prepaid, and TLREP is set in the Charging Trigger profile (i.e. Per Report Charging Model), then the XLSG performs online charging process as specified in Table 2 with the Subscriber-Id AVP in the Credit Control Request (CCR) message populated with target Subscriber MSISDN or IMSI.

Upon receipt of the TLREP without error, if the Application profile indicates that the Requester is the Charging Party, and the requestor element was present in the TLRR, the requestor is prepaid, and TLREP is set in the Charging Trigger profile (i.e. Per Report Charging Model), then the XLSG performs the online charging process as specified in Table 2 with the Subscriber-Id AVP in the CCR message populated with requestor MSISDN or IMSI.

As above under the TLREP processing, the XLSG verifies the received CCA message and uses the TX timer to verify receipt of the message.

If the TLREP failed to deliver to the LCS client, and the online charging was invoked for the TLREP, then the XLSG sends a CCR message with Refund populated in Requested-Action AVP and the same Subscriber-Id AVP for the online charging of this session.

The XLSG transmits a TLREP received from the LS to the LCS Client with all same elements received in the TLREP.

The XLSG provides a function for processing the TLRSR. Note that the TLRSR request may be for one or more msids with an active triggered service. Although triggered services may be requested for more than one msids, the list of msids in the stop request does not have to match the list of msids in an initial triggered service request.

The XLSG receives a TLRSR message and validates that the misd and req_id are for an active triggered service and ignores the message if they are not valid.

The XLSG sends a TLRSR to the active location server for the active triggered service with the same elements as received from the LCS Client.

The XLSG provides a function for receiving and processing the TLRSA from Location Servers.

The XLSG verifies that the LS responds with a TLRSA.

The XLSG transmits a TLRSA received from the LS to the LCS Client with all same parameters received in the TLRSA.

TLRR Unsuccessful Scenarios

The XLSG includes the add_info parameter to all TLRA messages containing an error code with descriptive text clarifying the reason for the error code.

The XLSG provides a function to respond to the LCS Client for invalid received messages.

The XLSG transmits a HTTP.BAD_REQUEST error response if the received message is unrecognizable or cannot be correctly parsed.

The XLSG sends a TLRA with an error code MLP.SYNTAX ERROR if the received message has a syntax error as defined by the XML DTD.

The XLSG sends a TLRA with an error code MLP.FORMAT ERROR if the message has an invalid format as defined by the XML DTD.

The XLSG provides a function to respond to the LCS Client for TLRR validation failures.

The XLSG sends a TLRA with an error code MLP.FORMAT ERROR to the LCS Client if the received message does not contain a body.

If the XLSG is not configured to support Triggered services then the XLSG transmits an TLRA to the requesting LCS Client with error code MLP.SERVICE NOT SUPPORTED.

The XLSG sends a TLRA with an error code MLP. SERVICE NOT SUPPORTED to the LCS Client if the received message does not have the msid.enc parameter as "ASC".

The XLSG sends a TLRA with an error code MLP. PROTOCOL ELEMENT ATTRIBUTE NOT SUPPORTED to the LCS Client if the msid.type parameter of a TLRR is not supported by the Enterprise.

The XLSG sends a TLRA with error code MLP.TOO MANY POSITION ITEMS to the LCS client if the number of msid parameters in the TLRR exceeds the maximum batch requests provisioned for the Enterprise.

If the interval element and the tlrr_event element are not present in the TLRR, the XLSG sends the TLRA with error code MLP. SYNTAX ERROR to the LCS Client.

If the stop_time and duration elements are both present in the TLRR, then the XLSG sends a TLRA to the LCS Client with error code MLP.INVALID PROTOCOL ELEMENT VALUE.

If either the start_time or stop_time elements in the TLRR are both in the past (older than the current time), or the start_time is earlier than the stop_time, then the XLSG sends a TLRA to the LCS Client with error code MLP. INVALID PROTOCOL ELEMENT VALUE.

If the requested duration parameter exceeds the "Max trigger periodic duration" provisioned for the Enterprise, then the XLSG sends a TLRA to the LCS Client with error code MLP.INVALID PROTOCOL ELEMENT VALUE.

The XLSG provides a function to respond to the LCS Client for TLRR authentication failures.

The XLSG sends a TLRA with an error code MLP.UNAUTHORIZED_APPLICATION to the LCS Client if the LCS client is not authenticated.

The XLSG sends a TLRA with an error code MLP.UNAUTHORIZED_APPLICATION to the Application if the Application is not authenticated.

If online charging was invoked for a triggered session and the OCS server responds to a CCA message with a result-code other than Succeeded, the XLSG sends a TLRA to the LCS Client with the error code MLP.UNSPECIFIED ERROR and add_info field as defined in Table 22.

If online charging was invoked for the triggered service and XLSG does not receive the CCA message from the OCS server within the Tx timer, then the XLSG sends a TLRA to the LCS Client with error code MLP. UNSPECIFIED ERROR with add_info as defined in Table 22.

The XLSG provides a function to respond to the LCS Client for Location Server problems.

The XLSG sends a TLRA with an error code MLP.SYSTEM FAILURE to the LCS Client if an LS is not available.

The XLSG initiates online refund upon receiving TLRA with an error code.

Upon receipt of the TLRA with an error code, if online charging process was invoked, the XLSG initiates a CCR message with Refund populated in Requested-Action AVP, the same Subscriber-Id AVP for the online charging of this session and other parameters appropriately depending upon the charging model that was used, as defined in Table 2.

TLREP Unsuccessful Scenarios

If a CCR message has been output to the OCS and the XLSG does not receive the CCA message from the OCS server within the time defined by the OCS Tx timer, then the XLSG sends a TLREP to the LCS Client with error code MLP.UNSPECIFIED ERROR and add_info field as defined in Table 22.

If online charging was invoked with a charge for a TLREP (i.e. Per Report Charging Model) and the OCS server responds to a CCA message with a result-code other than Succeeded, the XLSG preferably initiates the cancellation procedure for the pending triggered session by sending a MLP TLRSR to the location server via the outbound interface. Once a MLP TLRSA is returned, the XLSG sends a MLP TLRSA to the LCS Client initiated the triggered session with the error code MLP.UNSPECIFIED ERROR and add_info field as defined in Table 22.

Steering

The XLSG receives incoming MLP requests from LCS Clients. The steering portion of the XLSG steers to a location determination platform based on a series of rules that are provisioned by an operator at deployment time. A request from an application is first processed as in Section 0 and is then sent to a location server (LS). Depending on various conditions, the best or correct LS is selected via this steering function.

Figure 10:
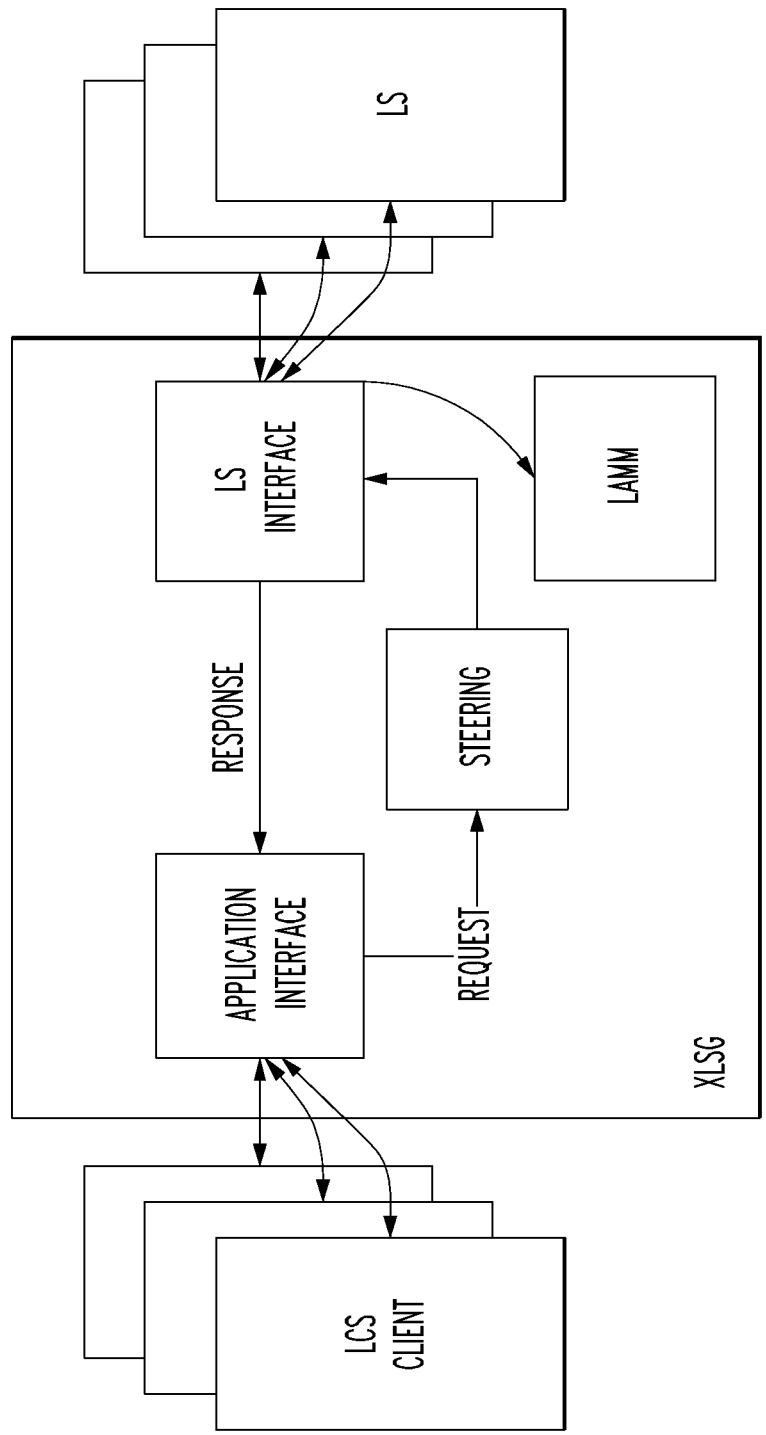
FIG. 10 illustrates exemplary processing within major functions of the XLSG in accordance with the principles of the present invention.

FIG. 10 illustrates exemplary processing within major functions of the XLSG in accordance with the principles of the present invention.

In particular, there are six rules or parameters that the XLSG uses to select an LS. Some of these rules are exclusive meaning that only one rule may exist. Other rules can exist concurrently in order to allow a finer tuning of the steering to different LS. The rules are provisioned in the Enterprise Profile.

The rules are:

1. Enterprise (Operator)—A given operator may have only one location server or choose to route all XLSG requests to a single location server. This rule states that ALL location requests go to a single location server.
2. Request Type—Commercial vs. Emergency requests can be steered to different servers.
3. Data Plan—If a subscriber does not have a data plan, then only the GMLC control plane should be used.
4. Device Type—The operator provisions device types and each subscriber is provisioned with their device type. The device type states which location determination server should handle the request. This can be imperfect especially in GSM where users can switch SIMs with ease.
5. Application ID—An application is defined to use a specific location server.
6. Fallback—Fallback to a different location server if a location request fails and there is "enough" time to send the request to another location server.

Table 3 provides the precedence order for the rules with a discussion for each of the allowable concurrency if multiple rules are defined.

Table 4 illustrates the allowed combination of steering rules in a "decision table" format. The top portion of the table lists the "causes", or in this case the different rules that may be in effect. The right side of the table next to causes indicates the allowed combination of different rules. The lower section of the table shows the "effects" or in this case it indicates the final rule that is used for selecting the location server. In all cases there is no requirement for the XLSG to be provisioned with multiple rules, each rule can stand alone which is a condition not illustrated in this table.

Fallback is the process of selecting a $2^{nd}$ LS if the results of the first location attempt were not successful. Unsuccessful results may come from two reasons; either the initial location server returned an error (or didn't respond), or the requested QoP was not possible. The fallback function selects only one additional LS; thus there are never more than two attempts to obtain a location for one request. Fallback rules are based on the rule that was used for the initial LS selection; in a sense the method for selecting a fallback LS proceeds through the rule in inverse precedence.

The structure of the profiles define that an MNVO is a subset of an Enterprise. Since steering is defined at the level of the Enterprise, there are no considerations of an MNVO that influences steering. Locations servers are associated with the Enterprise and the possible devices for an MVNO are a subset of the devices defined for the Enterprise. There may be LCS Clients and Applications defined for an MVNO which are not common to the Enterprise; in this circumstance there is a need for manual coordination of Application ID steering if that rule is selected for the Enterprise.

Generally speaking the LAMM is a location server. Steering to the LAMM is provisioned through either the Device Type rule, the Application ID rule, or a combination of the two. In addition, steering to the LAMM requires that the XLSG first check that the subscriber's device has the XLSA agent installed and registered in the profiles; and that the LAMM update the Subscriber Profile with status for registered agents. Steering to the LAMM takes precedence over a conflicting rule. For example if the Device Type rule is provisioned for the LAMM, and the Application rule for the request is provisioned to some other LS, the request is steered to the LAMM.

Successful Scenarios

Location Server Selection

The XLSG provides a steering function that selects a location server for each location request based on the rules provisioned in the Enterprise profile.

Steering rules are separate for each Enterprise independent of any other Enterprise. The XLSG steering function supports the following Location Server types:

1. XLP—configured as GMLC for GSM environment [SM-1]
2. XSS—SUPL Server [SM-1]
3. LAMM—Location Agent Manager within XLSG
4. XLP—configured as MPC in CDMA environment
5. Non-TCS GMLC
6. Non-TCS SUPL Server
7. Non-TCS ANSI compliant MPC The XLSG steers all SLIS, ELIS, and TLRS location requests according to the steering rules. The XLSG provides a steering rule called Enterprise which allows the definition of a single location server to be used for all location requests.

If the XLSG is provisioned with the Enterprise steering rule then no other rule is allowed. If the Enterprise rule is provisioned then the XLSG steers all location requests to the LS defined by that rule.

The XLSG provides a steering rule called Request Type that allows the definition of one or two location servers.

The XLSG provides two alternatives for the Request Type rule. Alternative 1 Request type rule specifies a LS to be used for all emergency location requests, and another LS to be used for all non-emergency location requests also called "commercial requests". Alternative 2 Request type rule specifies a LS to be used for all emergency location requests.

If the XLSG is provisioned with the alternative 1 request type rule then no other rule is allowed.

If the XLSG is provisioned with the alternative 2 request type rule then the XLSG allows the provisioning of the Data Plan, Device Type and Application ID rules.

If the alternative 1 Request Type rule is in effect, the XLSG steers all emergency and commercial location requests to the LS defined by this rule.

If the alternative 2 request type rule is in effect, the XLSG steers all emergency location requests to the LS defined by this rule.

The XLSG provides a steering rule called Data Plan that allows the definition of one or two location servers.

The XLSG provides two alternatives for the Data Plan rule.

Alternative 1 Data Plan rule specifies a LS to be used for all Subscribers with an active mobile data plan, and another LS to be used for all Subscribers who do not have a mobile data plan.

Alternative 2 Data Plan rule specifies a LS to be used for all Subscribers who do not have a mobile data plan.

If the XLSG is provisioned with the alternative 1 Data Plan rule then only the Request Type rule may also be provisioned.

If the XLSG is provisioned with the alternative 2 Data Plan rule then the XLSG allows the provisioning of the Request Type, Device Type and Application ID rules.

If the alternative 1 Data Plan rule is in effect, the XLSG steers all data plan and non-data plan requests to the two LS defined by this rule.

If the alternative 2 Data Plan rule is in effect, the XLSG steers all non-data plan location requests to the LS defined by this rule.

The XLSG provides a steering rule called Device Type that allows the definition of a location server for each type of provisioned device.

If the XLSG is provisioned with the alternative Device Type rule, then the XLSG allows the provisioning of the Request Type rule, and the Data Plan rule for the LAMM.

If the Device Type rule is in effect, the XLSG steers all location requests to the location server associated with the device type indicated in the Device Profile corresponding to the Subscriber in the location request.

If the Device Type rule is provisioned for the LAMM, then the XLSG steers the request to the LAMM.

The XLSG provides a steering rule called Application ID that allows the definition of a location server for each Application.

If the XLSG is provisioned with the alternative Application ID rule, then the XLSG allows the provisioning of the Request Type rule, and the Data Plan rule for the LAMM.

If the Application ID rule is in effect, the XLSG steers all location requests to the location server associated the Application sending the location request.

If the Application ID rule is provisioned for the LAMM, the XLSG steers to the LAMM.

After the location server is selected from the steering rules, the XLSG provides a function to send the location request to the Location Server.

If the steering is for a triggered request, and the triggered request contains more than one type of triggered function (e.g. periodic, change of area or mobile event) then the XLSG verifies that the selected location server supports all of the requested triggered location types and invokes the fallback procedure if they are not supported.

If the selected location server is the LAMM, then the XLSG verifies that the target Subscriber has the XLSA agent installed on its corresponding device and invokes the fallback procedure if it is not installed.

The XLSG transmits a location request (SLIR, EME_LIR, or TLRR) to the Location Server selected by the steering rules where that location request is as defined by other requirements.

Unsuccessful Scenario—Fallback

The XLSG provides the capability known as fallback which causes the XLSG to attempt a location request to a second location server if the response from the first selected location server was unsuccessful.

The XLSG selects a fallback location server for the Standard Location Immediate Service and the Emergency Location Immediate Service if the first attempted location server returned an error.

If the location request was a Triggered service, then the XLSG returns an MLP response with an error.

If the fallback location server is selected for any msid in a synchronous batch request, the XLSG waits for responses from all location servers before sending the corresponding response to the LCS Client. (SLIA, EME_LIA).

The XLSG provides a function to select a fallback location server if the initial location attempt is not successful or returns an error to the requesting LCS Client.

If the Application ID rule was the final LS selector, then the XLSG searches all other defined Location Servers for a match between 1.) The supported location technologies for the device; and 2.) Location technologies supported by a Location server, and sends the request to the first LS found that is not the same one as the LS that failed. Upon failure of the last retry (including the case no other location server found), the XLSG returns the original error received from the location server in the $1^{st}$ attempt.

If the Device Type rule was the final LS selector, then the XLSG searches all other defined Location Servers for a match between 1.) The supported location technologies for the device; and 2.) Location technologies supported by a Location server, and sends the request to the first LS found that is not the same one as the LS that failed. Upon the failure of the last retry (including the case no other location server found), the XLSG returns the original error received from the location server in the $1^{st}$ attempt.

If the Data Plan rule was the final LS selector, and the request was for a Subscriber with a data plan, then the XLSG searches all other defined Location Servers for a match between 1.) The supported location technologies for the device; and 2.) Location technologies supported by a Location server, and sends the request to the first LS found that is not the same one as the LS that failed. Upon failure of the last retry (including the case no other location server found), the XLSG returns the original error received from the location server in the $1^{st}$ attempt.

If the Data Plan rule was the final LS selector, and the request was for a Subscriber with no data plan, then the XLSG returns an MLP response with the original error received from the location server in the $1^{st}$ attempt.

If the Request Type rule was the final LS selector and the request was for commercial, then no fallbacks are applicable. If the Request Type rule was the final LS selector and the request was for emergency, then the XLSG sends the location request to the other location server defined by the other Request Type rule(S) of the same enterprise. The selection of other location servers follows the same logic defined for the corresponding rule(s), with an extension that for emergency request a subscriber with Data Plan can fallback to non-data plan location server. Upon failure of the last retry (including the case no other location server was found), the XLSG returns the original error received from the location server in the $1^{st}$ attempt.

If Enterprise rule is defined, then the XLSG returns an MLP response with the original error received from the location server in the $1^{st}$ attempt. The XLSG provides a function to return an error response to LCS Clients for location requests that were not completed.

The XLSG sends an SLIA, EME_LIA, or TLRA with an error code MLP.UNSPECIFIED ERROR to the LCS Client if the message received from the location server could not be correctly parsed.

The XLSG sends an SLIA, EME_LIA, or TLRA with an error code MLP.SYSTEM FAILURE to the LCS Client if the LS is not available.

The XLSG sends an SLIA, EME_LIA, or TLRA to the LCS client with error code MLP. SYSTEM FAILURE if no response is received from the LS within the time specified by eqop.resp_timer or a system default timer (where eqop.resp_timer does not apply to the triggered service).

Location Agent Management Module (LAMM)

The LAMM component of the XLSG interfaces with the TCS Xypoint Location Agent (XLSA) via any appropriate protocol. The LAMM component may be the sole interface to a Location Agent on the handset to maintain control of the interface between the XLSA and a Location Gateway. The LAMM supports sending geofencing to the handset and receiving location reports from the handset. The LAMM supports Network-initiated location requests. The LAMM is able to determine if a mobile device has a Location Agent, and is able to determine what version of the Location Agent a mobile device may be using. A Third Party Application is able to cancel a location request/session. If an operator-controlled mechanism allows users to opt-out, then the Network Element must be able to cancel the session. The type of handset may be determined (BREW, RIM, Windows Mobile, etc.) so that the XLSG-LAMM can craft the payload in the MT SMS message appropriately. The Location Agent differentiates multiple LBS applications through a unique ID associated with each LBS application. The system provides a mechanism to make sure that cancelled geofences are removed from the XLSG-LAMM to avoid dangling geofences. All triggered-periodic TLRR messages may be coordinated from within the SSPE (Server Side Polling Engine). The system generates a log for each Location Agent downloaded by mobile phone number. The system generates a log for each Location Agent downloaded by the wireless operator. The system generates a log for each Location Agent downloaded by the device Operating System. This download is implemented by an external system, but may simply log each agent registration in the LAMM. The system generates a log each time a subscriber denies a location request upon receiving a location notification (Position Report). The system generates a log of all location fix types (Cell ID, A-GPS, etc.) by MDN. The system generates a log of all location fix types (Cell ID, A-GPS, etc.) by MSISDN. The system generates a log indicating the fix type requested for each location transaction. The system generates a log indicating the actual fix type result for each location transaction. The system generates a log indicating the uncertainty of result for each location transaction. The system generates a log indicating that a location failure resulted from the E-911 setting on a handset. The Location Agent supports Store & Forward SMS.

Privacy Profile Register (PPR)

The Privacy function receives requests from a Location Server or external system to authenticate requestors and authorize location requests. This function also outputs notifications to location servers when the provisioning data of a Subscriber (msid) changes.

Location Privacy Assertion

Location privacy assertion is used between a Location Server requesting Privacy status and the XLSG implementing the Privacy Checking Entity. The XLSG receives an LPARequest message which contains the parameters to be authorized such as the target Subscriber and the application requesting to locate the subscriber. The XLSG performs a set of authentication and authorization functions such as checking that the target subscriber has enabled the requesting application. For emergency or lawful interception requests the privacy check functions are bypassed. The XLSG responds with the LPAResponse message which contains the results of the privacy check.

If Privacy check was set as Chargeable event in Charging Trigger Profile and the charging entity for the transaction is Prepaid, then charging is processed Online.

The XLSG provides 5 privacy definition concepts: Application Based Privacy; Requestor Based Privacy; App-Requestor Based Privacy; Time Based Privacy; and Subscriber Default Privacy.

Application Based Privacy: A subscriber can define the privacy settings for each Application that the subscriber has enabled, optionally date and time can be used.

Requestor Based Privacy: A subscriber can define the privacy settings for each "requesting" Subscriber that the target subscriber has enabled, optionally date and time can be used.

App-Requestor Based Privacy: A subscriber can define the privacy settings per requestor and application, i.e., only the selected requestor uses the selected application is allowed, optionally date and time can be used.

Time Based Privacy: A subscriber can define the privacy settings based on date and time.

Subscriber Default Privacy: A subscriber can define the default privacy settings to be applied to privacy requests in the absence of any identifiable requesting application and/or requesting subscriber. A default setting may be "Not Allowed".

There are 3 levels of privacy checking: (1) Global "location" allowed; (2) Location requests allowed or disallowed for each individual application and/or requestor; and (3) Temporal location settings for each application and/or requesting subscriber.

The XLSG supports privacy decision rules as specified in Table 1.

In particular, for each subscriber, there is a Global Privacy Setting. If the Global Privacy Setting is set to not allowed, "not allowed" is returned as a privacy action for all the privacy checking requests.

On a per enterprise basis, there is a flag for enabling/disabling Application Based Privacy. When Application Based Privacy is enabled, additional date/time based rules are allowed.

On a per enterprise basis, there is a flag for enabling/disabling Requestor Based Privacy. When Requestor Based Privacy is enabled, additional date/time based rules are allowed.

On a per enterprise basis, there is a flag for enabling/disabling Time Based Privacy. Time Based Privacy cannot be enabled if any of Application Based Privacy and/or Requestor Based Privacy is enabled.

On a per enterprise basis, Application Based Privacy and Requestor Based Privacy can be enabled at the same time, in which case additional date/time based rules is allowed.

For each subscriber, there is a Subscriber Default Privacy Setting, which is used when Application Based Privacy and/or Requestor Based Privacy is/are enabled, but the mandatory information element(s) is missing in the received LPARequest. Subscriber Default Privacy may be hard coded to "Not Allowed".

In Table 5, the scenarios where none of the privacy modes (i.e. Application Based Privacy, Requestor Based Privacy and Time Based Privacy) is enabled need not be made applicable.

Figure 11:
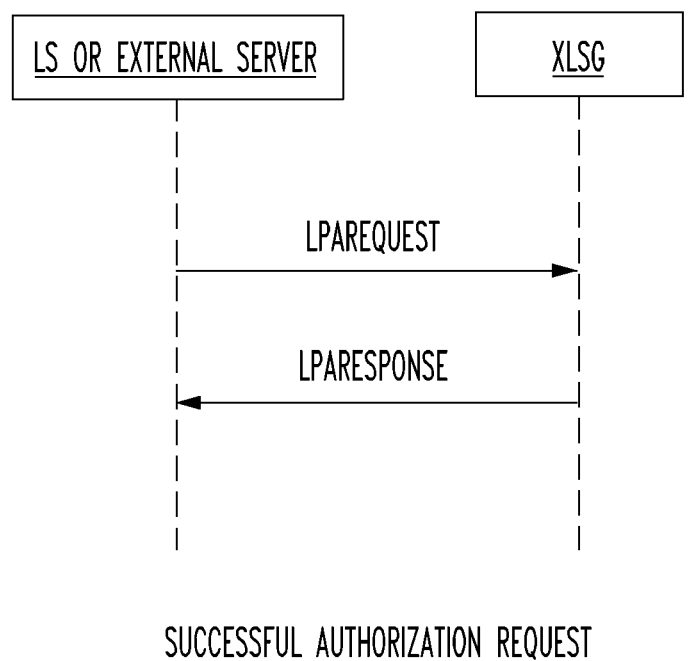
FIG. 11 illustrates exemplary call flow for a successful privacy request, in accordance with the principles of the present invention.

FIG. 11 illustrates exemplary call flow for a successful privacy request, in accordance with the principles of the present invention.

In particular, as shown in FIG. 11, the XLSG provides a message validation and sender authentication function as follows.

The XLSG validates the format and syntax of the Location Privacy Assertion Request (LPARequest).

The XLSG validates the version of the Location Privacy Assertion Request (LPARequest) is, e.g., 1.0.

The XLSG validates that the LPARequest contains a pcp_hdr and that the pceClient.id element contains the identifier for a Location Server in the profiles and the pceClient.pwd matches the password provisioned for that LS.

The XLSG ensures that the ueid (target Subscriber) contains a valid Subscriber msid that has been defined in the profiles.

If the clientCategory in the LPARequest is set to Emergency or Lawful Interception and the Override Allowed is enabled in the LCS Client profile, then the XLSG does not perform additional privacy checks.

The XLSG provides a privacy check function. The XLSG ensures that the target Subscriber has globally authorized location requests. If Application Based Privacy is enabled and the LPARequest contains the applicationID, then the XLSG validates that the applicationID element is an Application that has been authorized for location requests by the target Subscriber.

If Application Based Privacy is enabled and the LPARequest contains the applicationID, then the XLSG verifies that the current day and time are allowed for the requesting application in the Privacy profile if temporal privacy is set for the application ID.

The XLSG performs Application privacy checks only if the Application Privacy is enabled as defined in the Enterprise (MVNO) profiles.

If Requestor Based Privacy is enabled and the requestor parameter is present in the LPARequest, then the XLSG validates that the requestor parameter is another msid that has been authorized by the target Subscriber.

If Requestor Based Privacy is enabled and the requestor parameter is present in the LPARequest, then the XLSG verifies that the current day and time are allowed for the requestor in the Privacy profile if temporal privacy is set for the requestor.

The XLSG performs Requestor privacy checks only if the Requestor Privacy is enabled as defined in the Enterprise (MVNO) profiles.

If both Application Based Privacy and Requestor Based Privacy are enabled, and both the requestor parameter and the applicationID are present in the request, then the XLSG validates the requestor and applicationID that have been authorized by the target Subscriber.

If both Application Based Privacy and Requestor Based Privacy are enabled and both the requestor and applicationID parameters are present in the LPARequest, then the XLSG verifies that the current day and time are allowed for the requestor and applicationID in the Privacy profile if temporal privacy is set for the requestor and applicationID.

The XLSG performs Requestor and Application Privacy checks only if both Requestor Based Privacy and Application Based Privacy are enabled as defined in the Enterprise (MVNO) profiles.

If Time Based Privacy is enabled, then the current day and time are allowed by the target Subscriber.

The XLSG performs Time Based Privacy checks only if both Time Based Privacy is enabled as defined in the Enterprise (MVNO) profiles.

If Application Based Privacy and/or Requestor Based Privacy is/are enabled, but the requestor parameter is not present in the request and/or the applicationID is not present in the request, then the XLSG uses the Subscriber Default Privacy.

If none of Application Based Privacy, Requestor Based Privacy and/or Time Based Privacy is enabled, the XLP uses the subscriber's Global Privacy Setting for all privacy check requests.

The XLSG provides a function to perform billing to the OCS for privacy checks when either the target subscriber or the requestor are prepaid.

If the Application profile indicates that the target Subscriber is the Charging Party, Privacy check was set as Chargeable event in Charging Trigger Profile, and the target Subscriber is prepaid, then the CCR message is sent to OCS with the Subscriber-Id AVP in the Credit Control Request (CCR) message populated with target Subscriber MSISDN or IMSI.

If the Application profile indicates that the Requestor is the Charging Party, and the requestor element is present in the LPARequest, Privacy check was set as Chargeable event in Charging Trigger Profile, and the Requestor is prepaid, then the CCR message is sent to OCS with the Subscriber-Id AVP in the CCR message populated with Requestor MSISDN or IMSI.

The XSLG sends the CCR with a Rating Group AVP based on the information in the received message and other corresponding AVPs as in the Charging Profile.

Upon receipt of the Credit Control Answer (CCA) message from the OCS the XLSG verifies that the DIAMETER SUCCESS (2001) Result-Code and Granted Service Unit are in the CCA message.

The XLSG verifies that the CCA message is received within the configured Tx Timer.

The XLSG sends the LPAResponse with the privacyAction parameter set to the value provisioned in the Privacy profile.

Unsuccessful Scenarios

If the format of the LPARequest is not valid, the XLSG sends a LPAResponse to the requesting LS with a Result Code of FORMAT ERROR.

If the syntax of the LPARequest is not valid, the XLSG sends a LPAResponse to the requesting LS with a Result Code of SYNTAX ERROR.

If the version of the LPARequest is other than, e.g., "1.0", the XLSG sends a LPAResponse to the requesting LS with a Result Code of UNSUPPORTED VERSION.

If the pceClient.id or pceClient.pwd of the LPARequest are not for a valid Location Server, the XLSG sends a LPAResponse to the requesting LS with a Result Code of MISCONFIGURATION OF PRIVACY CHECKING ENTITY.

If the ueid does not contain a valid Subscriber msid that has been defined in the profiles, the XLSG sends a LPAResponse to the requesting LS with a Result Code of UNKNOWN SUBSCRIBER.

If the XLSG cannot find a matching applicationID based on the received LPARequest, the XLSG treats as if applicationID is absent and uses the Subscriber Default Privacy for the privacy checking (i.e. "Not Allowed" in the initial XLSG release).

If Application Based Privacy is enabled and the ApplicationID parameter is an Application that has not been authorized for location requests by the target Subscriber, the XLSG sends a LPAResponse to the requesting LS with a privacy action_type of POSITION_NOT_ALLOWED.

If Requestor Based Privacy is enabled and the requestor parameter is a Subscriber that has not been authorized for location requests by the target Subscriber, the XLSG sends a LPAResponse to the requesting LS with a privacy action_type of POSITION_NOT_ALLOWED.

If online charging was invoked for the transaction, the OCS server responds in the CCA message with a result-code other than Succeeded, the XLSG sends a LPAResponse to the requesting LS with the result code UNSPECIFIED ERROR and with addinfo containing either "PREPAID CHARGING ERROR" or OCS SYSTEM ERROR. The mapping of the error codes are shown in Table 22.

If the XLSG does not receive the CCA message from the OCS server within the time defined by the OCS Response Timer, then the XLSG sends a LPAResponse to the requesting LS with result code UNSPECIFIED ERROR and with the addinfo containing "OCS TIMEOUT".

If Time Based Privacy is enabled or temporal privacy is set when Application Based Privacy and/or Requestor Based Privacy is/are enabled, the current date/time are not allowed by the Subscriber for the application and/or the requestor, then the XLSG sends a LPAResponse to the requesting LS with a privacy action_type of POSITION_NOT_ALLOWED.

Privacy Profile Update Notification

The update notification function is a message output to a location server when the Subscriber profile is updated and an MLP TLRS session is active. The notification message simply contains the msid and no further information. The response from the location server is an acknowledgment which is received by the XLSG with no further processing.

Figure 12:
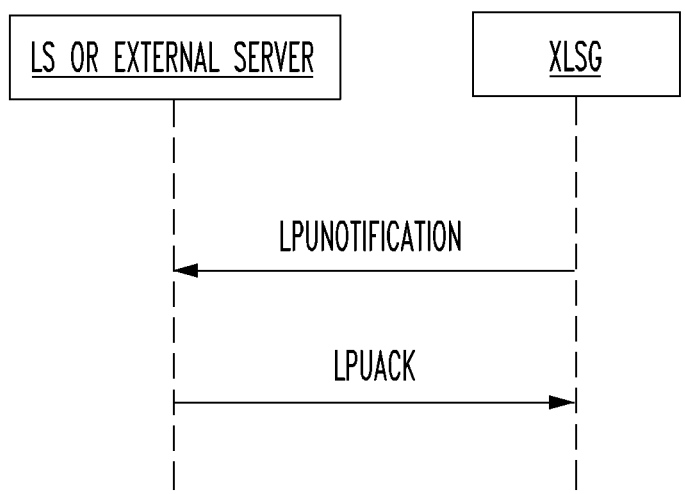
FIG. 12 shows communication between an LS or external server, and the XLSG, in accordance with the principles of the present invention.

FIG. 12 shows communication between an LS or external server, and the XLSG, in accordance with the principles of the present invention.

In particular, as shown in FIG. 12, if the Subscriber Privacy changes (i.e. changes to the existing privacy settings via any possible profile management methods), then the XLSG outputs the Location Privacy Profile Update Notification (LPUNotification) to all the Home Location Server(s) configured in the XLSG. The XLSG receives back a Location Privacy Profile Update Notification Ack (LPUAck).

Profile Management

Provisioning is focused on add, change, delete and view (ACD) of the Enterprise, Location Server, LCS Client, Application, Device, Subscriber, Charging, Charging Trigger, Steering and Privacy profiles in the XLSG. The profiles are the repository of the data elements used in the authentication, authorization, and steering functions of the XLSG.

The provisioning interface comprises both a browser/web interface and an API such as SOAP. The purpose of the API is to enable easier integration with other systems and support deployment of the XLSG with different user interfaces as needed. For example a carrier may integrate the XLSG Subscriber self management capability into the carrier's web site (white labeled).

The provisioning interface enforces access control rules through a definition of "user" roles defining which roles have rights to perform each function over the provisioning interface.

OCS and Charging Profiles

The OCS profile defines the parameters for communication with the OCS. Before online charging is invoked, charging trigger profile is checked to see if the request type is set as chargeable event in Charging Trigger profile. Only then online charging processing starts. The Charging profile provides a mapping from the information received via location request or privacy check message to Rating Group. The database is queried upon receipt of an MLP message that is configured in the Charging Trigger profile.

The XLSG ensures that a valid Enterprise Profile is created before an OCS Profile is created. The XLSG allows the provisioning of up to two OCS profiles per Enterprise.

Table 6 shows items provided by the XLSG associated with the OCS Profile. The XLSG ensures that a valid Enterprise Profile is created before a Charging Profile is created.

Table 7 shows items provided by the XLSG associated with the Charging Profile. The XLSG allows the provisioning of one or more Charging profiles per Enterprise. The XLSG ensures that a valid Enterprise Profile is created before a Charging Trigger Profile is created.

Table 8 shows items provided by the XLSG associated with a Charging Trigger Profile. The XLSG allows the provisioning of one or more Charging Trigger profiles per Enterprise.

Table 9 shows items provided by the XLSG associated with a Location Server Profile. The Location Server Profile provides a data repository that contains Location Server characteristics such as location technologies supported. There is at least one Location Server for each Enterprise, and no Location Server is associated with more than one Enterprise. The XLSG ensures that a valid Enterprise Profile is created before a Location Server Profile is created. The XLSG supports one or more Location Servers per Enterprise.

Table 10 shows items provided by the XLSG associated with an LCS Client Profile. The LCS Client Profile provides a data repository that contains characteristics of each LCS Client such as authentication and authorization parameters. An LCS Client can be associated with more than one Enterprise and zero or more Applications. The XLSG ensures that a valid Enterprise Profile is created before an LCS Client Profile is created, and ensures that a valid LCS Client Profile is created before an Application Profile is created. The XLSG allows the definition of an LCS Client without an Application defined. The XLSG associates an LCS Client with one Enterprise, and an Application with one or more LCS Clients.

Table 11 shows items provided by the XLSG associated with an Application Profile. The Application Profile (AP) provides a data repository that contains characteristics of each Application such as authentication and authorization parameters and its association with an LCS Client. The default application may have the same levels as provided for each application: location allowed and temporal settings. The privacy in the "default application" is used in the privacy evaluation when no applicationID is specified in the privacy request.

Table 12 shows items provided by the XLSG associated with a Device Profile. The Device Profile (DP) contains technical information about the model of the handsets or mobile device that an Enterprise supports. Each Device type can be associated with more than one Subscriber. The XLSG ensures that a valid Enterprise Profile is created before a Device Profile is created. The XLSG supports one or more Devices per Enterprise.

Table 13 shows items provided by the XLSG associated with a Location Service Provider Profile. The Location Service Provider Profile provides a data repository that contains the characteristics associated with the Location Service Provider, such as LCS Client information and priority etc. There is at least one Location Service Provider for each Enterprise. The XLSG ensures that a valid Enterprise Profile is created before a Location Service Provider Profile is created. The XLSG supports one or more Location Service Provider per Enterprise.

Table 14 shows items provided by the XLSG associated with a Subscriber Profile. The Subscriber Profile (SP) provides a definition of each Subscriber such as personal information and preferences. It is associated with only one Enterprise, one device, and one Privacy Profile. The XLSG ensures that valid Enterprise and Device Profiles are created before a Subscriber Profile is created. The XLSG ensures that a valid Subscriber Profile is created before a Privacy Profile is created, and ensures that each Subscriber Profile is associated with an Enterprise Profile and a Device Profile.

Table 15 shows items provided by the XLSG associated with a Privacy Profile. The Privacy Profile (PP) provides a data repository that holds authorization and privacy preferences for each target Subscriber. There is one Privacy Profile for each LCS Client and each requesting Subscriber that are enabled to locate a target Subscriber. There may be a default privacy setting associated with each Subscriber called the "default Application".

The XLSG outputs a descriptive and meaningful response to the entity requesting a provisioning function if the request did not pass authentication or data integrity checks.

A logging function captures data as LDRs from location requests and other XLSG activities. The data is captured in a set of records associated with these activities. The purpose of logging is to allow insights to XLSG processing, enable billing functions, and general reporting functions. The LDRs are output to external systems for further analysis such as the Xypoint Reporting Service (XRS) and an external billing system; a common LDR format serves both of these functions. Log contents include a number of raw data elements such as date/time stamps, requesting LCS Client/Subscriber, Enterprise, result codes, and other details. As such they allow the XRS to create a variety of detailed and summary views. The three functional areas that are logged include: (1) Location requests including the end-to-end messaging with Location Servers; (2) Privacy requests and results; and (3) Profile modifications.

LDRs are separate for each Enterprise, MVNO, non-TCS Location Server, and each LCS Client. The XLSG uses independent FTP credentials (usr/pwd) for each Enterprise, MVNO, Location Server, and each LCS Client. The XLSG outputs LDRs to the Xypoint Reporting Service (XRS) and to an external billing system.

Location Request LDRs

The log entries for location requests include not only the request information but the results of the location request. The result may be successful with a location returned from a Location Server or may end in an error response.

The XLSG processes location requests on a pass through basis by receiving location requests from LCS Clients, forwarding them to Location Servers, and then responding back to the LCS Client. A transaction is defined as an aggregate of more than one of these events (equivalent to the term "session"). An LDR that is logged by the XLSG is defined as one record that incorporates all of the logged information for an entire transaction. For example the LDR for an SLIR request from an LCS Client includes the parameters in the original SLIR, the SLIR sent to the LS, and SLIA received from the LS, and the SLIA sent to the LCS Client.

Table 16 shows exemplary definitions of an LDR created by the XLSG for each location request received on the LCS Client interface. The XLSG creates an LDR for the Standard Location Immediate Request, Emergency Location Immediate Request, Triggered Location Request, and each TLREP message for the Triggered Location Reporting Service. The XLSG creates a separate LDR for each msid in a batch request. The XLSG creates a log entry for location requests that are successful, and for location requests that do not pass validation or authorization functions and therefore result in an error code response to the LCS Client. The XLSG logs the lack of a response from a Location Server, and may log a rejected MLP location request because the maximum configured TPS has been exceeded. The XLSG includes a date/time stamp for each LDR including a date/time stamp for each message sent/received.

Table 17 shows exemplary Triggered Location Request Summary LDR Contents.

Table 18 shows exemplary Triggered Location Request TLREP LDR Contents.

Table 19 shows exemplary Privacy Request LDR Contents. Logging for the Privacy interface involves capture of transactions comprising request and response message details. The XLSG creates a Privacy LDR for each LPARequest/LPAResponse transaction on the Privacy interface. The XLSG includes a date/time stamp for each LDR including a date/time stamp for each Privacy request. The XLSG logs failed authentication events on the Privacy interface, and logs all Privacy Interface error codes as specified in Table 21 as unshaded rows in the table. The LDR for the Privacy Request includes the pceClient.id identifier of the system sending the LPARequest, and the date/time that the message was received.

Logging on the provisioning interface focuses on capture of changes to all the profiles. The XLSG generates a log entry for each add, change, and delete on the provisioning interface. The provisioning interface log includes the authentication identifier and role associated with the request. The XLSG also logs failed authentication events on the provisioning interface. The provisioning interface log includes the date/time that the request was received; the type of request: Add, Change, or Delete; the data in the request; and the profile data that existed before the request to Add, Change, or Delete was applied to the profile.

The XLSG processes location requests on a pass through basis by receiving location requests from LCS Clients, forwarding them to Location Servers, and then responding back to the LCS Client. A transaction is defined as an aggregate of more than one of these events; the term transaction being equated with the term "session". The XLSG captures metrics for both the LCS Client and Privacy interfaces, and records metrics for both requests and responses. Request metrics include a breakdown by message type. Response metrics include a breakdown of success and unsuccessful requests.

The logs are used for robust and comprehensive reporting and for billing purposes. But the logs are detailed records that are filtered and aggregated for a user to obtain meaningful data—functions that the XRS performs. And logs are also intended for historical and flexible reporting. The logs may be output to users or other systems through the administrative or SNMP interfaces so that users can gain real time insights into XLG processing and events.

The XLSG provides peg counts for messages received on the LCS Client interface. The XLSG provides a peg count for each received SLIR, EME_LIR, TLRR, and TLRSR. The XLSG provides a peg count for messages received on the LCS Client interface which are either in error or not recognized as a SLIR, EME_LIR, or TLRR. The XLSG also provides a peg count for Prepaid Status messages received on the OCS Interface; for messages received on the location server interface; and for each received SLIA, EME_LIA, TLRA, TLREP, TLRSA. The XLSG also provides a peg count for each error response from location servers as defined in Table 20.

The XLSG provides a metric that records the average number of concurrent immediate location request active sessions (SLIS, and ELIS) at any time. The XLSG provides a metric that records the average number of concurrent triggered location request active sessions at any time; and records the maximum number of concurrent sessions at any time. The XLSG provides a peg count to capture the average elapsed time (duration) required for completion of transactions. The XLSG records transaction duration metrics by Subscriber, Application, LCS Client, Location Server and Location Service Type. For each Location Request that results in an error code the XLSG records the event as a metric including the specific error code as specified in Table 21 as unshaded rows. The XLSG supports the ability to write peg counts to a file. The XLSG is capable of writing the peg count file in at specific time intervals. The specific time intervals are configurable in minutes. The XLSG includes a date and time, representing the time the peg counts were collected, in the file for each peg counts. The XLSG supports Greenwich Mean Time and Local machine time for peg count files.

The XLSG includes the configured time interval the peg counts in the file that were collected. For example, if the system is configured to collect peg counts on a 5 minutes interval, a 5 would be in the peg count lines in the file.

The XLSG names the peg count file in the following format: 'hostname'.pegcnt.YYYYMMDDhhmmss.log Privacy Interface The XLSG provides a peg count for each received LPARequest. The XLSG records the processing of each LPARequest by the Privacy interface that was "successful" as a metric. The XLSG records the transmission of each LPAResponse as a metric. The XLSG provides a peg count for each LPARequest. that resulted in an error. The XLSG records the processing of each LPARequest by the Privacy interface that was "unsuccessful" as a metric. The XLSG provides a peg count for each transmitted LPUNotification.

OCS Interface

The XLSG may provide a peg count for each Capabilities-Exchange-Request (CER), Capabilities-Exchange-Answer (CEA), Device-Watchdog-Request (DWR), Device-Watchdog-Answer (DWA), Disconnect-Peer-Request (DPR), Disconnect-Peer-Answer (DPA), Diameter Credit Control Application (DCCA) Messages, Credit-Control-Request (CCR), Credit-Control-Answer message (CCA), and each of the above OCS interface messages that were in error.

Provisioning Interface

The XLSG may also provide peg counts for each add, change, and delete on the Enterprise Profile, OCS Profile, Charging Profile, Location Server Profile, LCS Client Profile, Application Profile, Device Profile, Subscriber Profile, and Privacy Profile.

External interfaces include an LCS Client Interface: Used for application and subscribers to request location services. A Location Server Interface: After validation functions the XLSG forward location requests to selected location servers and processes responses from LS. A Privacy Interface is used for external Location Servers to access the authentication and authorization capabilities of the XLSG. A Provisioning Interface is used to configure the location services processing. An Online Charging Interface: The Diameter interface is used for real time billing functions for prepaid services such as checking availability of funds and asserting a service charge. A Reporting Service: The XLSG outputs logs and metric data to the XRS for reporting. An SNMP Interface. XLSG network and system management functions. An Admin Interface. CLI level interface for XLSG system administration.

LCS Client Interface

The XLSG may receive and transmit MLP messages on the LCS Client interface. The XLSG transports MLP messages over HTTP 1.1. The XLSG uses the HTTP port defined in the Enterprise Profile for unencrypted MLP traffic (defaulted to 9210). The XLSG uses the HTTPS port defined in the Enterprise Profile for encrypted SSL/TLS (defaulted to 9211). The XLSG supports the connection semantics of a single request per HTTP connection. This model may include multiple msids and may be referred to as a batch request. The connection per request model may be the default connection policy.

The XLSG supports the SLIR message using the HTTP POST received from an LCS Client. The XLSG transmits the SLIA message using the HTTP Response to an LCS Client. The XLSG supports the EME_LIR (HTTP POST) message received from an LCS Client. The XLSG transmits the EME_LIA Answer (HTTP Response) message to an LCS Client. The XLSG supports the TLRR and TLRSR (HTTP POST) messages received from an LCS Client. The XLSG transmits the TLRA, TLREP, and TLRSA (HTTP Response) messages to an LCS Client. The request URL is defined in the Enterprise Profile. For example: http://location-server.carrier.com:9211/XLSGLocationQueryService. The XLSG responds with HTTP.METHOD_NOT_ALLOWED error response upon receipt of any unsupported message from an LCS Client.

If the XLSG receives a message defined as an MLP Extension message then it discards the message, i.e., does not process the contents of the message.

If an MLP request (SLIR_EME_LIR, or TLRR) has an extension element, the XLSG passes the extension element to the corresponding location server. If a batch MLP request has an extension element, the XLSG passes the extension element in each individual SLIR for each msid in the batch request to the corresponding location server.

Location Server Interface

The XLSG supports the following location servers and location server types over the location server interface:
 XLP—configured as GMLC for GSM environment.
 XSS—SUPL Server.
 LAMM—Location Agent Manager within XLSG.
 XLP—configured as MPC in CDMA environment.
 Non-TCS GMLC.
 Non-TCS SUPL Server.
 Non-TCS ANSI compliant MPC.

The XLSG transports MLP messages over HTTP 1.1. The XLSG sends all messages to the Location Server over the HTTP port defined in the LS Profile for encrypted SSL/TLS. The XLSG transmits the SLIR, EME_LIR, TLRR and TLRSR messages using the HTTP POST to a Location Server. The XLSG supports the SLIA, EME_LIA, TLRA, TLREP, and TLRA messages using the HTTP Response from a Location Server.

Privacy Interface

The Privacy interface is used for external Location Servers to access the authentication and authorization capabilities of the XLSG. The external Location Server is within a secure network. The purpose is for the Location Server to query the XLSG with a request to locate a Subscriber and respond with the results of authorization checks. The protocol is simply that the XLSG receives a request message from the external system and then sends a response. The request message includes a number of parameters that the XLSG compares to the Profiles. The response message provides the result of the request with simple approval status.

The Privacy interface supports HTTP/1.1 as the transport protocol.

Location Agent Interface

The Location Agent interface is between the Location Agent Manager (LAMM) function in the XLSG and a function executing on a mobile device called the Location Agent (LA). The LAMM forwards immediate and triggered requests to the LA which returns with locations. The LA obtains locations from onboard GPS or through interactions with location services.

The XLSG provides an interface to Location Agents.

Provisioning Interface

The provisioning interface is used to configure the location services processing for the XLSG and reports. The functions on the interface include add, change, delete, and view (ACD) the various parameters.

The XLSG provides four types of provisioning/user interfaces:
 Web interface: A typical Internet web based browser UI.
 Mobile web interface: Subscriber self-provisioning from the mobile device.

API: B2B interface (e.g. web services, XML over SOAP) for real time synchronization with carriers other OSS/BSS. This interface may allow integration of the provisioning interface with other carrier OSS systems such as an HLR, billing, or the carrier's CRM system. To clarify terminology, this XLSG specification use the term "API" which is equivalent to the term "CLI".

Batch interface: for bulk loading of provisioning data, especially devices and subscribers.

The XLSG provides the option for encryption of all messages and data transferred on the provisioning interface. The XLSG provides an HTTP and HTTPS web interface for browsers over HTTP 1.1. The XLSG uses the HTTP port defined in the Enterprise Profile for unencrypted HTTP web provisioning functions. The XLSG uses the HTTPS port defined in the Enterprise Profile for encrypted SSL/TLS web provisioning functions.

The XLSG supports the following browsers on the web interface: Apple Safari 3.x, Google Chrome 1.x, Microsoft Internet Explorer 6 7, 8.x, Mozilla Firefox 2, 3.x, and Opera 9.x.

The XLSG provides an HTTP mobile web interface for use on mobile devices. The XLSG uses the HTTP port defined in the Enterprise Profile for unencrypted HTTP mobile web provisioning functions. The XLSG also uses the HTTPS port defined in the Enterprise Profile for encrypted SSL/TLS mobile web provisioning functions. The XLSG supports the following browsers on the mobile web interface: Apple Safari (iPhone, iPod Touch), Opera Mobile, RIM Blackberry Bold.

The XLSG provides a real time API for integration with other systems. This interface may be structured as XML over SOAP or similar middleware technology. The XLSG supports provisioning of the profiles over the API. The XLSG provides a batch provisioning interface.

This interface may be structured as a set of well defined file formats and an FTP server that allows other systems to load bulk provisioning data. This interface may be a layer that utilizes the API for detailed provisioning of individual data sets. The XLSG supports provisioning of the profiles over the batch provisioning interface.

OCS Interface

The OCS Interface is used for real time billing for prepaid Subscribers. The interface comprises of the Diameter Base Protocol which implements the connectivity between the XLSG and OCS. The base protocol then is used to exchange credit control messages according to the 3GPP Ro interface. The Diameter charging function and interface definitions are based on 3GPP and other relevant specifications.

The XLSG supports Credit Control Request (CCR) and Credit Control Answer (CCA) messages as defined in 3GPP 32.299.

Xypoint Reporting Service/Logging Interface

The XRS is the reporting engine for reports about XLSG functions and operations. The XLSG sends a set of data to the XRS which then uses that data to provide static and dynamic reports to users. Data output to the XRS include logs, metrics, and LDRs.

The XLSG provides an interface to the Xypoint Reporting Service system. The XLSG outputs the XRS data to any other system connecting to this interface, i.e., it does not require any specific version of the XRS to be connected. The customer may connect some other reporting engine to this interface, assuming that this other system can process the same data formats.

The XLSG provides an FTP server to allow other systems to retrieve LDRs.

SNMP V2 Monitoring Interface

The XLSG uses SNMPv2 for network management (RFC 2578-RFC 2579). The XLSG implements the TCS-BASE-MIB.mib[27] for reporting faults (traps) to an Element or Network Management System.

The XLSG implement the TCS-EMS_APP-METRICS.mib[28] for reporting metrics (query) to an Element or Network Management System.

The XLSG resets metrics if an Element or Network Management System issues a query with the attribute tcsmPegCountResetControl contains a value of 1.

The XLSG generates an alarm if the disk utilization TBD % for the disk containing the logs exceeds a configurable %.

The XLSG asserts a fault over the SNMP interface if the MLP prio parameter is set to High and Normal is the maximum priority that is provisioned for the LCS Client. The XLSG asserts a fault over the SNMP interface if the number of queued location requests on the MLP interface exceeds a configurable parameter. The XLSG asserts a critical alarm over the SNMP interface if the number of queued location requests on the MLP interface exceeds a configurable parameter.

Admin Interface

The Admin Interface is used by a System Administrator to control the operation of the XLSG. The system administrator ensures that the XLSG is properly configured, and remains operational. It is a system administrator for other back office systems such as the Location Server. It installs the XLSG, implements XLSG upgrades, and configures the hardware, operating system, and XLSG subsystems such as database. It obtains periodic reports showing resource utilization, fault logs, monitors alerts, and solves problems. It is an employee/agent of the Enterprise where the XLSG is installed, e.g. in an Information Technology (IT) department.

The XLSG provides a mechanism for the Platform Administrator to create additional users for provisioning functions where each user is assigned to a role. The XLSG provides the Administrator User Group access to system root and system administration, operations, and maintenance functions. The XLSG Admin interface implements a command to clear all metric counters. The XLSG Administrator Interface provides the capability to configure the product license options.

The XLSG provides a dashboard view for the Platform Administrator to view summary information about the system. The XLSG provides a capability for the Platform Administrator to start and stop the system. The XLSG provides the capability for the Platform Administrator to manage log creation and log access controls for other systems to access the logs, and the capability for the Platform Administrator to view system events.

Table 20 contains exemplary result codes returned to the LCS Client. The shaded rows are result codes that are possible but not supported in the disclosed embodiments of the XLSG.

Table 21 contains exemplary result codes returned on the Privacy Interface. The shaded rows are result codes that are possible but not supported in the disclosed embodiments of the XLSG.

Table 22 defines exemplary error codes received in the CCA message returned on the OCS Interface and the corresponding error code sent to an LCS Client. All Online charging specific errors are mapped to UNSPECIFIED ERROR for both PCP and MLP interface, and then addinfo field has additional info regarding to error type.

Provisioning of the XLSG is preferably accomplished via a browser using HTTPS that utilizes the Provisioning Interface to maintain the profiles. For instance, the XLSG preferably provides the ability to provision an Enterprise Profile; a Location Server Profile; an LCS Client Profile; a Device Profile; a Subscriber Profile; and/or a Privacy Profile, using a browser. The XLSG utilizes HTTPS as the preferred protocol for communicating with browsers.

The XLSG provides the ability to "bulk load" subscriber profiles for an Enterprise. The system supports the ability to perform manual backup and recovery options in less than, e.g., 2 hours.

Configuration Management

The following are the requirements for configuration management of the XLSG. The MLP LCS Client Interface port # for HTTP is preferably configurable, as is the MLP LCS Client Interface port # for HTTPS. The Privacy Interface port # for HTTPS is configurable, as is the LS Server Interface Port # for HTTPS. The Provisioning Interface port # for HTTPS is configurable, as is the directory for the Location Request logs, and the directory for the Privacy Request logs.

A threshold for queued location requests on the MLP interface that generate a fault is preferably configurable, as is a threshold for queued location requests on the MLP interface that generate a critical alarm.

Function Enabling

The XLSG supports the ability to enable or disable certain classes of functions and XLSG capabilities. These functions may include call flows depending on the network type, location service type, XLSG functional module, and others. For example if the XLSG is not licensed to support CDMA networks, then the provisioning functions for CDMA network are disabled, and as a result the customer would not be permitted to define a location server for CDMA networks.

The XLSG implements a configuration item to enable/disable Triggered Location Reporting Service. The XLSG implements a configuration item to enable/disable the Application Interface Module (AIM). In this scenario the XLSG may be deployed to provide only the Privacy Profile Register (PPR) module. The XLSG implements a configuration item to enable/disable the Location Agent Management Module (LAMM).

When the configuration disallows certain types of encryption, the allowed encryption methods may include: 1. Mass market encryption commodities and software with key lengths not exceeding 64-bits; and 2. Encryption items (including key management products and company proprietary implementations) with key lengths not exceeding 56-bits for symmetric algorithms, up to 512-bits for asymmetric key exchange algorithms, and 112 bits for elliptic curve algorithms.

The performance and Capacity Management capabilities of the disclosed embodiments of an XLSG are as follows. Ideally the XLSG supports the definition of no fewer than 128 Enterprises, a minimum of 20 Location Servers per Enterprise. There is ideally no maximum number of LCS Client and Applications except through limitations of XLSG platform system resources, nor is there a maximum number of Devices except through limitations of XLSG platform system resources. There is no maximum number of Subscriber and Privacy Profiles Devices except through limitations of XLSG platform system resources.

The XLSG supports a minimum of 75 Transactions Per Second (TPS is equivalent to location request sessions) (TPS) on a Model 5000 SA platform of 2 servers. The XLSG processes an additional 75 TPS for each additional Model 5000 SA server added to the system beyond the initial 2 servers for a single instance of the XLSG. Transactions per Second (TPS) are defined as the sum of Location Requests and Privacy Evaluation Requests.

When the XLSG receives a location request from an LCS Client the XLSG outputs a corresponding location request to the location server, or responds to the LCS Client, within 250 milliseconds for 99.9% of location requests. When the XLSG receives a privacy request, the XLSG outputs a response within 250 milliseconds for 99.9% of Privacy requests.

Fault Management

The XLSG reports SNMP traps for fault conditions, and generates alarms and events in the SNMP 2.0 version format. The XLSG is capable of automatically clearing alarms when the condition is alleviated. The XLSG sends clear alarm message when the fault condition is cleared. The XLSG supports alarm filtering based on severity, the severity level used for alarm filtering being configurable. Exemplary alarm severity codes are as follows:

Severity code 5: Critical. Service delivery is impaired. Must be investigated immediately.

Severity code 4: Major. Serious problems are likely to occur, or may occur if something else goes wrong. Must be investigated very soon.

Severity code 3: Minor. Should be investigated, but is not urgent.

Severity code 2: Warning. Something abnormal happened. It may or may not require action.

Severity code 1: Indeterminate. Something happened whose significance or impact is unknown.

Severity code 0: Clear. Informational; does not indicate a problem.

The XLSG provides alarms, events, and predefined severity levels for reporting on the SNMP interface. The XLSG provides an alarm for a XLSG database error (Severity 5), an alarm when given location request errors are sent on the LCS Client interface within a window of a given number of minutes (Severity 2). The XLSG provides an alarm when 3 consecutive timeouts occur for a location server (Severity 4). The XLSG provides an alarm when the CPU usage has reached the high water mark (Severity 4). The XLSG provides an alarm when disk storage utilization has reached the high water mark (Severity 4).

The XLSG implements a method for external Billing/Accounting systems to extract LDRs for the purpose of billing for location requests.

The XLSG allows data backup and data recovery to perform online backup and recovery of the system.

Table 23 defines various definitions, abbreviations and acronyms.

With respect to steering of a received location request, each LCS Client may be provisioned to be paired to a specific location determination server. Based on an incoming subscriber ID, a location request may be steered to a specific server.

Moreover, the quality of position may be used to determine which location determination device to steer a received location request to. For instance, it may be advantageous to steer all precise requests to XSS and all coarse positions to XLP.

Alternatively, or additionally, steering could be based at least in part on the state of the handset. For instance, MLP Request Type—depending if the request is a SLIR or TLRR, different servers could be picked.

Local area location determining methods may be steered to, within the principles of the present invention. For instance, a location may be reported based on a Wi-Fi or WiMAX network with which the user is present in.

The LDAP interface may be used to acquire the subscriber profile.

While the invention has been described with reference to the exemplary embodiments thereof, those skilled in the art be able to make various modifications to the described embodiments of the invention without departing from the true spirit and scope of the invention.

TABLE 1

XLSG Processing Priorities

| Priority Level | Priority Name | Affected events |
|---|---|---|
| 1 | Emergency | EME_LIR and all messages for the Emergency Services. |
| 2 | High | PCP messages. High priority MLP requests and all corresponding Standard and Triggered messages including LAMM and Diameter interactions. |
| 3 | Normal | Normal priority MLP requests and all corresponding Standard and Triggered messages including LAMM and Diameter interactions. |

Notes:
The XLSG does not prioritize any one Enterprise over another except as defined by the above event priorities.
The XLSG does not preempt the processing of one event for higher priority events.

TABLE 2

Charging Models and Charging Process for Triggered Location Services

| Received Message | Charging Model | Charging Process | Notes |
|---|---|---|---|
| TLRR | Flat Rate | Initiate a CCR message with the correspond Rating Group AVP. | |
| | Per Report | Initiate a CCR message with the Rating Group AVP for Session Imitation. | |
| TLREP | Flat Rate | No action | Flat Rate model will not initiate charge for the report individually. |
| | Per Report | Initiate a CCR message for every error-free report (TLREP) with the Rating Group AVP. If the received report contains error, no charging action. If online charging failed (CCA was received with error), the XLSG send TLREP with an error MLP.UNSPECIFIED ERROR to the client. The XLSG then initiate cancellation for the session (deferred). | |
| Failed TLRA | Flat Rate | Initiate a CCR for refund of the session. | |
| | Per Report | Initiate a CCR for refund of the Session. | |

Note:
Flat Rate Charging Model is enabled if the corresponding

TABLE 3

Concurrency of Steering Rules

| Precedence | Rule | Concurrency |
|---|---|---|
| 1 | Enterprise | Is exclusive, no other parameter can be defined if the Enterprise parameter is defined. |
| 2 | Request Type | There are 2 alternative configurations for this parameter: 1. All emergency requests are steered to a specific LS, and all commercial requests are steered to a specific LS. 2. All emergency requests are steered to a specific LS and all commercial requests are steered by lower precedence parameters in the following table rows. |
| 3 | Data Plan | Non-emergency requests for subscribers who have no data plan are steered to the GMLC (there must be one defined) and all subscribers with a data plan may be steered by lower precedence rules. |
| 4 | Device Type | (Exclusive to Application ID) All requests which are not "emergency" and are for a Subscriber with a data plan be steered by the Device type. Each supported device type in the Enterprise profile must have one and only one LS defined for that device type. |
| 4 | Application ID | (Exclusive to Device Type) All requests which are not "emergency" and are for a Subscriber with a data plan be steered by the Application ID. Each defined Application must have a defined Location Server. |
| 5 | Fallback | Fallback is the lowest precedence parameter, and is discussed in the follow section outside of this table. |

TABLE 4

Steering Decision Table

| Precedence | Cause (Provisioned) | Combinations | | | | | | |
|---|---|---|---|---|---|---|---|---|
| 1 | Enterprise parameter is set | Y | N | N | N | N | N | N |
| 2 | Request type a: both emergency and commercial | — | Y | N | N | N | N | N |
| 2 | Request type b: emergency only | — | — | Y | Y | Y | N | N |
| 3 | Data plan a (both data plan and non) | — | — | Y | N | N | N | N |
| 3 | Data Plan b (only non data plan) | — | — | — | Y | Y | N | N |
| 4 | Device type | — | — | — | Y | N | Y | N |
| 4 | Application ID | — | — | — | N | Y | N | Y |
| | Effects (how to steer) | | | | | | | |
| | Steer by Enterprise LS | X | | | | | | |
| | Steer by Request Type LS | | X | | | | | |
| | Steer by Data plan | | | X | | | | |
| | Steer by Device Type | | | | X | | X | |
| | Steer by Application ID | | | | | X | | X |

TABLE 7

Charging Profile

| Field Name | Description |
|---|---|
| Charging Profile Name | |
| Location Request Type | One from the list of SLIR, TLRR, TLREP, Privacy Request |
| LCS Client | The definition of the LCS Client for which this rating group applies. |
| Rating Group | The definition of the rating group based on all the parameters in this profile. |
| Qos Class | Assured, Best_Effort<br>Note: this field may be used only for TLREP. |
| Location Estimate Type | Current_Location, Current_Last_Known_Location, Initial_Location, Activate_Deferred_Location, Cancel_Deferred_Location |

TABLE 1

Privacy Decision Table

| Cause | | | | | | | | | | | | | | | | | | | |
|---|---|---|---|---|---|---|---|---|---|---|---|---|---|---|---|---|---|---|---|
| Application based privacy is enabled | Y | Y | Y | Y | Y | Y | Y | Y | N | N | N | N | N | N | N | N | N | N | N |
| applicationID is present | Y | Y | Y | Y | N | N | N | N | Y | Y | Y | Y | Y | Y | N | N | N | N | N |
| Requestor based privacy is enabled | Y | Y | N | N | Y | Y | N | N | Y | Y | N | N | N | Y | Y | N | N | N | N |
| requestor is present | Y | N | Y | N | Y | N | Y | N | Y | N | Y | Y | N | N | Y | N | Y | Y | N |
| Time based privacy is enabled | N | N | N | N | N | N | N | N | N | N | N | Y | N | Y | N | N | N | Y | N | Y |
| Effect | | | | | | | | | | | | | | | | | | | |
| Evaluate by Application privacy | | | X | X | | | | | | | | | | | | | | | |
| Evaluate by Requestor privacy | | | | | | | | | X | | | | | | X | | | | |
| Evaluate by Application privacy & Requestor privacy | X | | | | | | | | | | | | | | | | | | |
| Evaluate by Time Based Privacy | | | | | | | | | | | | X | | X | | | | X | X |
| Evaluate by Subscriber Default Privacy | | X | | | X | X | X | X | | X | | | | | | X | | | |
| Evaluate by Subscriber Global Privacy | | | | | | | | | | | X | | X | | | | X | | X |

TABLE 6

OCS Profile

| Field Name | Description |
|---|---|
| Host Name | Host name of the OCS belongs to the Enterprise, it is included in CCR message to be sent. It is also used to extract the IP address and port number of the OCS from the configuration. |
| Realm Name | Realm Name of the OCS belongs to the Enterprise. It is included in CCR message sent. It is also used to extract the IP address and port number of the OCS from the configuration. |
| IP Address | The IP Address of the OCS belongs to the Enterprise. Note: this field is not currently used. |
| Port Number | The Port number used in OCS belongs to the Enterprise. Note: this field is not currently used. |
| Tx timer value | CCR timeout |
| Tw timervalue | Watchdog timer |
| Failure configuration, default CCFH/DCFH value | It describes the expected behavior when CCA message is not received, continue or terminate. |
| Security type | Flag to indicate security option, TLS or IPSec |
| Transport protocol type | Flag to indicate transport protocol, TCP or SCTP |

TABLE 8

Charging Trigger Profile

| Field Name | Description |
|---|---|
| Charging Trigger Profile Name | It is part enterprise profile |
| Trigger Type | One from the list of SLIR, TLRR, TLREP, Privacy Request |
| Chargeable | Indication of ON/OFF on whether online is applicable. |

TABLE 9

Location Server Profile

| Field Name | Description |
|---|---|
| Location Server Name | Name of the location server |
| Enterprise ID | Enterprise that owns the Location Server |
| LS Technology List | The location Technologies the LS supports (used for steering fallback) |
| Access Technology List | The access technologies the LS supports (CDMA, GSM, WiFi, etc.) For future XLSG functions. |

TABLE 9-continued

Location Server Profile

| Field Name | Description |
|---|---|
| MLP versions supported | Which versions of MLP are supported: 3.0, 3.1, 3.2, and 3.3. |
| Location Server Type | XLP—configured as GMLC for GSM environment<br>XSS—SUPL Server<br>LAMM—Location Agent Manager within XLSG<br>XLP—configured as MPC in CDMA environment<br>Non-TCS GMLC<br>Non-TCS SUPL Server<br>Non-TCS MPC |
| Home Location Server Indicator | Indicating whether the Location Server is configured as Home Location Server which use the PPR function provided by XLSG, and to which XLSG send privacy update notifications. |
| Supported triggered request types (deferred) | Used for steering: The list of triggered services supported by the LS:<br>Periodic<br>Mobile event<br>Change of area |
| pceClientID | Identifier for the location server to send LPARequest over the Privacy interface. |
| Location Server PWD | Password for the location server to send LPARequest over the Privacy interface. |
| pceURL | URL that the LS uses for Privacy Requests |
| Assigned MLP URL | The URL the XLSG submits the http requests to the LS |
| Assigned Secure MLP URL | The URL XLSG submits secure http requests to the LS |
| Privacy Update notification credentials | pceServe.id<br>pceServer.pwd |

TABLE 10

LCS Client Profile

| Field Name | Description |
|---|---|
| LCS Client Name | Name of LCS Client |
| LCS Client ID | The client.id |
| LCS Client Pwd | LCS Client Password |
| LCS Client Pwd Required | A 'flag' indicating if a password is required for this LCS Client |
| LCS Client Identification | Type of LCS Client Name:<br>Logical Name<br>MSISDN<br>Email address<br>URL<br>SIP URL<br>IMS public Identity |
| LCS Client Contact Name | Contact Information for the person responsible for this LCS Client. |
| MLP Request Types | List of possible MLP request types the LCS Client may send.<br>i.e. used to verify rights to send an EME_LIR |
| LCS Client Category | Valid LCS Client types:<br>Value Added Service.<br>Emergency;<br>Lawful Interception.<br>For location requests from Emergency and Lawful Interception clients, the privacy settings of the target subscriber can be overridden during privacy checks. |
| Max Priority | The maximum priority that an LCS Client can Request |
| Default Priority | If the LCS doesn't provide a prio in the SLIR, this is the queue that the XLSG should process the request in |
| Default Charging Party | If the charging party is not specified in the Application profile. |

TABLE 11

Application Profile

| Field Name | Description |
|---|---|
| Application Name | Application Name |
| LCS Client ID/PWD | The LCS client offering the application |
| Release Number | The application release number. |
| Location Allowed | A flag to set to disable all location requests for an application |
| Valid Subscriber List | A list of authorized subscribers for the application. |
| Application Consumer Type | Emergency Services<br>Value Added Services (Default)<br>PLMN Operator Services<br>Lawful Intercept Services |
| Location Service Types | The list of request types (SLIS, ELIS, TRLS) that the application supports. |
| Max Priority | The maximum priority that application can request |
| Default Priority | If the LCS client doesn't provide a prio in the SLIR, this is the queue that the XLSG should process the request in |
| Charging Party | Target Subscriber, or Requestor |

TABLE 12

Device Profile

| Field Name | Description |
|---|---|
| Device Name | Convenient identifier |
| Device Type | Device manufacturer (e.g. Motorola, Nokia, . . . )<br>Device Model (e.g. Blackberry Storm, iPhone, . . . ) |
| Location Enabled | Is device location enabled? |
| LS Technology List | The location Technologies the Device supports |

TABLE 13

Location Service Provider Profile

| Field Name | Description |
|---|---|
| Location Server Name | Name of the Location Service Provider |
| Enterprise ID | Enterprise that the Location Service Provider is associated. |
| LCS Client List | The LCS Clients associated with the Location Service Provider. |
| Allowed Priority | The allowed the highest priority for the location requests initiated by the LCS Clients associated with the Location Service Provider. |
| Allowed Accuracy | The allowed best accuracy for the location requests initiated by the LCS Clients associated with the Location Service Provider. |

TABLE 14

Subscriber Profile

| Field Name | Description |
|---|---|
| Enterprise | Subscriber's Enterprise or Carrier |
| Msids | MSIDs for a subscriber (2 max)<br>dirNum (MSISDN or MDN)<br>netNum (IMSI or MIN) |
| Billing Plan | Prepaid or not |
| Device | The device that a subscriber has. |
| Data Plan | Defines if the Subscriber has a data plan, used for Steering |
| XLSA Agent Installed | Yes/No: Defines if the Subscriber device has the XLSA agent installed and registered in the LAMM (used for steering). |

TABLE 14-continued

Subscriber Profile

| Field Name | Description |
|---|---|
| Applications/ LCS Clients | A list of clients that can locate this target subscriber. LCS Clients Application Subscribers [PMM-1] [PMM-2] [PEM-6] [PEM-7] |
| Location Allowed | Field that identifies that the subscriber allows being located. |
| Triggered service info | For triggered services the XLSG may have to save data about active services. This data is not provisioned, but is identified here for clarity of this specification. |
| Subscriber Password | Passwords that may be needed, for example for self provisioning. |

TABLE 15

Privacy Profile

| Field Name | Description |
|---|---|
| Application | A subscriber may have more than one Privacy profile, one for each application. |
| Requesting Subscriber | A subscriber may have more than one Privacy profile, one for each subscriber that the target allows to locate them. Includes the temporal settings. |
| Privacy Action | This should indicate if the subscriber requires authorization or not and notification. [PMM-3] |
| Location Parameters | This can include parameters that support privacy features like: Limit locations to a specific day/time of day [PEM-8] [PEM-9] |

TABLE 16

Immediate Location Request LDR Contents

| Field Name | Description |
|---|---|
| LDR Type | 58 = Immediate Service LDR |
| Service Type | 0 = Value Added Services<br>1 = Emergency Services |
| Batch Transaction ID | This is the parent transaction id for the location request. |
| Request Transaction ID | The unique id for the location request. |
| Related Session ID | The related session ID when the request is session related request. |
| Request Time | The time the request was received in milliseconds since Jan. 1, 1970 (UTC). |
| Response Time | The time the response was returned in milliseconds since Jan. 1, 1970 (UTC) for data sent to the OSA or MLP client. |
| Enterprise Name | The Enterprise Name from the provisioned database. |
| Location Service Provider Name | The Location Service Provider Name from the provisioned database. |
| LCS Client Name | Name of the LCS Client. |
| Client ID | The external ID for the recipient LCS client. This field be used for identifying the client that submitted the request. |
| Subclient ID | If subclient ID was received and indicated as "last client" |
| Application ID | The Application ID extracted from client.serviceid |
| Location Server Address | The URL of the location server that provided the response. |
| Location Server Type | 0x0001: XLP - configured as GMLC for GSM environment<br>0x0002: XSS - SUPL Server<br>0x0003: LAMM - Location Agent Manager within XLSG<br>0x0004: XLP - configured as MPC in CDMA environment<br>0x0005: Non-TCS GMLC<br>0x0006: Non-TCS SUPL Server<br>0x0007: Non-TCS MPC |
| Target MSID Type | The type of MSID, in practice only MSISDN and IMSI may be used (for SIMless emergency, IMEI be converted in MSISDN)..<br>0 = MSISDN<br>1 = IMSI<br>2 = IMEI<br>3 = MIN<br>4 = MDN<br>5 = EME_MSID<br>6 = ASID<br>7 = OPE_ID<br>8 = IPV4<br>9 = IPV6<br>10 = SESSID |
| Target MSID | MSID value. |
| Requestor ID | The originating entity which has requested the location of the target UE from the LCS client. This filed should only be the id element of requestor in OMA XML definition |
| Charging Type | A flag indicating the charging type.<br>0 = Postpaid<br>1 = PrePaid - Target<br>2 = PrePaid - Requester |

TABLE 16-continued

Immediate Location Request LDR Contents

| Field Name | Description |
| --- | --- |
| OCS Debit Request processing status | The code indicating the status of Direct Debit Request processing<br>0 = Not chargeable event<br>1 = Debit Request Processed, charged<br>2 = Debit Request Processed, free<br>3 = Debit Request Processed, internal error<br>4 = Debit Request Processed, OCS error |
| OCS Refund Request processing status | The code indicating the status of Refund Request processing<br>0 = Refund not needed<br>1 = Refund Request process successful<br>2 = Refund Request process unsuccessful, internal error<br>3 = Refund Request process unsuccessful, OCS error |
| OCS Debit Request error code | The error code be logged using following values:<br>1 = OCSProtocolError<br>2 = OCSSystemError<br>3 = InternalOCSIFError<br>4 = OCSUnknownSubscriber<br>5 = NotEnoughCredit<br>6 = ServiceDenied |
| OCS Refund Request error code | The error code be logged using following values:<br>1 = OCSProtocolError<br>2 = OCSSystemError<br>3 = InternalOCSIFError<br>4 = OCSUnknownSubscriber |
| PositionReqType | The position requested values supported are:<br>0 = CURRENT<br>1 = LAST<br>2 = CURRENT_OR_LAST_KNOWN<br>3 = LAST_KNOWN_OR_CURRENT<br>4 = INITIAL<br>5 = CURRENT_AND_INTERMEDIATE |
| QOP resp_req | The following QOP response requested values are supported.<br>0 = NO_DELAY<br>1 = LOW_DELAY<br>2 = DELAY_TOLERANT<br>3 = USE_RESP_TIMER |
| QOP resp_timer | QOP response timer value |
| QOP hor_acc | QOP Horizontal Accuracy or Requested accuracy for an OSA request. |
| QoP class hor_acc | Qos_class of hor_acc in the request.<br>0 = ASSURED<br>1 = BEST_EFFORT |
| QOP alt_acc | QOP Altitude Accuracy |
| QoP class alt_acc | Qos_class of alt_acc in the request.<br>0 = ASSURED<br>1 = BEST_EFFORT |
| QOP max_loc_age | QOP Maximum age of cached location |
| Alt | Location Altitude |
| Direction | Location Direction |
| Speed | Location Speed |
| Lev_conf | Level of confidence |
| Position Source | Position source identifies the type of the position. A OMA Position Method is mapped to one of the following numeric values.<br>0 = UNKNOWN<br>1 = CELL<br>2 = OTDOA<br>3 = GPS<br>4 = A-GPS<br>5 = E-OTD<br>6 = U-TDOA<br>10 = OTHER<br>11 = E-CID<br>7 = AFLT<br>8 = EFLT |
| Priority | Priority values supported are:<br>0 = NORMAL<br>1 = HIGH |
| Shape | Shape types:<br>0 = No Shape<br>1 = Point<br>2 = Ellipsoid Point with Uncertainty Circle<br>3 = Ellipsoid Arc<br>4 = Ellipsoid Point With Uncertainty Ellipse<br>5 = Ellipsoid Point with Altitude and Uncertainty Ellipsoid<br>6 = Ellipsoid Point With Altitude |

TABLE 16-continued

Immediate Location Request LDR Contents

| Field Name | Description |
| --- | --- |
| X (Lat) | Latitude * 1,000,000. |
| Y (Long) | Longitude * 1,000,000. |
| OffsetAngle | If shape type is 3 (CircularArcArea) then this field be set. |
| IncludedAngle | If shape type is 3 (CircularArcArea) then this field be set. |
| OffsetMajorAxis | If shape type is 4 or 5 (EllipticalArea) then this field be set. |
| MajorInnerRadius | If shape type is 3 (CircularArcArea) then this field be set. |
| MinorInnerRadius | Not set at this time. (This field is not required based on the MLP shapes the XLP supports at this time.) |
| MajorOuterRadius | If shape type is 2, 3, 4 or 5 (CircularArea, CircularArcArea, EllipticalArea) then this field be set. |
| MinorOuterRadius | If shape type is 4 or 5 (EllipticalArea) then this field be set. |
| UncertaintyAltitude | The uncertainty altitude for the location result. |
| PositionTime | Date and Time of the position report in milliseconds since Jan. 1, 1970 (UTC). |
| Resid | For an OMA MLP request, the Result ID be logged using the values as follows:<br>0 = OK<br>1 = SYSTEM FAILURE<br>2 = UNSPECIFIED ERROR<br>3 = UNAUTHORIZED APPLICATION<br>4 = UNKNOWN SUBSCRIBER<br>6 = POSITION METHOD FAILURE<br>7 = TIMEOUT<br>104 = TOO MANY POSITION ITEMS<br>105 = FORMAT ERROR<br>106 = SYNTAX ERROR<br>107 = PROTOCOL ELEMENT NOT SUPPORTED<br>108 = SERVICE NOT SUPPORTED<br>110 = INVALID PROTOCOL ELEMENT VALUE<br>113 = PROTOCOL ELEMENT ATTRIBUTE VALUE NOT SUPPORTED<br>114 = CANCELLATION OF TRIGGERED LOCATION REQUEST<br>201 = QOP NOT ATTAINABLE<br>202 = POSITIONING NOT ALLOWED<br>203 = CONGESTION IN MOBILE NETWORK |
| Add_info | The additional info field as it was received or transmitted in any messages. Note that there should not be any comma (",") in this field. |

TABLE 17

Triggered Location Request Summary LDR Contents

| Field Name | Description |
| --- | --- |
| LDR Type | A flag indicating the LDR type.<br>60 = Triggered Location Service (TLS) Summary |
| Batch Transaction ID | This is the parent transaction id for the location request. |
| Request Transaction ID | The unique id for the location request. |
| Related Session ID | The related session ID when the request is session related request. |
| Request Time | The time the request was received in milliseconds since Jan. 1, 1970 (UTC). |
| Response Time | The time the response was returned in milliseconds since Jan. 1, 1970 (UTC) for data sent to the OSA or MLP client. |
| Enterprise Name | The Enterprise Name from the provisioned database. |
| Location Service Provider Name | The Location Service Provider Name from the provisioned database. |
| LCS Client Name | Name of the LCS Client |
| Client ID | The external ID for the recipient LCS client. This field be used for identifying the client that submitted the request. |
| Subclient ID | If subclient ID was received and indicated as "last client" |
| Application ID | The Application ID extracted from client.serviceid |
| Location Server Address | The URL of the location server that provided the response. |
| Location Server Type | 0x0001: XLP - configured as GMLC for GSM environment<br>0x0002: XSS - SUPL Server<br>0x0003: LAMM - Location Agent Manager within XLSG |

TABLE 17-continued

Triggered Location Request Summary LDR Contents

| Field Name | Description |
| --- | --- |
| | 0x0004: XLP - configured as MPC in CDMA environment |
| | 0x0005: Non-TCS GMLC |
| | 0x0006: Non-TCS SUPL Server |
| | 0x0007: Non-TCS MPC |
| MSID Type | The type of MSID, for XLP in practice only MSISDN and IMSI may be used. |
| | 0 = MSISDN |
| | 1 = IMSI |
| | 2 = IMEI |
| | 3 = MIN |
| | 4 = MDN |
| | 5 = EME_MSID |
| | 6 = ASID |
| | 7 = OPE_ID |
| | 8 = IPV4 |
| | 9 = IPV6 |
| | 10 = SESSID |
| MSID | MSID value. |
| Requestor ID | The originating entity which has requested the location of the target UE from the LCS client. This filed should only be the id element of requestor in OMA XML definition |
| Charging Type | A flag indicating the charging type. |
| | 0 = Postpaid |
| | 1 = PrePaid - Target |
| | 2 = PrePaid - Requester |
| No of Report requested | The value indicating number of Report requested with TLRR. |
| OCS Debit Request processing status | The code indicating the status of Direct Debit Request processing |
| | 0 = Not chargeable event |
| | 1 = Debit Request Processed, charged |
| | 2 = Debit Request Processed, free |
| | 3 = Debit Request Processed, internal error |
| | 4 = Debit Request Processed, OCS error |
| | Note: This field is set based on TLRR/TLRA exchange in TLRS LDR. If it is set to 0 in TLRS LDR, then it refers to TLRR trigger. TLREP might still be chargeable event. |
| OCS Refund Request processing status | The code indicating the status of Refund Request processing |
| | 0 = Refund not needed |
| | 1 = Refund Request process successful |
| | 2 = Refund Request process unsuccessful, internal error |
| | 3 = Refund Request process unsuccessful, OCS error |
| | Note: This field is set based on TLRR/TLRA exchange in TLRS LDR. The Refund Request process refers to the error occurring before TLRA message is returned back. Any error occurring after TLRA message sent, due to missing TLREP be processed by Offline System. |
| OCS Debit Request error code | The error code be logged using following values: |
| | 1 = OCSProtocolError |
| | 2 = OCSSystemError |
| | 3 = InternalOCSIFError |
| | 4 = OCSUnknownSubscriber |
| | 5 = NotEnoughCredit |
| | 6 = ServiceDenied |
| OCS Refund Request error code | The error code be logged using following values: |
| | 1 = OCSProtocolError |
| | 2 = OCSSystemError |
| | 3 = InternalOCSIFError |
| | 4 = OCSUnknownSubscriber |
| tlrr_event Type | The deferred location request types: |
| | 0 = MS Available Event; |
| | 3 = Area Change Event |
| Start_time | The received Start_time |
| Stop_time | The received Stop_time |
| Actual Stop Time | The time the triggered session was terminated. Termination may include early termination due to cancellation. |
| Interval | The received Interval value |
| Duration | The received duration value |
| Pushaddr_URL | The received pushaddr URL value. |
| PositionReqType | The position requested values supported are: |
| | 0 = CURRENT |
| | 1 = LAST |
| | 2 = CURRENT_OR_LAST_KNOWN |
| | 3 = LAST_KNOWN_OR_CURRENT |

TABLE 17-continued

Triggered Location Request Summary LDR Contents

| Field Name | Description |
|---|---|
| | 4 = INITIAL |
| | 5 = CURRENT_AND_INTERMEDIATE |
| QOP resp_req | The following QOP response requested values are supported. |
| | 0 = NO_DELAY |
| | 1 = LOW_DELAY |
| | 2 = DELAY_TOLERANT |
| | 3 = USE_RESP_TIMER |
| QOP resp_timer | QOP response timer value |
| QOP hor_acc | QOP Horizontal Accuracy or Requested accuracy for an OSA request. |
| QoP class hor_acc | Qos_class of hor_acc in the request. |
| | 0 = ASSURED |
| | 1 = BEST_EFFORT |
| QOP alt_acc | QOP Altitude Accuracy |
| QoP class alt_acc | Qos_class of alt_acc in the request. |
| | 0 = ASSURED |
| | 1 = BEST_EFFORT |
| QOP max_loc_age | QOP Maximum age of cached location |
| Priority | Priority values supported are: |
| | 0 = NORMAL |
| | 1 = HIGH |
| Number of reports | Total number of reports that have been sent. |
| Resid | For an OMA MLP request, the Result ID in the returned TLRA be logged using the values as follows: |
| | 0 = OK |
| | 1 = SYSTEM_FAILURE |
| | 2 = UNSPECIFIED_ERROR |
| | 3 = UNAUTHORIZED_APPLICATION |
| | 4 = UNKNOWN_SUBSCRIBER |
| | 5 = ABSENT_SUBSCRIBER |
| | 6 = POSITION_METHOD_FAILURE |
| | 101 = CONGESTION_IN_LOCATION_SERVER |
| | 102 = CONGESTION_IN_MOBILE_NETWOR |
| | 103 = USUPPORTED_VERSION |
| | 104 = TOO_MANY_POSITION_ITEMS |
| | 105 = FORMAT_ERROR |
| | 106 = SYNTAX_ERROR |
| | 107 = PROTOCOL_ELEMENT_NOT_SUPPORTED |
| | 108 = SERVICE_NOT_SUPPORTED |
| | 109 = PROTOCOL_ELEMENT_ATTRIBUTE_NOT_SUPPORTED |
| | 110 = INVALID_PROTOCOL_ELEMENT_VALUE |
| | 111 = INVALID_PROTOCOL_ELEMENT_ATTRIBUTE_VALUE |
| | 112 = PROTOCOL_ELEMENT_VALUE_NOT_SUPPORTED |
| | 113 = PROTOCOL_ELEMENT_ATTRIBUTE_VALUE_NOT_SUPPORTED |
| | 201 = QOP_NOT_ATTAINABLE |
| | 202 = POSITIONING_NOT_ALLOWED |
| | 204 = DISALLOWED_BY_LOCAL_REGULATIONS |
| | 207 = MISCONFIGURATION_OF_LOCATION_SERVER |
| | 208 = TARGET MOVED TO NEW MSC/SGSN |
| Add_info | The additional info field as it was received or transmitted in any messages. Note that there should not be any comma (",") in this field. |

TABLE 18

Triggered Location Request TLREP LDR Contents

| Field Name | Description |
|---|---|
| LDR Type | A flag indicating the LDR type. |
| | 65 = Triggered Location Service (TLS) Report |
| Request Transaction ID | The unique id for the location request. |
| Report Transaction ID | The unique id for each received report message. |
| Report Time | The time the report was returned in milliseconds since Jan. 1, 1970 (UTC). |
| Remaining time | The remaining time of the deferred location session, in milliseconds. |
| MSID Type | The type of MSID, for XLP in practice only MSISDN and IMSI may be used. |
| | 0 = MSISDN |
| | 1 = IMSI |

TABLE 18-continued

Triggered Location Request TLREP LDR Contents

| Field Name | Description |
|---|---|
| | 2 = IMEI |
| | 3 = MIN |
| | 4 = MDN |
| | 5 = EME_MSID |
| | 6 = ASID |
| | 7 = OPE_ID |
| | 8 = IPV4 |
| | 9 = IPV6 |
| | 10 = SESSID |
| MSID | MSID value. |
| Requestor ID | The originating entity which has requested the location of the target UE from the LCS client. This filed should only be the id element of requestor in OMA XML definition |
| Charging Type | A flag indicating the charging type. |
| | 0 = Postpaid |
| | 1 = PrePaid - Target |
| | 2 = PrePaid - Requester |
| OCS Debit Request processing status | The code indicating the status of Direct Debit Request processing |
| | 0 = Not chargeable event |
| | 1 = Debit Request Processed, charged |
| | 2 = Debit Request Processed, free |
| | 3 = Debit Request Processed, internal error |
| | 4 = Debit Request Processed, OCS error |
| OCS Refund Request processing status | The code indicating the status of Refund Request processing |
| | 0 = Refund not needed |
| | 1 = Refund Request process successful |
| | 2 = Refund Request process unsuccessful, internal error |
| | 3 = Refund Request process unsuccessful, OCS error |
| OCS Debit Request error code | The error code be logged using following values: |
| | 1 = OCSProtocolError |
| | 2 = OCSSystemError |
| | 3 = InternalOCSIFError |
| | 4 = OCSUnknownSubscriber |
| | 5 = NotEnoughCredit |
| | 6 = ServiceDenied |
| OCS Refund Request error code | The error code be logged using following values: |
| | 1 = OCSProtocolError |
| | 2 = OCSSystemError |
| | 3 = InternalOCSIFError |
| | 4 = OCSUnknownSubscriber |
| trl_trigger Report Type | The received trl_trigger value: |
| | 0 = PERIODIC, |
| | 1 = MS_AVAIL, |
| | 2 = CHANGE_AREA |
| Alt | Location Altitude |
| Direction | Location Direction |
| Speed | Location Speed |
| lev_conf | Level of confidence |
| Position Source | Position source identifies the type of the position. A OMA Position Method is mapped to one of the following numeric values. |
| | 0 = UNKNOWN |
| | 1 = CELL |
| | 2 = OTDOA |
| | 3 = GPS |
| | 4 = A-GPS |
| | 5 = E-OTD |
| | 6 = U-TDOA |
| | 10 = OTHER |
| | 11 = E-CID |
| | 7 = AFLT |
| | 8 = EFLT |
| Shape | Shape types: |
| | 0 = No Shape |
| | 1 = Point |
| | 2 = Ellipsoid Point with Uncertainty Circle |
| | 3 = Ellipsoid Arc |
| | 4 = Ellipsoid Point With Uncertainty Ellipse |
| | 5 = Ellipsoid Point with Altitude and Uncertainty Ellipsoid |
| | 6 = |
| X (Lat) | Latitude * 1,000,000. |
| Y (Long) | Longitude * 1,000,000. |
| OffsetAngle | If shape type is 3 (CircularArcArea) then this field be set. |
| IncludedAngle | If shape type is 3 (CircularArcArea) then this field be set. |
| OffsetMajorAxis | If shape type is 4 or 5 (EllipticalArea) then this field be set. |

TABLE 18-continued

Triggered Location Request TLREP LDR Contents

| Field Name | Description |
| --- | --- |
| MajorInnerRadius | If shape type is 3 (CircularArcArea) then this field be set. |
| MinorInnerRadius | Not set at this time. (This field is not required based on the MLP shapes the XLP supports at this time.) |
| MajorOuterRadius | If shape type is 2, 3, 4 or 5 (CircularArea, CircularArcArea, EllipticalArea) then this field be set. |
| MinorOuterRadius | If shape type is 4 or 5 (EllipticalArea) then this field be set. |
| UncertaintyAltitude | The uncertainty altitude for the location result. |
| PositionTime | Date and Time of the position report in milliseconds since Jan. 1, 1970 (UTC). |
| Resid | For an OMA MLP/RLP request, the Result ID be logged using the values as follows:<br>0 = OK<br>1 = SYSTEM_FAILURE<br>2 = UNSPECIFIED_ERROR<br>3 = UNAUTHORIZED_APPLICATION<br>4 = UNKNOWN_SUBSCRIBER<br>5 = ABSENT_SUBSCRIBER<br>6 = POSITION_METHOD_FAILURE<br>101 = CONGESTION_IN_LOCATION_SERVER<br>102 = CONGESTION_IN_MOBILE_NETWOR<br>103 = USUPPORTED_VERSION<br>104 = TOO_MANY_POSITION_ITEMS<br>105 = FORMAT_ERROR<br>106 = SYNTAX_ERROR<br>107 = PROTOCOL_ELEMENT_NOT_SUPPORTED<br>108 = SERVICE_NOT_SUPPORTED<br>109 = PROTOCOL_ELEMENT_ATTRIBUTE_NOT_SUPPORTED<br>110 = INVALID_PROTOCOL_ELEMENT_VALUE<br>111 = INVALID_PROTOCOL_ELEMENT_ATTRIBUTE_VALUE<br>112 = PROTOCOL_ELEMENT_VALUE_NOT_SUPPORTED<br>113 = PROTOCOL_ELEMENT_ATTRIBUTE_VALUE_NOT_SUPPORTED<br>201 = QOP_NOT_ATTAINABLE<br>202 = POSITIONING_NOT_ALLOWED<br>204 = DISALLOWED_BY_LOCAL_REGULATIONS<br>207 = MISCONFIGURATION_OF_LOCATION_SERVER |
| Add_info | The additional info field as it was received or transmitted in any messages. Note that there should not be any comma (",") in this field. |

TABLE 19

Privacy Request LDR Contents

| Field Name | Description |
| --- | --- |
| LDR Type | 61 = Privacy Service |
| TransactionID | A unique Transaction ID assigned to the privacy check transaction. |
| Request Time | The time the request was received in milliseconds since Jan. 1, 1970 (UTC). |
| Response Time | The time the response was returned in milliseconds since Jan. 1, 1970 (UTC) for data sent to the OSA or MLP client. |
| Location Server ID | The PCEClientID that sent the request |
| ueid | Identity of the target subscriber |
| Ueid Type | 0 = MSISDN<br>1 = IMSI<br>2 = IMEI<br>3 = MIN<br>4 = MDN<br>5 = EME_MSID<br>6 = ASID<br>7 = OPE_ID<br>8 = IPV4<br>9 = IPV6<br>10 = SESSID |
| LCS Client ID | The identity of the LCS client that initiated the location request. |
| LCS Client ID Type | 0 = External client, in E.164 Number<br>1 = Internal client |
| LCS Client Category | 0 = Value Added<br>1 = Emergency |

TABLE 19-continued

Privacy Request LDR Contents

| Field Name | Description |
| --- | --- |
| | 2 = PLMN Operator |
| | 3 = Lawful Interception |
| LCS Client Name | The name of the client that initiated the location request. |
| LCS Client Name Type | 0 = MSISDN |
| | 1 = logical ID |
| | 2 = email ID |
| | 3 = absolute HTTP URL |
| | 4 = SIP URI |
| | 5 = IMS Public ID |
| ApplicationID | The applicationID is present in the LPARequest as the TCS extension. |
| serviceType | Indicates the category of service |
| requestor | Identifies the mobile subscriber requesting the location based service |
| locationType | Type of location, supported values are: |
| | 0 = CURRENT |
| | 1 = LAST |
| | 2 = CURRENT_OR_LAST_KNOWN |
| | 3 = LAST_KNOWN_OR_CURRENT |
| | 4 = INITIAL |
| | 5 = CURRENT_AND_INTERMEDIATE |
| servingNode | Address of the serving node - E.164 number |
| | And, if needed, LCS capability set of serving node |
| actionType | 0x00 - PositionNotAllowed |
| | 0x01 - Notify_PositionIfGranted |
| | 0x02 - NotifyPositionIfNoResponse |
| | 0x03 - NotifyPosition |
| | 0x04 - PositionWithoutNotify |
| additionalLocationCheck | Indicator on additional privacy check with location estimate For the location request to be fully authorized, an additional Location Privacy Assertion Request with location estimate is needed when the Location Server has received the location information of the target UE. |
| Charging Type | A flag indicating the charging type. |
| | 0 = Postpaid |
| | 1 = PrePaid - Target |
| | 2 = PrePaid - Requester |
| OCS Debit Request processing status | The code indicating the status of Direct Debit Request processing |
| | 0 = Not chargeable event |
| | 1 = Debit Request Processed, charged |
| | 2 = Debit Request Processed, free |
| | 3 = Debit Request Processed, internal error |
| | 4 = Debit Request Processed, OCS error |
| OCS Refund Request processing status | The code indicating the status of Refund Request processing |
| | 0 = Refund not needed |
| | 1 = Refund Request process successful |
| | 2 = Refund Request process unsuccessful, internal error |
| | 3 = Refund Request process unsuccessful, OCS error |
| OCS Debit Request error code | The error code be logged using following values: |
| | 1 = OCSProtocolError |
| | 2 = OCSSystemError |
| | 3 = InternalOCSIFError |
| | 4 = OCSUnknownSubscriber |
| | 5 = NotEnoughCredit |
| | 6 = ServiceDenied |
| OCS Refund Request error code | The error code be logged using following values: |
| | 1 = OCSProtocolError |
| | 2 = OCSSystemError |
| | 3 = InternalOCSIFError |
| | 4 = OCSUnknownSubscriber |
| Resid | For an Privacy request, the Result ID be logged using the values as follows: |
| | 0 = OK |
| | 3 = UNAUTHORIZED APPLICATION |
| | 4 = UNKNOWN SUBSCRIBER |
| | 103 = UNSUPPORTED VERSION |
| | 105 = FORMAT ERROR |
| | 106 = SYNTAX ERROR |
| | 207 = MISCONFIGURATION OF PRIVACY CHECKING ENTITY |
| Add_info | The additional info field as it was transmitted in any messages. Note that there should not be any comma (",") in this field. |

TABLE 20

Error Codes returned to LCS Client

| Res id | Slogan | Description |
|---|---|---|
| 0 | OK | No error occurred while processing the request. |
| 1 | SYSTEM FAILURE | The request can not be handled because of a general problem in the location server. |
| 2 | UNSPECIFIED ERROR | An unspecified error used in case none of the other errors apply. This can also be used in case privacy issues prevent certain errors from being presented |
| 3 | UNAUTHORIZED APPLICATION | The requesting location-based application is not allowed to access the location server or a wrong password has been supplied. |
| 4 | UNKNOWN SUBSCRIBER | Unknown subscriber. The user is unknown, i.e. no such subscription exists. |
| 5 | ABSENT SUBSCRIBER | Absent subscriber. The user is currently not reachable. |
| 6 | POSITION METHOD FAILURE | Position method failure. The location service failed to obtain the user's position. |
| 7 | TIMEOUT | Timer expiry for the requested event trigger |
| 101 | CONGESTION IN LOCATION SERVER | The request can not be handled due to congestion in the location server. |
| 103 | UNSUPPORTED VERSION | The Location server does not support the indicated protocol version. |
| 104 | TOO MANY POSITION ITEMS | Too many position items have been specified in the request. |
| 105 | FORMAT ERROR | A protocol element in the request has invalid format. The invalid element is indicated in ADD_INFO. |
| 106 | SYNTAX ERROR | The position request has invalid syntax. Details may be indicated in ADD_INFO. |
| 107 | PROTOCOL ELEMENT NOT SUPPORTED | A protocol element specified in the position request is not supported by the Location Server, or the position result is not supported by the LCS Client. The element is indicated in ADD_INFO. |
| 108 | SERVICE NOT SUPPORTED | The requested service is not supported in the Location Server. The service is indicated in ADD_INFO. |
| 109 | PROTOCOL ELEMENT ATTRIBUTE NOT SUPPORTED | A protocol element attribute is not supported in the Location Server. The attribute is indicated in ADD_INFO. |
| 110 | INVALID PROTOCOL ELEMENT VALUE | A protocol element in the request has an invalid value. The element is indicated in ADD_INFO. |
| 111 | INVALID PROTOCOL ELEMENT ATTRIBUTE VALUE | A protocol element attribute in the request has a wrong value. The element is indicated in ADD_INFO. |
| 112 | PROTOCOL ELEMENT VALUE NOT SUPPORTED | A specific value of a protocol element is not supported in the Location Server. The element and value are indicated in ADD_INFO. |
| 113 | PROTOCOL ELEMENT ATTRIBUTE VALUE NOT SUPPORTED | A specific value of a protocol element attribute is not supported in the Location Server. The attribute and value are indicated in ADD_INFO. |
| 114 | CANCELLATION OF TRIGGERED LOCATION REQUEST | The requested triggered location report is cancelled |
| 201 | QOP NOT ATTAINABLE | The requested QoP cannot be provided. |
| 202 | POSITIONING NOT ALLOWED | The subscriber does not allow the application to position him/her for whatever reason (privacy settings in location server, LCS privacy class). |
| 203 | CONGESTION IN MOBILE NETWORK | The request can not be handled due to congestion in the mobile network. |
| 204 | DISALLOWED BY LOCAL REGULATIONS | The location request is disallowed by local regulatory requirements. |
| 207 | MISCONFIGURATION OF LOCATION SERVER | The location server is not completely configured to be able to calculate a position. |
| 208 | TARGET MOVED TO NEW MSC/SGSN | The triggered Location Request has been aborted due to that target has moved to another MSC/SGSN. This result code only be used towards The Home Location Server. Restrictions: This code only be used in RLP. This result code only be used towards The Home Location Server. |

TABLE 20-continued

Error Codes returned to LCS Client

| Res id | Slogan | Description |
|---|---|---|
| 500-599 | | Vendor specific errors |
| 601 | STANDARD LOCATION REPORT SERVICE NOT SUPPORTED | The MLS Client does not support the standard location report service. |
| 602 | MLS CLIENT ERROR | An error occurred in the MLS Client. |
| 603 | STANDARD LOCATION REPORT SERVICE NOT ACCEPTED | The standard location report was not accepted by the MLS Client |
| 604 | SUBSCRIBER IN STANDARD LOCATION REPORT SERVICE NOT VALID | The subscriber in the Standard Location Report is not valid to the MLS Client |
| 605 | INVALID SERVICE ID IN STANDARD LOCATION REPORT SERVICE | The service identity in the Standard Location Report is not valid to the MLS Client |

TABLE 21

Error Codes returned on the Privacy Interface

| Res id | Slogan | Description |
|---|---|---|
| 0 | OK | Reserved for future use. No error occurred while processing the request. |
| 1 | SYSTEM FAILURE | The request can not be handled because of a general problem in the privacy checking entity. |
| 2 | UNSPECIFIED ERROR | An unspecified error used in case none of the other errors applies. |
| 3 | UNAUTHORIZED APPLICATION | The requesting location-based application is not allowed to access the location server or a wrong password has been supplied. |
| 4 | UNKNOWN SUBSCRIBER | Unknown subscriber. The user is unknown, i.e. no such subscription exists. |
| 101 | CONGESTION IN PCE | The request cannot be handled due to congestion in the Privacy Checking Entity. |
| 103 | UNSUPPORTED VERSION | The Privacy Checking Entity does not support the indicated protocol version. |
| 105 | FORMAT ERROR | A protocol element in the request has invalid format. |
| 106 | SYNTAX ERROR | The request has invalid syntax. |
| 107 | PROTOCOL ELEMENT NOT SUPPORTED | The Privacy Checking Entity does not support some protocol element(s) specified in the request. |
| 108 | SERVICE NOT SUPPORTED | The requested service is not supported in the Privacy Checking Entity. |
| 109 | PROTOCOL ELEMENT ATTRIBUTE NOT SUPPORTED | A protocol element attribute is not supported in the Privacy Checking Entity. |
| 110 | INVALID PROTOCOL ELEMENT VALUE | A protocol element in the request has an invalid value. |
| 111 | INVALID PROTOCOL ELEMENT ATTRIBUTE VALUE | A protocol element attribute in the request has a wrong value. |
| 112 | PROTOCOL ELEMENT VALUE NOT SUPPORTED | A specific value of a protocol element is not supported in the Privacy Checking Entity. |
| 113 | PROTOCOL ELEMENT ATTRIBUTE VALUE NOT SUPPORTED | A specific value of a protocol element attribute is not supported in the Privacy Checking Entity. |
| 204 | DISALLOWED BY LOCAL REGULATIONS | The request is disallowed by local regulatory requirements. |
| 207 | MISCONFIGURATION OF PRIVACY CHECKING ENTITY | The Privacy Checking Entity is not completely configured to be able to respond to the request. |

TABLE 22

CCA Message Result Codes

| Result-Code AVP Value | addinfo mapping for both PCP and MLP interface |
|---|---|
| DIAMETER_USER_UNKNOWN | OCS SYSTEM ERROR |
| DIAMETER_AUTHORIZATION_REJECTED | PREPAID CHARGING ERROR |
| DIAMETER_END_USER_SERVICE_DENIED | PREPAID CHARGING ERROR |
| DIAMETER_RATING_FAILED | PREPAID CHARGING ERROR |
| DIAMETER_CREDIT_LIMIT_REACHED | PREPAID CHARGING ERROR |
| DIAMETER_UNABLE_TO_DELIVER | OCS SYSTEM ERROR |
| DIAMETER_TOO_BUSY | OCS SYSTEM ERROR |
| Timeout case | OCS TIMEOUT |

TABLE 23

Definitions, Abbreviations and Acronyms

| Term | Definition |
|---|---|
| AP | Application Profile (synonymous with LCS Client) |
| Application | An LBS external to wireless carrier networks that has access to Subscribers. |
| Authentication | Process of confirming the identity of an LCS Client by verifying that the ID and password in a location request are identical to the ID and password in the Application Profile. |
| Authorization | Process of allowing access to locations only to those entities permitted to access them within the constraints defined in profiles. |
| CCA | Credit Control Answer |
| CCR | Credit Control Request |
| Device | A mobile device that is defined to the XLSG and has an associated Subscriber. |
| DP | Device Profile |
| EME_LIA | Emergency Location Immediate Answer |
| EME_LIR | Emergency Location Immediate Request |
| Enterprise | A organization that operates one or more mobile networks. |
| EP | Enterprise Profile |
| HTTP | Hypertext Transfer Protocol |
| LA | Location Agent: an application executing on a mobile device that provides location functions on the mobile such as reporting locations to the LAMM function in the XLSG. |
| LAMM | Location Agent Management Module: a function of the XLSG that interfaces to the LA on a mobile device. |
| LBS | Location Based Services |
| LCAP | LCS Client/Application Profile |
| LCS | Carry forward from MLP spec. |
| LCS Client | Carry forward from MLP spec. |
| LDR | Location Detail Record. |
| LS | Location Server |
| MLP | Mobile Location Protocol |
| Network | A mobile network as defined by a "network ID" |
| NP | Network Profile |
| OCS | Online Charging System |
| Platform Admin | The XLSG system administrator who configures and manages the XLSG over the System Administration interface. |
| PPR | Privacy Profile Register |
| Privacy | Authentication and Authorization for Mobile Privacy |
| Product Operations | A role responsible for provisioning the Enterprise, Network, Device and Application profiles. |
| QoP | Quality of Position |
| Service Representative | A role aligned with a carrier customer care person who handles provisioning of the Subscriber Profile on behalf of the Subscriber. |
| SLIA | Standard Location Immediate Answer |
| SLIR | Standard Location Immediate Request |
| SLIS | Standard Location Immediate Service |
| SP | Subscriber Profile |
| Subscriber | A role available to a customer of the carrier who provisions options for location services in the Subscriber Profile. |
| TLRS | Triggered Location Reporting Service |
| TDR | Transaction Detail Record. |
| User | An instance of a location access service enabled by the XLSG that has an associated Subscriber. |
| XLSG | Xypoint Location Services Gateway server |

What is claimed is:

1. A method of directing a location request in a wireless system to a serving location server based on emergency status, comprising:
    steering a given location request to a first network-based location server if said location request is a non-emergency location request; and
    if said location request is related to an emergency, instead steering said location request to a different, second network-based location server.

2. A method of directing a location request in a wireless system to a serving location server based on data plan status, comprising:
    steering a location request of a subscriber wireless device that has a valid data plan, to a first network-based location server using a control plane; and
    if said location request is related to a subscriber wireless device that has no valid data plan, instead steering said location request to a different, second network-based location server.

3. A method of directing a location request in a wireless system to a serving location server based on device type, comprising:
    steering a location request of a subscriber wireless device of a first network protocol type, to a first network-based location server; and
    if said location request is related to a subscriber wireless device of a second network protocol type, instead steering said location request to a different, second network-based location server.

4. A method of directing a location request in a wireless system to a serving location server based on application type, comprising:
    steering a location request of a subscriber wireless device running an application of a first type, to a first network-based location server; and
    if said location request is related to a subscriber wireless device running an application of a different, second type, instead steering said location request to a different, second network-based location server.

5. A method of directing a location request in a wireless system to a serving location server with a fallback, comprising:
    steering a location request of a subscriber wireless device, to a first network-based location server; and
    if said steered location request fails, and sufficient time remains, instead steering said location request to a different, second network-based location server.

* * * * *